United States Patent [19]
Takeshima et al.

[11] Patent Number: 5,590,255
[45] Date of Patent: Dec. 31, 1996

[54] GRAPHIC DRAWING APPARATUS FOR GENERATING GRAPHS OF IMPLICIT FUNCTIONS

[75] Inventors: Taku Takeshima; Masayuki Noro, both of Kawasaki; Tomokatsu Saito, Tokyo, all of Japan

[73] Assignee: Fujitsu Limited, Kawasaki, Japan

[21] Appl. No.: 404,107

[22] Filed: Mar. 14, 1995

[30] Foreign Application Priority Data

Mar. 18, 1994 [JP] Japan .................................. 6-048717

[51] Int. Cl.⁶ ................................................. G06T 11/00
[52] U.S. Cl. ........................................ 395/141; 395/142
[58] Field of Search ................................ 395/141, 140, 395/133, 142, 143, 155, 161; 364/710.01, 710.02, 710.03, 711, 710.05–710.09, 710.1, 710.11

[56] References Cited

U.S. PATENT DOCUMENTS 4,238,826  12/1980  Jones, Jr. ................................. 395/141
5,251,160  10/1993  Rockwood et al. ................. 395/142 X

*Primary Examiner*—Almis R. Jankus
*Attorney, Agent, or Firm*—Staas & Halsey

[57] ABSTRACT

A graphic drawing apparatus divides an xy plane corresponding to a two-dimensional display region into plural display units. While one of two variables of the polynomial $f(x, y)$ is fixed, a univeriate polynomial is generated. All intervals in which zeros are present are obtained within the width of the display units. By painting pixels of the display units that contain the intervals in which the obtained zeros are present, a graph $f(x, y)=0$ is precisely displayed. Even if the graphic to be displayed contains a singular point, the vicinity thereof can be precisely drawn.

23 Claims, 40 Drawing Sheets

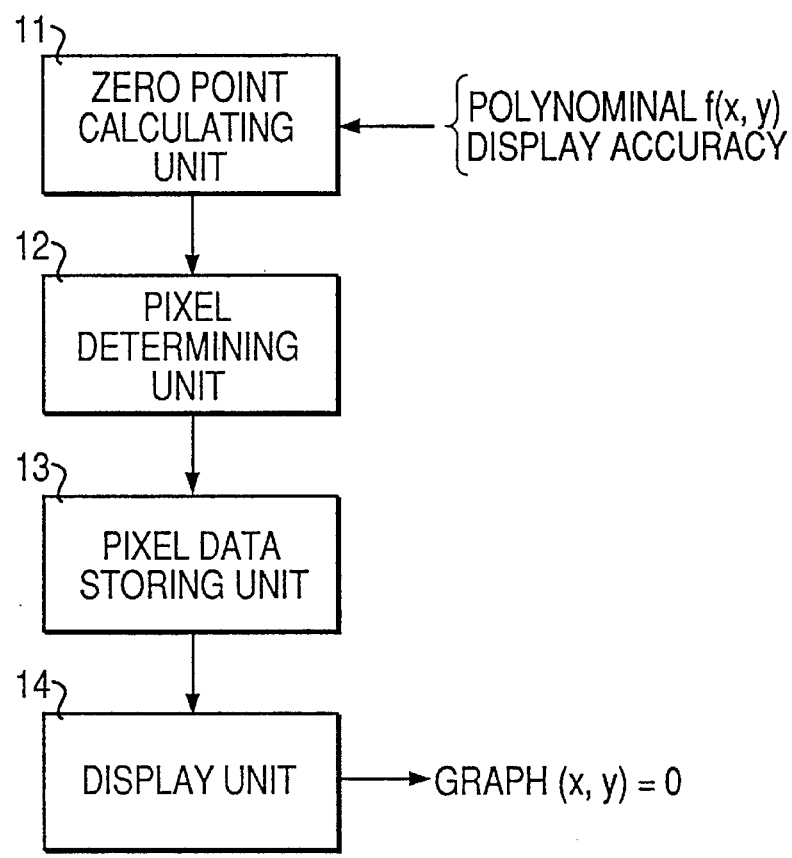

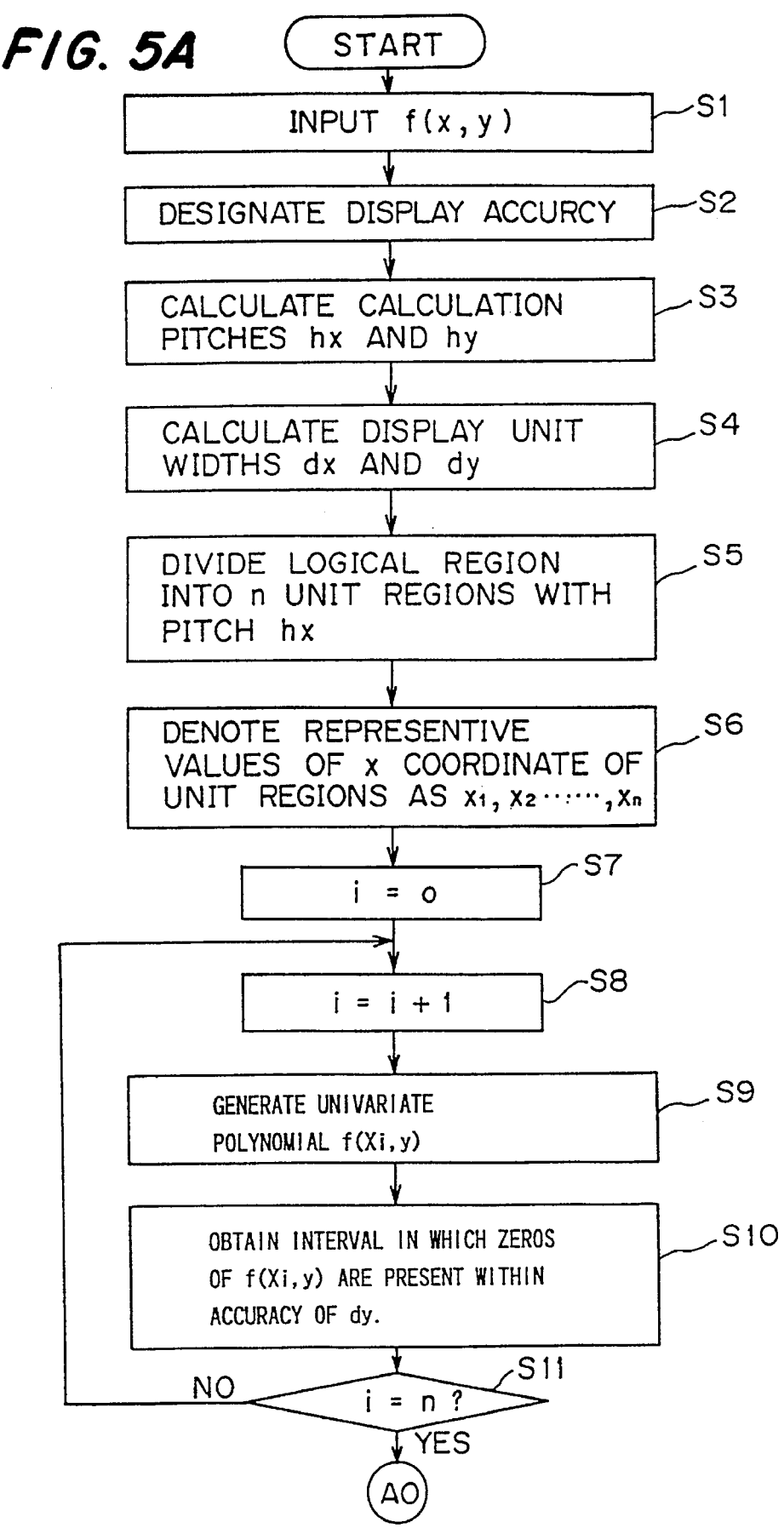

FIG. 14

| ADDRESS | CONTENT OF WORD | NAME OF PLACE |
|---|---|---|
| $\alpha$ | r + 1 | |
| $\alpha + 1$ | $\xi r$ | PLACE OF $\beta^r$ |
| $\alpha + 2$ | $\xi r-1$ | PLACE OF $\beta^{r-1}$ |
| $\alpha + 3$ | $\xi r-2$ | PLACE OF $\beta^{r-2}$ |
| ⋮ | ≈ | |
| $\alpha + r$ | $\xi 1$ | PLACE OF $\beta^{r1}$ |
| $\alpha + r + 1$ | $\xi 0$ | PLACE OF $\beta^{r0}$ |

1 2 3 4 5 6 7 8 9 10 11

1 2 3 4 5 6 7 8 9 10 11

GRAPHIC DRAWING APPARATUS FOR GENERATING GRAPHS OF IMPLICIT FUNCTIONS

BACKGROUND OF THE INVENTION

1. Field of the Invention

The present invention relates to a technique for precisely drawing graphs of implicit functions for use with science and engineering calculations, in particular to a graphic drawing apparatus and method for precisely and automatically drawing graphics represented as a set of zeros of a polynomial with designated accuracy.

2. Description of the Related Art

In the recent science and engineering fields, the results of science and engineering calculations have been displayed by using computers so as to understand the phenomena, discern the background, and discover new problems. In displaying calculated results, it is a most fundamental problem to display a set of x and y values represented by an expression of relation f(x, y)=0, which has two variables and defines a kind of an implicit function y in x as a graph on an xy coordinate plane. However, unless the function f(x, y) is very simple, it is very difficult to precisely and accurately draw a graph of f(x, y)=0.

When the function f(x, y) is given as a bivariate polynomial, a multiple-valued function y=Y(x) in which f(x, y)=0 is solved with respect to the variable y is referred to as an algebraic function. The classes of this function include not only simple graphics such as straight lines, parabolas, circles, ovals, ellipses, and hyperbolas, but complicated curves whose shapes cannot be imagined with the form of the function. In such complicated curves, part of curves may be degenerated to points. In the current graphic techniques using computers, graphics represented by algebraic functions are sometimes drawn. Thus, techniques for precisely and automatically drawing graphics represented by algebraic functions are important tasks to be solved.

As conventional methods for drawing graphics represented by algebraic functions using computers, an all region pixel sign determining method and tracking methods have been proposed. The tracking methods are further categorized as curve tracking method (using differential equations), adjacent pixel tracking method, curve interpolating method, and contour line drawing method. In each method, an apparatus display region on the screen of a display device connected to the computer is made correspondent with a logical region of an xy coordinate plane by a predetermined mapping.

In the all region pixel sign determining method (Mitara, A. K., Graphing Implicit Functions f(x, y)=0, Applied Mathematics and Computation, 39, pp. 199–205, 1990), when a curve represented by an implicit function f(x, y)=0 is drawn on a screen (composed of a set of pixels arranged in a matrix shape) of a display device, a criterion for determining that a point on the curve is present in a particular pixel. According to this method, pixels in a display region are mapped onto the xy coordinate plane. Corresponding to signs (positive, negative, or zero) of values of the function f(x, y) at several representative points on the boundary lines of each pixel and its adjacent pixels, zeros of the function f(x, y) in each pixel point are determined based on the intermediate value theorem with respect to a continuous function.

FIG. 1 shows an example of representative points on boundary lines between adjacent pixels on the xy coordinate plane. As shown in FIG. 1, points $(x_1, y_1)$, $(x_1, y_2)$, $(x_2, y_1)$, and $(x_2, y_2)$ at four corners of a pixel 1 are designated representative points. The function values $f(x_1, y_1)$, $f(x_1, y_2)$, $f(x_2, y_1)$, and $f(x_2, y_2)$ are calculated and then the signs thereof are determined. For example, if the sign of $f(x_1, y_1)$ is different from the sign of $f(x_2, y_1)$ (other than zero), it is clear that a zero is present between the two points $(x_1, y_1)$ and $(x_2, y_1)$ according to the intermediate value theorem. In addition, if the sign of $f(x_1, y_1)$ is different from the sign of $f(x_1, y_2)$, a zero is present between two points $(x_1, y_1)$ and $(x_1, y_2)$.

If there are positive values and negative values as the four function values at the four representative points, there is a zero of the function f(x, y) in the pixel 1. In other words, it is determined that a point on the curve f(x, y)=0 is present and the pixel 1 is plotted. On the other hand, if one of the four function values is zero, since a corresponding representative point is present on the curve f(x, y)=0, a proper one of four pixels surrounding the representative value is plotted. If all the four function values are positive or negative, it is assumed that no zero is present in the pixel 1, and the pixel 1 is not plotted. When such a determining process is performed for all pixels that compose the display region, the curve f(x, y)=0 can be automatically drawn as a set of pixels containing zeros of the function f(x, y).

Since the all region pixel sign determining method does not require the evaluation of a differential of the function f(x, y), complicated differentiating calculation is omitted. In addition, this method is applicable for functions that cannot be differentiated. In this method, when the number of pixels in the display region is increased, the image quality is improved. However, since the signs of all pixels of the region should be determined, the amount of calculation increases, thereby decreasing the process speed. However, when such a calculation is performed by a high speed parallel computer, the calculation speed can be remarkably improved. Moreover, an application of the all region pixel sign determining method for non-linear equations has been proposed.

On the other hand, when the tracking methods (that will be described later) are used, since adjacent pixels to be plotted are determined starting from a point on the curve f(x, y)=0, unlike with the all region pixel sign determining method, it is not necessary to calculate pixels in the all display region for determining the signs thereof.

In the adjacent pixel tracking method, when one zero point of the function f(x, y) is given, adjacent pixels containing zeros connected to the given point are successively determined. Thus, a curve successively connected to the given zero is tracked and displayed.

When adjacent pixels to be connected are determined, as with the all region pixel sign determining method, a determining method corresponding to the intermediate value theorem can be used. For example, signs of values of the function f(x, y) at several representative points starting from a given point on a given curve f(x, y)=0 are determined and pixels to be connected are determined. Thus, one branch of the curve is tracked (as disclosed in Japanese Patent Laid-Open Publication No. 2-304684).

To determine the direction of a pixel to be connected, a technique in which the function f(x, y) in the vicinity of a particular point on the curve f(x, y)=0 is differentiated in various manners is known.

In the curve tracking method using differential equations (Nakatsuyama, M. et el., Curve Generation of Implicit Functions by Incremental Computers, Comput. & Graphics, 7, pp. 161–167, 1983), variables x and y are treated as functions x(t) and y(t) with respect to a parameter t. When one zero of the function f(x, y) is given, the curve f(x, y)=0 is drawn. By numerically solving a differential equation with respect to the parameter t, points on the curve f(x, y)=0 are successively obtained. Pixels corresponding to the obtained points are plotted on the display region on the screen.

According to this method, when a function form of f(x, y) is given, a differential equation that represents the curve f(x, y)=0 is not uniquely obtained. As an example, the following simultaneous equations are often used.

$$d_x/d_t = f_y(x, y)$$
$$d_y/d_t = -f_x(x, y) \quad (1)$$
$$f_x(x, y) = \partial f(x, y)/\partial x$$
$$f_y(x, y) = \partial f(x, y)/\partial y$$

When the given zero is at $(x_0, y_0)$, the expression (1) can be numerically solved with initial conditions $x(0)=x_0$ and $y(0)=y_0$ at $t=0$. When the numeric solutions of the expression (1) are plotted corresponding to the pixels of the display region, a graph of the curve f(x, y)=0 can be obtained.

In the curve interpolating method, the coordinate values of plural points on the curve f(x, y)=0 are numerically calculated. These points are properly interpolated so as to display the results as a graph. In this method, since a point on a curve represented by f(x, y)=0 is obtained, the variable y is fixed to a particular value $y_k$. Plural values of the variable x that satisfy $f(x, y_k)=0$ are numerically obtained. Sets of obtained values of x and $y_k$ are treated as coordinates of points on the corresponding curve. The value of $y_k$ in the display region can be varied with a predetermined pitch. Points on the curve corresponding to the fixed value are obtained as coordinate values of plural points that satisfy f(x, y)=0. When the obtained points are interpolated with a polygonal line or an appropriate smooth curve, an integral curve of f(x, y)=0 can be obtained.

In the method using the contour line drawing method, coordinate values at plural points on a three-dimensional curved surface z=f(x, y) in an xyz coordinate space are obtained. The obtained values of these points are interpolated on a appropriate curved surface in the proper three-dimensional space and an intersection line with an xy plane (z=0) is obtained. In this method, the display region mapped on the xy plane is divided in a lattice shape. The value of the function f(x, y) at each lattice point $(x_m, y_m)$ is calculated with z coordinate value $z_{mn}=f(x_m, y_n)$. A set of points $\{(x_m, y_n, z_{mn})\}$ in the three-dimensional space represent points on the curved surface z=f(x, y). An appropriate curved surface that interpolates such points is determined and values of xy coordinates at points on the intersection line of the curved surface and the xy plane are calculated. Thus, a curve that approximates the curve f(x, y)=0 on the xy plane is obtained.

When an intersection line of a plane $z=c_k$, instead of z=0, that is in parallel with the xy plane, and the interpolated curved surface is obtained, constant $c_k$ being varied with a predetermined pitch, contour lines of the curved surface z=f(x, y) can be obtained.

In the method using the contour line drawing method, it is not necessary to numerically solve an equation $f(x, y_k)=0$ unlike with the curve interpolating method. Instead, when a coordinate value $(x_m, y_n)$ at a lattice point is substituted into the function f(x, y), the value of $z_{mn}$ can be obtained.

However, in the above-described drawing methods, there are following problems.

In the conventional drawing methods, the most practical method is the all region pixel sign determining method.

According to this method, graphs of most algebraic functions can be stably drawn. In the all region pixel sign determining method, the presence of a zero of the function f(x, y) in each pixel is determined based on the intermediate value theorem. According to theorem, although the presence of a zero of a continuous function in a designated interval can be proved, the absence thereof cannot be proved.

For example, in FIG. 1, even if the sign of the function value $f(x_1, y_1)$ is the same as the sign of the function value $f(x_2, y_1)$, the absence of a zero of the function f(x, y) between the two points $(x_1, y_1)$ and $(x_2, y_1)$ cannot be proved. Thus, even if the signs of the values of f(x, y) at four boundary representative points at the pixel 1 are the same, a zero of the function f(x, y) may be theoretically present in the pixel 1. This situation occurs when plural curves that are represented by f(x, y)=0 are very close to each other, there are plural branches of curves in a pixel, and a singular point or a similar situation takes place. In this case, even if there is a real zero of the function f(x, y), a corresponding pixel is not plotted.

FIG. 2 shows an example of a sign distribution of the function f(x, y) in the vicinity of a singular point on the xy plane in the case that the curve f(x, y)=0 has the singular point. In FIG. 2, two curves that are represented by f(x, y)=0 have a point of contact SP in a pixel 2-3. This contact point SP is a singular point. The two curves share a tangent line at the singular point SP. The display region is divided into four regions (upper, lower, left, and right regions) by the curve f(x, y)=0 about the singular point SP. The values of the function f(x, y) in the upper and lower regions are positive. The values of the function f(x, y) in the left and right regions are negative. Thus, at all four boundary representative points P1, P2, P3, and P4 of the pixel 2-3, the values of the function f(x, y) are positive. In the above-described all region pixel sign determining method, when all function values at boundary representative values are the same, the corresponding pixel is not plotted. Thus, the pixel 2-3 in FIG. 2 is not displayed on the screen. Due to the same reason, the pixels 2-1, 2-2, 2-4, and 2-5 that are arranged on the left and right of the pixel 2-3 are not displayed on the screen.

Thus, in the all region pixel sign determining method, the pixels 2-1 to 2-5 in the vicinity of the singular point SP of the curve f(x, y)=0 cannot be plotted. Thus, an abnormal blank region appears on the display screen. Such a blank region may take place at a portion other than the vicinity of the singular point. In this case, when the enlargement ratio is increased, the curve can be obtained. However, in the vicinity of the singular point, even if the enlargement ratio is increased, the curve cannot be correctly obtained.

FIG. 3 is an enlarged view showing the vicinity of a singular point in the case that a display region is appropriately mapped to a logical region on the xy plane and enlarged and the square region 3 shown in FIG. 2 is treated as a new unit pixel. In FIG. 3, the values of the function f(x, y) at boundary representative points P5, P6, P7, and P8 of the pixel 3 including the singular point SP are positive. Thus, the pixel 3 is not displayed on the screen. Even if the calculating accuracy is raised in such a manner that the values of a polynomial f(x, y) are precisely calculated by a rational number calculation, the pixel 3 is not displayed. Thus, a correct graph cannot be obtained.

In addition, in the adjacent pixel tracking method and the curve tracking method using differential equation, there are problems of how a zero of the function f(x, y) that is the start point of the tracking is designated and how several curves that are not connected each other are obtained. Thus, it is clear that such methods are imperfect.

In the adjacent pixel tracking method, when adjacent pixels to be connected are determined according to the intermediate value theorem, the same problems as the all region pixel sign determining method take place.

When a curve $f(x, y)=0$ is tracked with a differential equation, since the differential value of the function $f(x, y)$ at a singular point becomes 0, even if the value of the parameter t increases, the coordinate value $(x(t), y(t))$ is not updated. Thus, the curve can be no more extended. Thus, the solution in the vicinity of the singular point cannot be obtained. Consequently, branches that pass through the singular point should be treated as independent curves that are not connected. For example, in the example shown in FIG. 2, since the differential of $f_x(x, y)$ at the singular point SP is zero, the vicinity of this point cannot be precisely drawn.

In the curve interpolating method, when there are points on a plurality of curves corresponding to adjacent fixed values $y_k$ and $y_{k+1}$, the connections are not uniquely determined. In particular, in the vicinity of a singular point, if plural points are very close to each other, it is very difficult to determine the correct connecting relation.

In the method using the contour line drawing method, the interpolating process in the three-dimensional space is very complicated. In this method, although a long calculating time is required, a corresponding correct connecting relation of curves cannot be expected. In particular, when a curve to be obtained includes a singular point, it is impossible to obtain the curve.

The above-described tracking methods involve various problems when drawing algebraic functions. As a critical cause of which such tracking methods cannot be used, when plural curves are represented by $f(x, y)=0$, it is difficult to completely obtain all tracking start points on the curves. To track all curves and determine that they have been drawn, it should be determined whether or not each pixel contains points on the curves for all pixels in the display region. Thus, the all region pixel sign determining method is called in the above-described tracking methods.

Consequently, even if any conventional drawing method is used, a region in which curves are very close to each other and a singular point or similar situation takes place cannot be correctly drawn.

SUMMARY OF THE INVENTION

An object of the present invention is to provide a graphic drawing method and apparatus for precisely and accurately drawing a curve or a graph represented as a set of zeros of a bivariate polynomial within a designated accuracy of a display device regardless of an enlargement ratio.

The present invention is a graphic drawing method and apparatus for use with an information processing device for displaying a graph represented by a plurality of zeros of a polynomial $f(x, y)$ in variables x an y in a two-dimensional display region corresponding to a logical region on an xy coordinate plane.

In the graphic drawing apparatus according to the present invention, an x-direction calculation pitch $h_x$ and a y-direction calculation pitch $h_y$ are calculated corresponding to a display accuracy designated. In addition, an x-direction display unit width $d_x$ and a y-direction display unit width $d_y$ are calculated.

Thereafter, the logical region is divided into n x-direction unit regions, each of which has the width of the pitch $h_x$. Representative values on x coordinate in these regions are designated as $x_1, x_2, \ldots, x_n$. $x_i$ (where $i=1, \ldots, n$) that is a fixed value of a variable x is substituted into a polynomial $f(x, y)$ so as to generate a univeriate polynomial $f(x_i, y)$ with respect to the variable y. For all zero points of the polynomial $f(x_i, y)$, each interval of the variable y in each of which at least one zero is present are obtained within the width $d_y$.

In addition, the logical region is divided into m y-direction unit regions, each of which has the width of the pitch $h_y$. Representative values on the y coordinate in these regions are designated as $y_1, y_2, \ldots, y_m$. $y_j$ (where $j=1, \ldots, m$) that is a fixed value of the variable y is substituted into the polynomial $f(x, y)$ so as to generate a univariate polynomial $f(x, y_j)$ in variable x. For all zero points of the polynomial $f(x, y_j)$, each interval of the variable x in each of which at least one zero present are obtained within the width $d_x$.

To obtain intervals in which zeros of the univeriate polynomials $f(x_i, y)$ and $f(x, y_j)$ are present, a particular operation is performed on each of the univeriate polynomials and thereby a polynomial sequence is obtained. A particular value of the variable x or y is substituted into the polynomial sequence and thereby a numerical sequence, for example S sequence, is obtained. The number of changes of signs of numeric values in the Sturm sequence is determined. According to the Sturm's theorem, the number of zeros that are present in an arbitrary interval of real numbers can be obtained from the number of changes of the signs. Using this fact according to the Sturm's theorem, the interval in which zeros of the univeriate polynomials are present can be gradually narrowed to a small region.

In the graphic drawing apparatus, the interval in which all zeros of the univeriate polynomial $f(x_i, y)$ are present is limited to a region having the width $d_y$ or less. In addition, the interval in which all zeros of the univeriate polynomial $f(x, y_j)$ are present is limited to a region having the width $d_x$ or less. By plotting pixels in the display region corresponding to the obtained intervals in which the zeros are present, a graph of $f(x, y)=0$ is displayed.

Unlike with the intermediate value theorem, according to the Sturm's theorem, it can be precisely determined whether or not zeros are present in a particular closed interval. For example, when a zero is present in a region in which plural curve branches are present, a corresponding pixel can be securely plotted. Thus, a graph with a correct connecting relation can be securely displayed.

According to the graphic drawing apparatus of the present invention, a process for displaying a graph represented by zeros of a multivariate polynomial can be substituted with a process for obtaining zeros of univeriate polynomials. All pixels in a two-dimensional display region corresponding to intervals in which zeros of a multivariate polynomial are present can be displayed. In particular, even in a region in which a special condition such as a singular point takes place, the graph thereof can be precisely displayed.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 4 is a block diagram showing a construction of a graphic drawing apparatus according to the present invention;

FIG. 5A is a flow chart showing a zero calculating process according to the present invention (No. 1);

FIG. 14 is a schematic diagram showing a representation of a positive integer in a memory according to the present invention;

FIG. 15 is a schematic diagram showing a representation of a positive integer 874 in a memory according to the present invention;

DESCRIPTION OF PREFERRED EMBODIMENTS

Next, with reference to the accompanying drawings, preferred embodiments of the present invention will be described.

FIG. 4 shows a construction of a graphic drawing apparatus according to the present invention. The graphic drawing apparatus comprises a zero calculating unit 11, a pixel determining unit 12, a pixel data storing unit 13, and a display unit 14.

The zero point calculating unit 11 obtains a zero point interval of a variable y in which a zero of a univeriate polynomial is present within a y-direction display unit width. The univeriate polynomial is obtained by substituting each of plural fixed values of a variable x into a polynomial f(x, y). In addition, the zero point calculating unit 11 obtains a zero point interval of the variable x in which a zero point of a univeriate polynomial is present within an x-direction display unit width. The univeriate polynomial is obtained by substituting each of plural fixed values of the variable y into the polynomial f(x, y).

Figure 1:
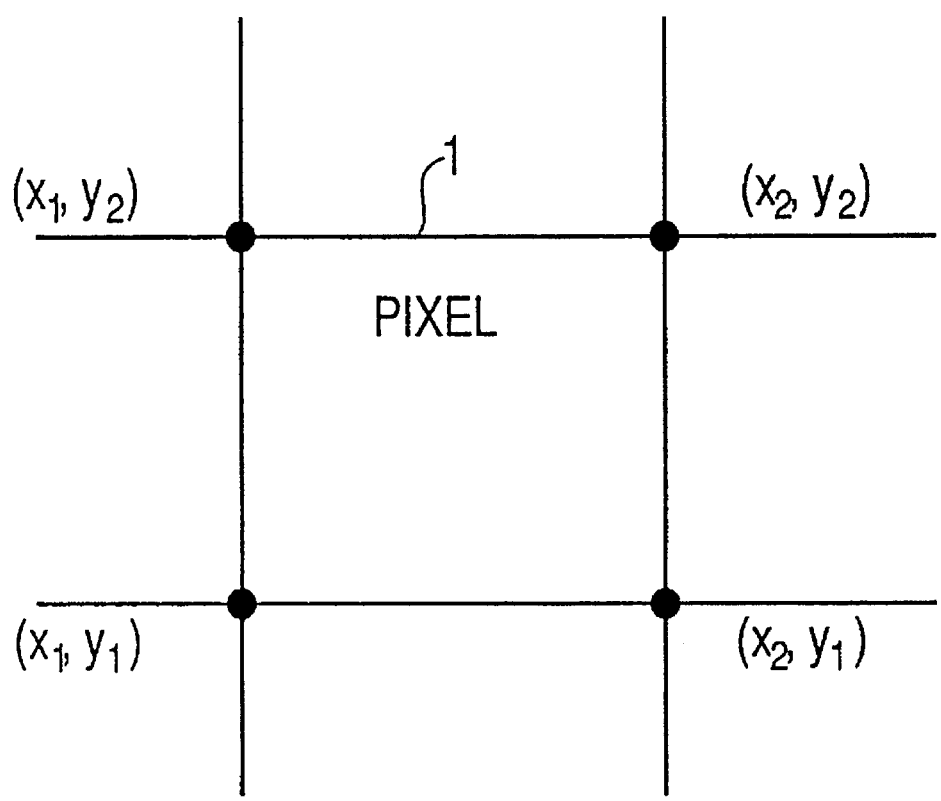
FIG. 1 is a schematic diagram showing representative points at boundaries in a conventional all region pixel sign determining method.
Figure 2:
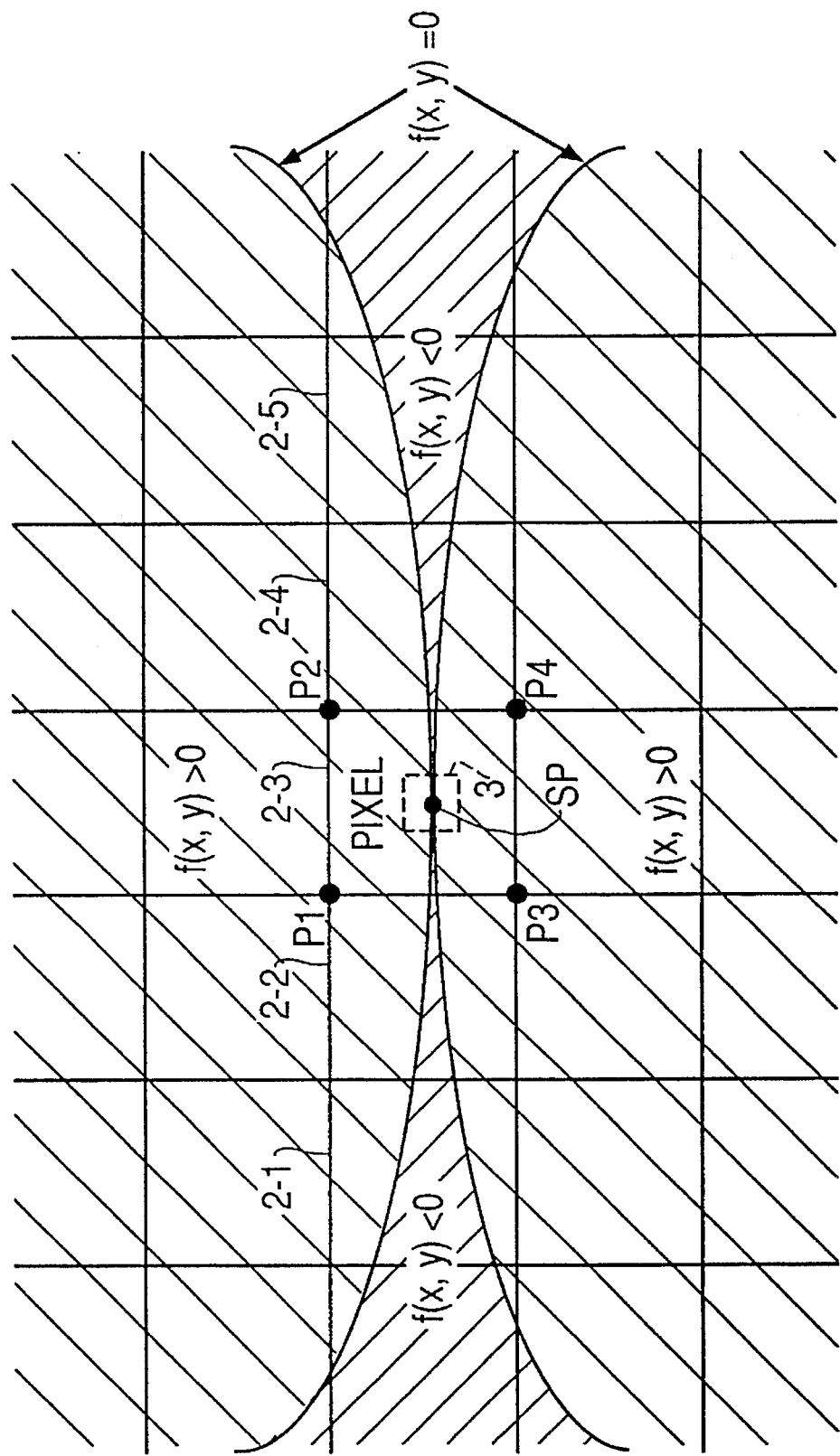
FIG. 2 is a schematic diagram showing signs of a function $f(x, y)$ in the vicinity of a singular point.
Figure 3:
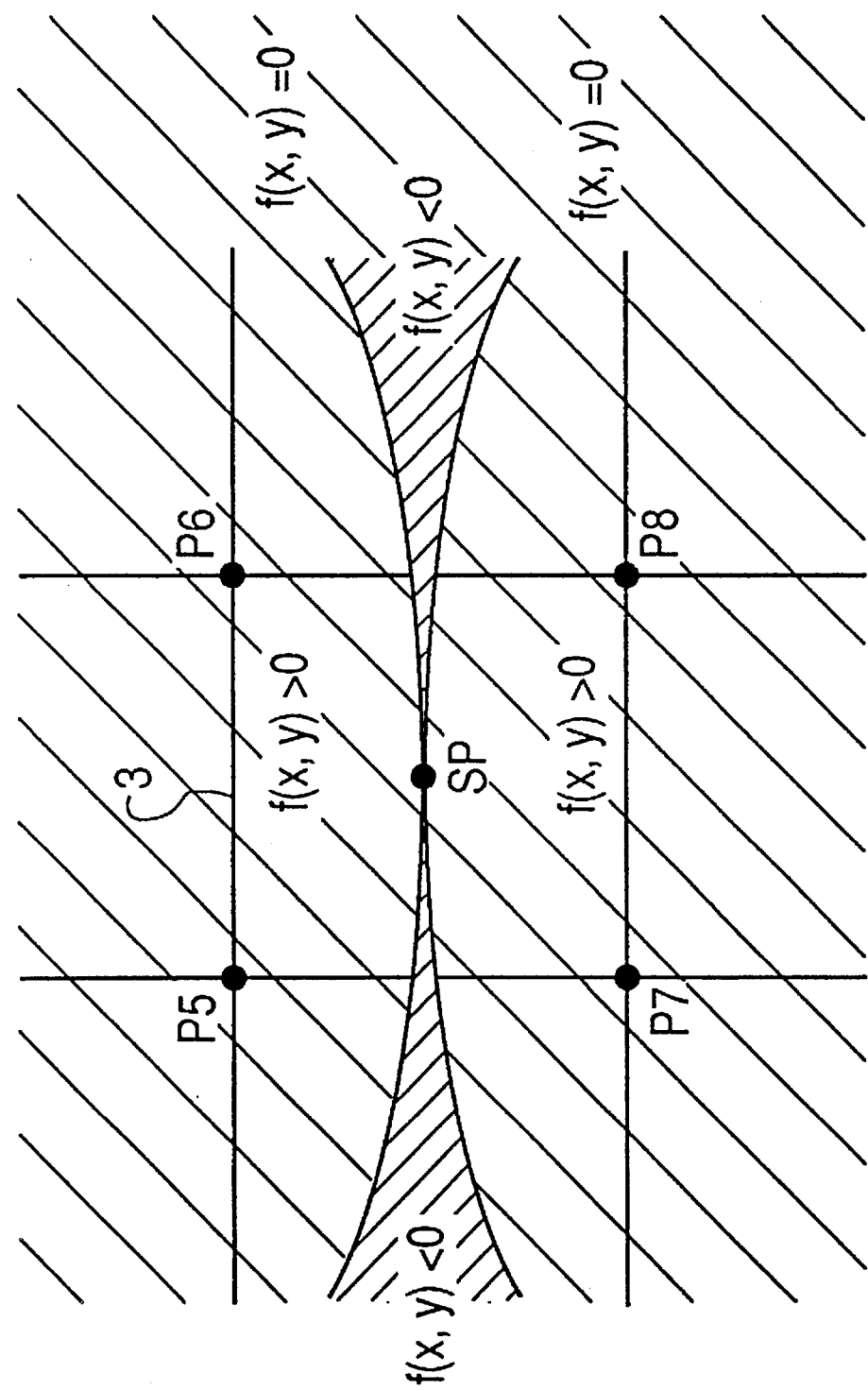
FIG. 3 is an enlarged view showing the vicinity of a singular point.
Figure 5B:
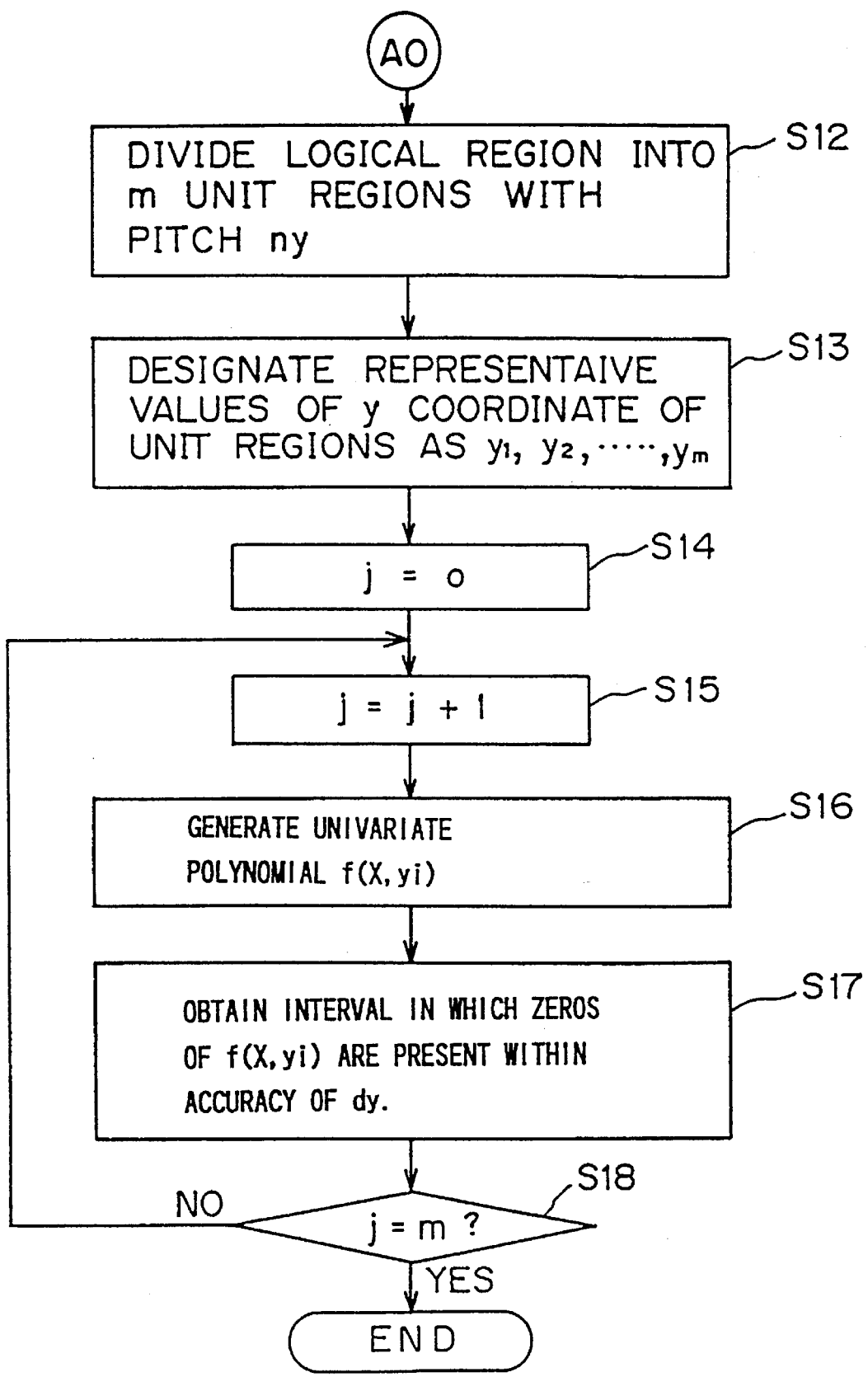
FIG. 5B is a flow chart showing the zero calculating process according to the present invention (No. 2)

FIGS. 5A and 5B are flow charts of which the zero-point calculating unit 11 performs a zero point calculating process.

First, a polynomial f(x, y) and a display accuracy are input to the zero point calculating unit 11 (at steps S1 and S2 of FIG. 5A). Corresponding to the designated display accuracy, the zero point calculating unit 11 calculates an x-direction calculation pitch $h_x$ and a y-direction calculation pitch $h_y$ (at step S3). In addition, the zero point calculating unit 11 calculates an x-direction display unit width $d_x$ and a y-direction display unit width $d_y$ (at step S4). Thereafter, the zero point calculating unit 11 divides the logical region into n x-direction unit regions, each of which has a width of the x-direction calculation pitch $h_x$ (at step S5). Representative values on x coordinate of the obtained x-direction unit regions are designated as $x_1, x_2, \ldots, x_n$ (at step S6).

Thereafter, i=0 is set (at step S7). Next, i=i+1 is set (at step S8). $x_i$ that is a fixed value of the variable x is substituted into the polynomial f(x, y) so as to generate a univeriate polynomial $f(x_i, y)$ in variable y (at step S9). all the zero point interval of the variable y in each of which zeros of the univariate polynomal $f(x_i, y)$ are present is obtained within the y-direction display unit width $d_y$ (at step S10).

At step S10 point, the number of times of sign changes in a numeric value sequence that is obtained by substituting a particular value of the variable y into a polynomial sequence uniquely obtained from the univeriate polynomial $f(x_i, y)$ is determined so as to obtain a zero point interval of the variable y. As the numeric value sequence, a S sequence is used.

The Sturm sequence at a point x=c of a univeriate polynomial F(x) is given by the following manner. A finite number of polynomials uniquely obtained corresponding to the polynomial F(x) are defined by the following expression.

$F_0(x)=F(x)$ $F_1(x)=dF(x)/dx$ $F_{k-1}(x)=Q_k(x)F_k(x)-F_{k+1}(x)$ (where $1 \leq k \leq \lambda-1$ $F_k(x) \neq 0$ (where $k=0, 1, \ldots \lambda-1$), $F_\lambda(x)=0$     (2)

In the expression (2), $Q_k(x)$ is the quotient of which a polynomial $F_{k-1}(x)$ is divided by a polynomial $F_k(x)$; and $F_{k+1}(x)$ is the remainder thereof. The following sequence of $\lambda+1$ numeric values that are obtained by substituting x=c into the polynomial of the expression (2) is a Sturm sequence at the point x=c.

$F_0(c), F_1(c), \ldots, F_\lambda(c)$     (3)

When the number of changes of signs in the Sturm sequence observed from the left side is represented by V(c), the following Strum's theorem holds.

Sturm's theorem: The number of zeros of the polynomial F(x) in a closed interval [a, b] of real number is given by V(a)−V(b) (where F(a)≠0 and F(b)≠0; a multiple root is counted as one regardless of multiplicity).

When the number V(c) of changes of signs in the Sturm sequence is counted, it is not treated as a change of a sign that a 0 appears in the sequence.

Corresponding to the characteristics of the Sturm sequence, by varying the values of a and b and calculating V(a)−V(b) the interval in which zeros of the polynomial F(x) are present can be limited to a small region.

At step S10 of FIG. 5A, a Sturm sequence at an appropriate point of the univeriate polynomial $f(x_i, y)$ with respect to the variable y is calculated so as to obtain closed intervals that are equal to or smaller than the y-direction display unit width $d_y$ each of which contains at least one zero. Here plural zeros exist in an individual closed interval. Thereafter, it is determined whether or not i=n (at step S11). When i is smaller than n, i=i+1 is set (at step S8). Thus, the steps S9 and S10 are repeated.

When i=n at step S11, the zero point calculating unit 11 divides the logical region into m y-direction unit regions with the y-direction calculation pitch $h_y$ (step S12 in FIG. 5B). Representative values on y coordinate of the y-direction unit regions are designated as $y_1, y_2, \ldots y_m$ (at step S13).

Thereafter, j=0 is set (at step S14). Then, j=j+1 is set (at step S15). $y_j$ that is a fixed value of the variable y is substituted into the polynomial f(x, y) so as to generate a univeriate polynomial $f(x, y_j)$ with respect to the variable x (at step S16). For all zeros of the univeriate polynomial $f(x, y_j)$ in the considered range of x, a closed intervals are obtained so that every such closed interval, with smaller interval size than the x-direction display unit width $d_x$ contains at least one zero (at step S17).

At step S17, the number of changes of signs in a numeric value sequence that is obtained by substituting a particular value of the variable x into a polynomial sequence uniquely obtained from the univeriate polynomial $f(x, y_j)$ is determined so as to obtain an interval of the variable x. In reality, as with step S10, a Sturm sequence at an appropriate point of the univeriate polynomial $f(x, y_j)$ with respect to the variable x is calculated, so as to obtain closed intercals that are equal to or smaller than the x-direction display unit width $d_x$ each of which contains at least one zero.

Thereafter, it is determined whether or not j=m (at step S18). When j is smaller than m, j=j+1 is set (at step S15). Thus, the steps S16 and S17 are repeated. When j=m at step S18, the process is terminated.

The pixel determining unit 12 obtains pixels in a two-dimensional display region corresponding to the closed intervals containing zeros for the variable y with respect to each of the fixed values of the variable x. In addition, the pixel determining unit 12 obtains pixels in a two-dimensional display region corresponding to the closed intervals containing zeros for variable x with respect to each of the fixed values of the variable y. Thus, the pixel determining unit 12 determines the obtained pixels as pixels that represent the graph.

The pixel data storing unit 13 stores pixel data with respect to pixels that represent the graph determined by the pixel determining unit 12. The display unit 14 displays a graph corresponding to the pixel data stored in the pixel data storing unit 13 in the two-dimensional display region.

In the graphic drawing apparatus according to the present invention, the zero point calculating unit 11 treats a process for displaying a graph represented by zeros of a multivariate polynomial f(x, y) as a process for obtaining zeros of univeriate polynomials $f(x_i, y)$ (where i=1, 2, ..., n) and $f(x, y_j)$ (where j=1, 2, ..., m). Thus, in a designated display accuracy, all pixels in the two-dimensional display region corresponding to all intervals in which zeros of the polynomial f(x, y) are present can be obtained.

Unlike with the intermediate value theorem, since the Sturm's theorem provides the number of zeros of a function that is present in an certain closed interval, it can be determined whether or not a zero is present in the closed interval. In a region in which more than one curve branches are present, when a zero is present, a pixel corresponding to the zero can be securely plotted in the two-dimensional display region. Thus, with the accuracies of the x-direction display unit width $d_x$ and the y-direction display unit width $d_y$, an approximated graphic that has a correct connecting relation is displayed. Thus, even if a singular point or the similar situation takes place, unlike with the conventional all region pixel sign determining method based on the intermediate value theorem, a graph in the vicinity of the singular point or the like can be displayed.

In addition, by independently obtaining intervals of the variable y in which zeros of the univeriate polynomial $f(x_i, y)$ are present in the y-direction display unit width $d_y$ and intervals of the variable x in which zeros of the univeriate polynomial $f(x, y_j)$ are present in the x-direction display unit width $d_x$, all pixels to be displayed are determined. Thus, unlike with the conventional tracking methods, it is not necessary to consider connecting relations of pixels to be displayed. In addition, complicated interpolating process is not required. Since the positions of zeros of the polynomial $f(x, y)$ are calculated by scanning x and y directions, adjacent pixels are automatically and correctly connected on a graph to be displayed.

Moreover, since the positions of all zeros in the entire logical region corresponding to the two-dimensional display region are obtained, unlike with the conventional tracking methods, it is not necessary to designate a starting zero point. Thus, imperfectness caused by ambiguity of the determining criterion of the starting zero point can be removed.

Since the pixel determining unit 12 automatically determines pixels in the two-dimensional display region corresponding to the positions of all zero points of the polynomial $f(x, y)$ in the logical region as pixels that represent a graphic to be displayed, the calculated results of the zero point calculating unit 11 are correlated with the two-dimensional display region.

In addition, the pixel data storing unit 13 stores pixel data with respect to pixels determined by the pixel determining unit 12. The display unit 14 can display points on a graph determined by $f(x, y)=0$ in the two-dimensional display region when each piece of pixel data or a predetermined amount of pixel data is stored in the pixel data storing unit 13. Also the display unit 14 can display the graph in the two-dimensional display region after all pixel data corresponding to zeros of the polynomial $f(x, y)$ has been stored in the pixel data storing unit 13.

Figure 6:
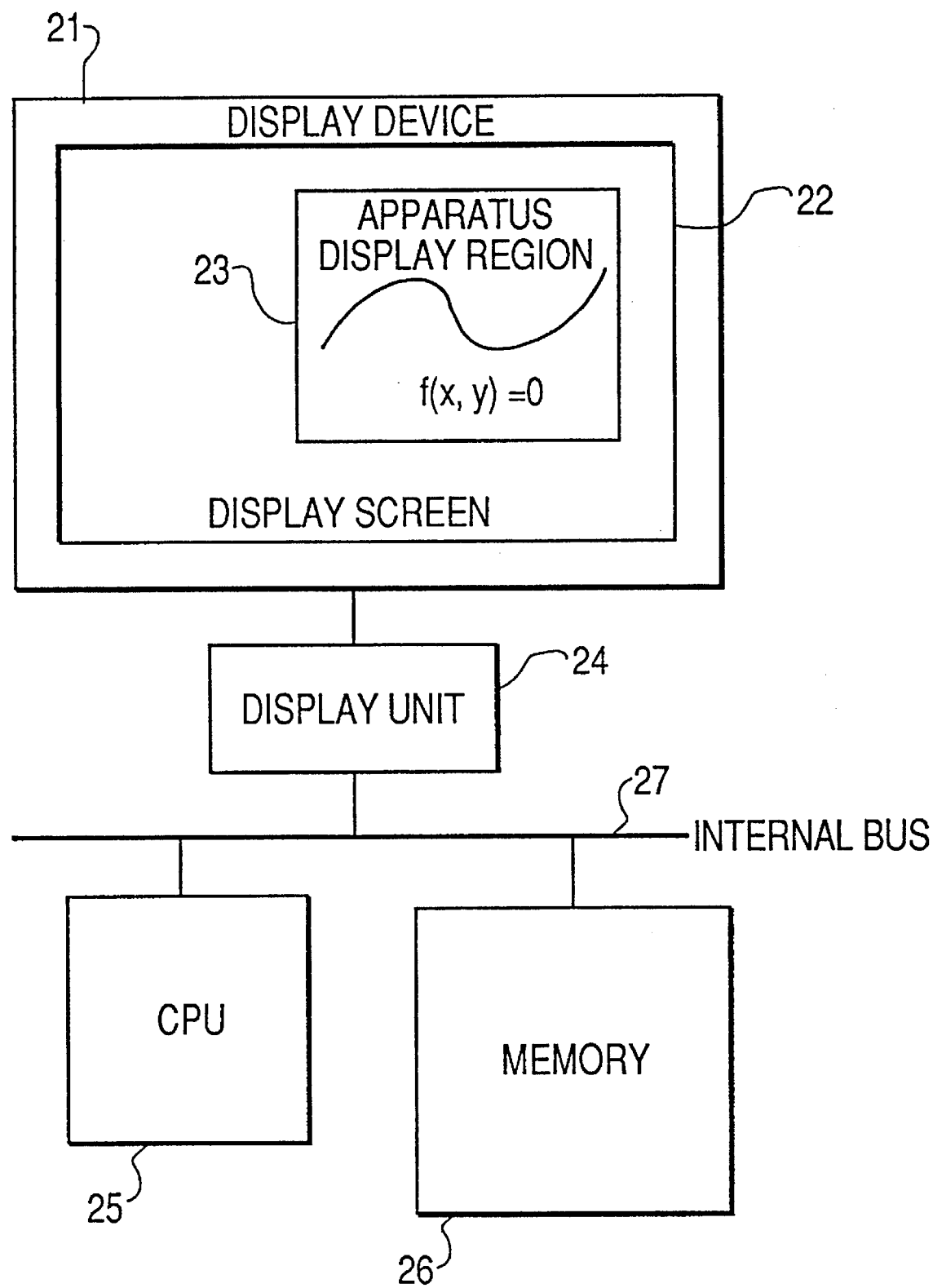
FIG. 6 is a schematic diagram showing a system configuration of a graphic drawing apparatus according to the present invention.

FIG. 6 is a schematic diagram showing a system configuration of a graphic drawing apparatus according to the present invention. The graphic drawing apparatus shown in FIG. 6 is accomplished by for example a workstation having a high resolution display device 21. The workstation further comprises a display unit 24, a CPU (Central Processing Unit) 25, and a memory 26. The display unit 24, the CPU 25, and the memory 26 are connected by an internal bus 27. The display unit 24 is connected to the display device 21. A display screen 22 of the display device 21 is composed of a large number of display pixels. All or a part of the region of the display screen 22 is used for displaying a graphic represented by $f(x, y)=0$ as an apparatus display region 23.

The CPU 25 executes plural programs or procedures stored in the memory 26 and calculates zeros of a polynomial $f(x, y)$. Corresponding to the calculated results, the CPU 25 determines pixels that represent a curve $f(x, y)=0$. The calculated results of zeros by the CPU 25 and information that represents the determined pixels are stored in the memory 26. This information is converted into pixel data corresponding to the determined pixels. The pixel data is stored in the memory 26 or a display memory (not shown). The display unit 24 receives the pixel data corresponding to the determined pixels through the internal bus 27, plots pixels in the apparatus display region 23 corresponding to the pixel data, and displays the graph of the curve $f(x, y)=0$ on the display screen 22.

According to this embodiment, the graph of the curve $f(x, y)=0$ is displayed on the display screen 22. However, it should be noted that the graph may be output to an output device such as a printer (not shown). In this case, the apparatus display region 23 is placed on an output image of the output device.

Next, with reference to FIGS. 7 to 10, a mapping of the apparatus display region 23 to a logical display region on a logical xy coordinate plane will be described.

Figure 7:
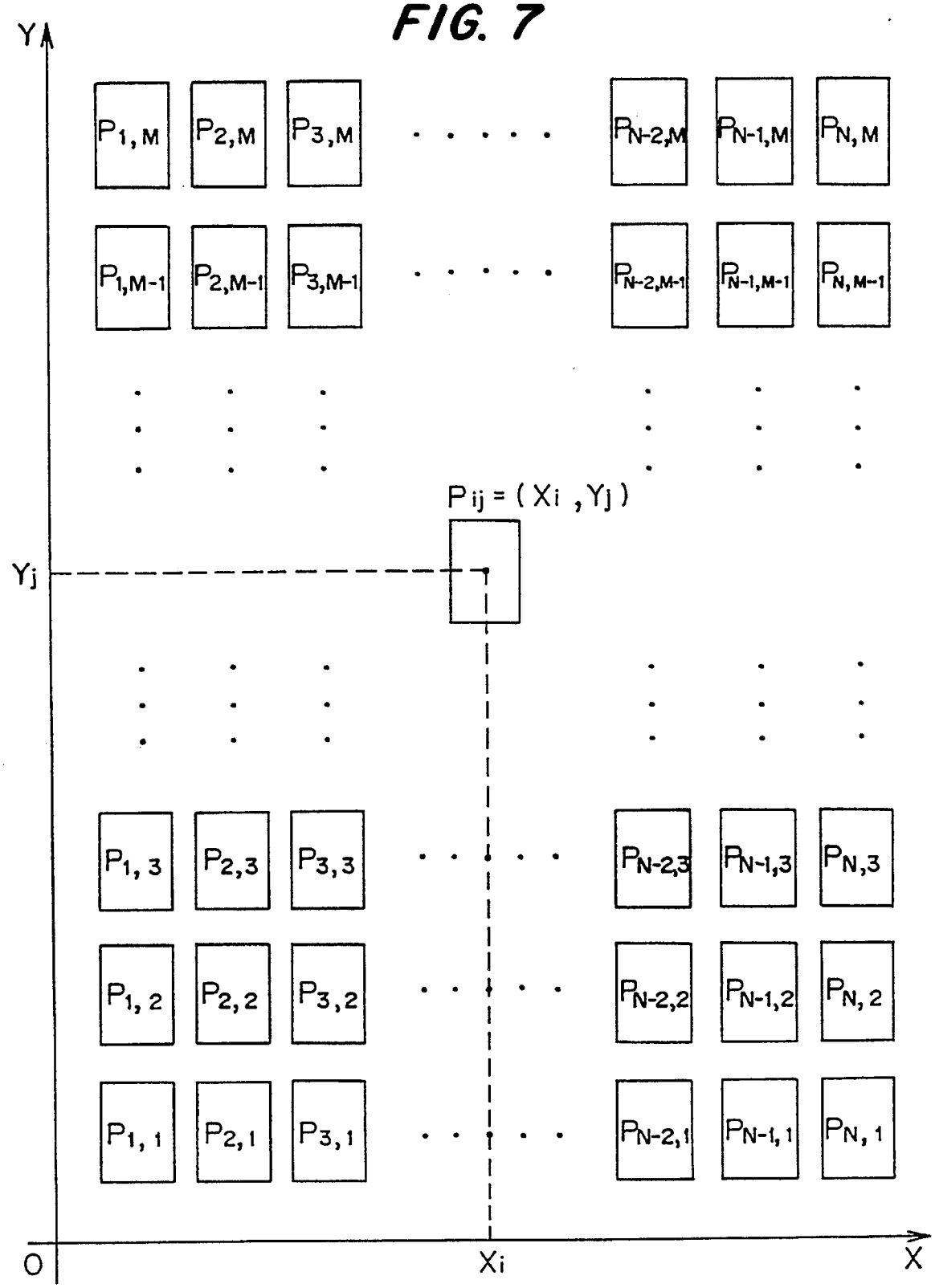
FIG. 7 is a schematic diagram showing pixels in an apparatus display region according to the present invention.

FIG. 7 is a schematic diagram showing an example of a pixel arrangement in the apparatus display region 23. The apparatus display region 23 of FIG. 7 is composed of N×M pixels arranged in an orthogonal lattice shape. The overall shape of the apparatus display region 23 is rectangular. The shape of each pixel is, for example rectangular. The center (the point of intersection of two diagonal lines) of each pixel is referred to as a representative point $P_{ij}$ (where i=1, 2, ..., N, and j=1, 2, ..., M). As shown in FIG. 7, an orthogonal coordinate system O-XY is employed on the apparatus display region 23 that is a physical plane with an origin O. The XY coordinate value of the representative point $P_{ij}$ is represented by $(X_i, Y_j)$.

Figure 8:
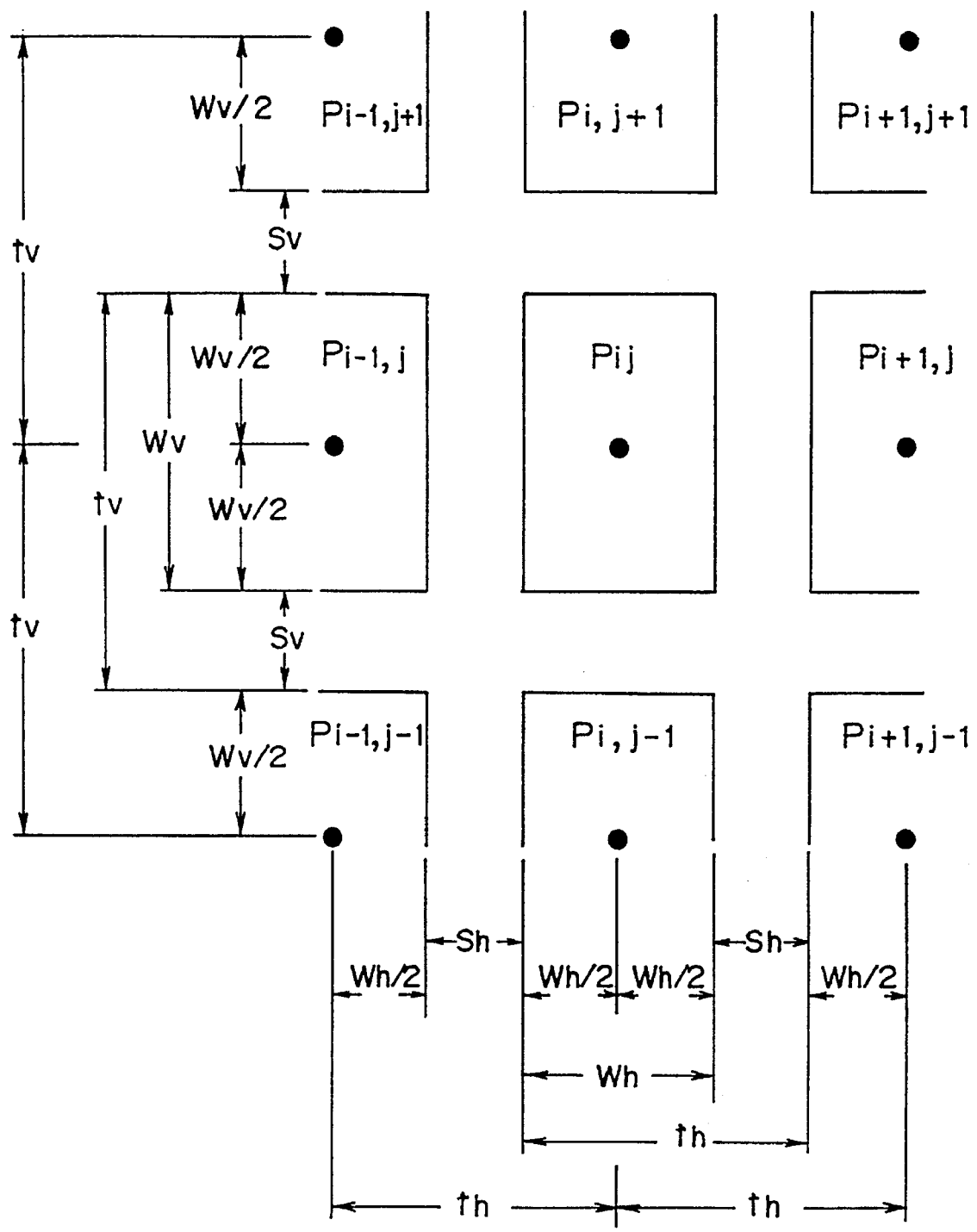
FIG. 8 is a schematic diagram showing physical dimensions of a pixel arrangement according to the present invention.

FIG. 8 is an enlarged view showing the vicinity of the representative point $P_{ij}$ of FIG. 7. In FIG. 8, $w_h$ and $w_v$ represents a horizontal pixel width and a vertical pixel width, respectively; $t_h$ and $t_v$ represent a horizontal pixel pitch and a vertical pixel pitch, respectively; and $s_h$ and $s_v$ represent a horizontal inter-pixel space $s_h$ and a vertical inter-pixel space $s_v$, respectively. $w_h$, $w_v$, $t_h$, $t_v$, $s_h$, and $s_v$ are physical dimensions for pixels that compose the apparatus display region 23. A representative point $P_{i-1,j}$ is a representative point immediately on the left of the representative point $P_{ij}$. The coordinates of the representative point $P_{i-1,j}$ is $(X_{i-1}, Y_j)$. A representative point $P_{i,j+1}$ is a representative point immediately on the upper side of the representative point $P_{ij}$. The coordinates of the representative point $P_{i,j+1}$ is $(X_i, Y_{j+1})$. This rule applies to other representative points.

Figure 9:
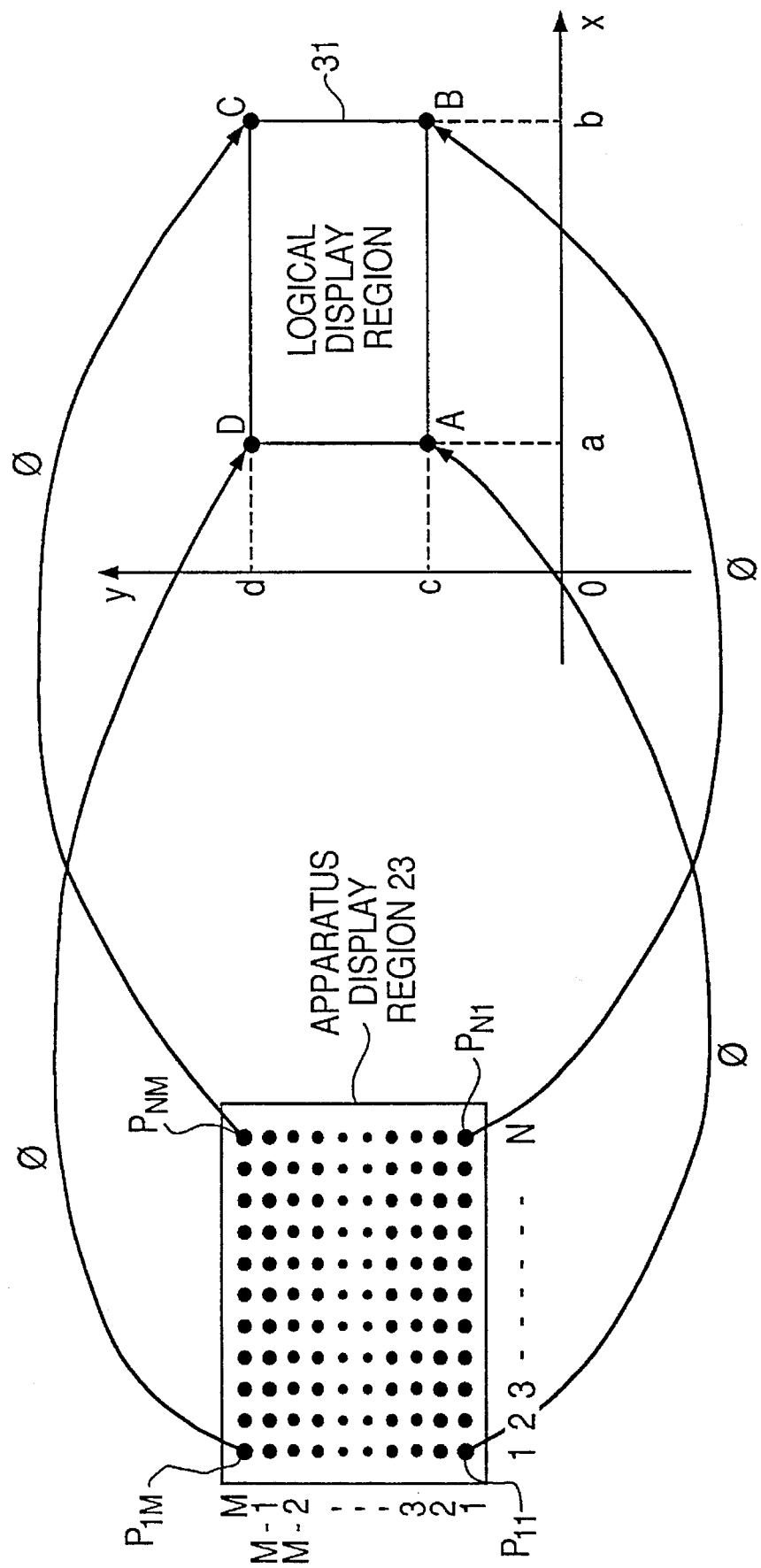
FIG. 9 is a schematic diagram showing a relation between an apparatus display region and a logical display region according to the present invention.

FIG. 9 is a schematic diagram showing a relation between the apparatus display region 23 and the logical display region 31 on the xy coordinate plane. A point represented by the coordinate system O-XY in the apparatus display region 23 is mapped to a point on the xy coordinate plane in the logical orthogonal coordinate system o-xy by a mapping $\phi$ as follows.

$$\phi:(X, Y) \to (x, y) \tag{4}$$

o represents the origin of the coordinate system o-xy. Thus, the mapping $\phi$ represents a coordinate conversion from a point (X, Y) on the coordinate system O-XY to a point (x, y) on the coordinate system o-xy. The logical display region 31 is a logical region into which the apparatus display region 23 is mapped by the mapping $\phi$.

With the horizontal pixel pitch $t_h$ and the vertical pixel pitch $t_v$ shown in FIG. 8, the mapping $\phi$ is given by the following expression, for example.

$$x = a + (X - X_1)(b-a)/t_h(N-1)$$

$$y = b + (Y - Y_1)(d-c)/t_v(M-1) \tag{5}$$

$$P_{11} = (X_1, Y_1)$$

where $X_1$ and $Y_1$ are X and Y coordinates of the representative point $P_{11}$, respectively. The representative points $P_{11}$, $P_{N1}$, $P_{NM}$, and $P_{1M}$ are mapped to points on the xy coordinate plane A=(a, c), B=(b, c), C=(b, d), and D=(a, d) by the mapping $\phi$ of the expressions (4) and (5), respectively, (where a<b and c<d). In other words, all points in a rectangular region in the apparatus display region 23 with verteces $P_{11}$, $P_{N1}$, $P_{MN}$, and $P_{1M}$ are mapped to points in the logical display region 31 on the xy coordinate plane with verteces A, B, C, and D, respectively. For example, when a representative point $P_{ij}=(X_i, Y_j)$ shown in FIG. 7 is mapped to a point $p_{ij}=(x_i, y_j)$ on the xy plane by the mapping $\phi$, the following equations hold as shown in FIGS. 7 and 8.

$$X_i = X_1 + (i-1)t_h$$
$$Y_j = Y_1 + (j-1)t_v \quad (6)$$

Thus, from the expressions (5) and (6), the following equations are obtained.

$$x_i = a + (i-1)(b-a)/(N-1)$$
$$y_j = c + (j-1)(d-c)/(M-1) \quad (7)$$

When the following $g_x$, $g_y$ are given, $$g_x = (b-a)/(N-1)$$
$$g_y = (d-c)/(M-1) \quad (8)$$

The expression (7) can be rewritten in the following form.

$$x_i = a + (i-1)g_x$$
$$y_j = c + (j-1)g_y \quad (9)$$

$g_x$ of the expression (8) is equivalent to the length which is obtained by dividing the interval [a, b] on the x axis by $N-1$; and $g_y$ is equivalent to the length which is obtained by dividing the interval [c, d] on the y axis by $M-1$.

Figure 10:
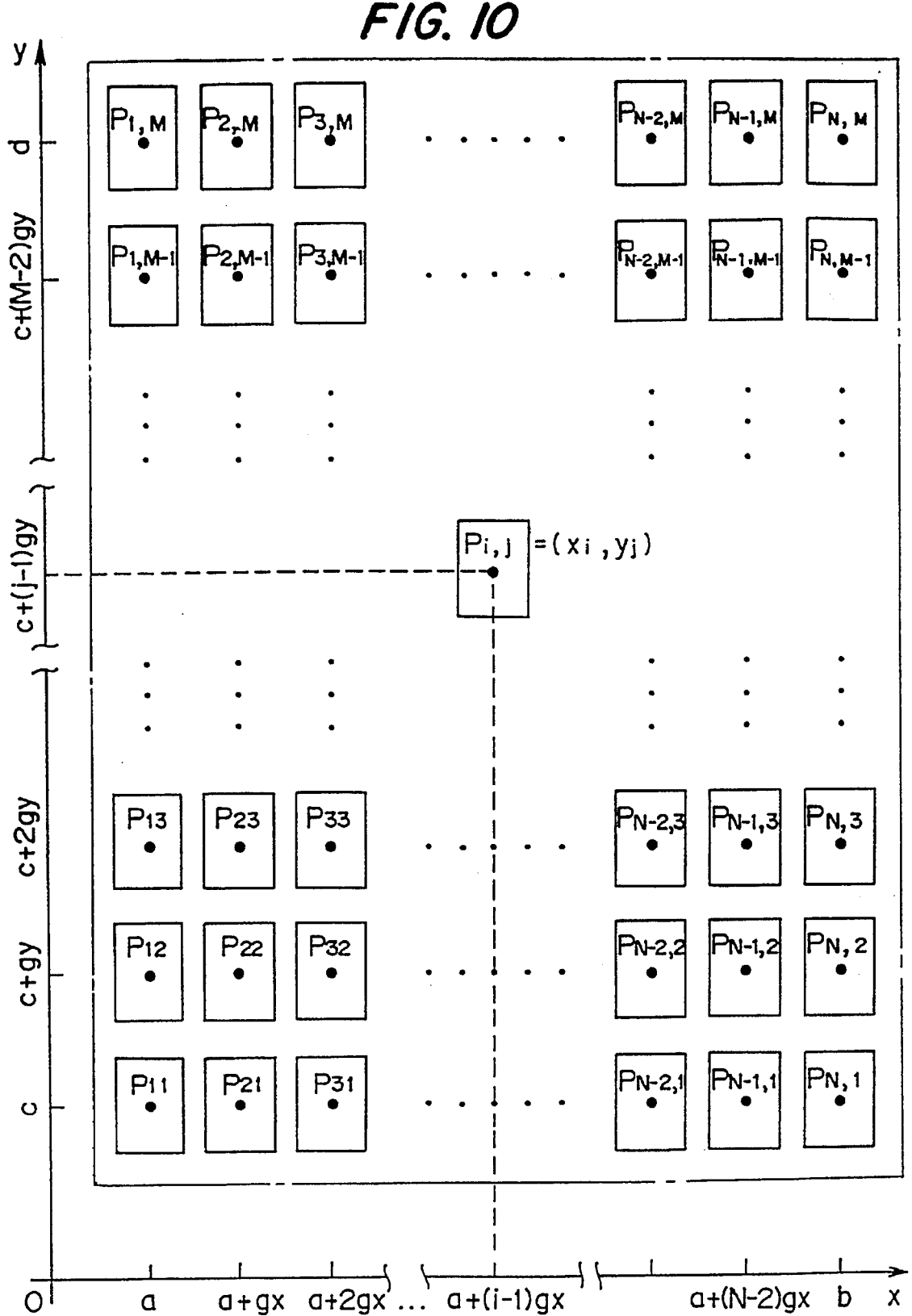
FIG. 10 is a schematic diagram showing representative points in the logical display region according to the present invention.

FIG. 10 is a schematic diagram showing points $p_{ij}=(x_i, y_j)$ (where $i=1, 2, \ldots, N$ and $j=1, 2, \ldots, M$) plotted on the xy plane corresponding to the representative point $P_{ij}=(X_i, Y_j)$ using the expression (9) (where $0<a<b$ and $0<c<d$). In FIG. 10, a rectangular region that surrounds each point $p_{ij}$ represents a region into which a pixel region corresponding to the representative point $P_{ij}$ is mapped by the mapping $\phi$. In addition, a region denoted by chain lines represents a region equivalent to the apparatus display region 23 shown in FIG. 9. Thus, the point $p_{ij}$ is a representative point of a pixel in the logical display region 31. The representative points $p_{11}$, $p_{N1}$, $p_{NM}$, and $p_{1M}$ accord with the points A, B, C and D shown in FIG. 9, respectively.

In FIG. 10, $g_x$ represents the distance between two adjacent representative points $p_{ij}$ and $p_{i+1,j}$ in x direction; and $g_y$ represents the distance between two adjacent representative points $p_{ij}$ and $p_{i,j+1}$ in y direction.

In the example shown in FIGS. 7 to 10, the display device 21 with the display screen 22 having plural pixels arranged in an orthogonal lattice shape is assumed. However, the embodiment of the present invention is not limited to the display screen 22 of this type. Instead, pixels on the display screen 22 may be arranged in an oblique lattice shape. In addition, pixels may be arranged in a more general lattice shape including a spiral lattice shape. Moreover, the shape of pixels is not limited to a rectangle. The positions of the representative points may be arbitrarily defined. The shape of the apparatus display region 23 may also be other than a rectangle.

According to the present invention, the coordinates of representative points of pixels arranged in a lattice shape and pitches thereof are essentially important. Corresponding to the coordinates and pitches, a proper logical display region and a mapping for mapping each representative point to the logical display region are selected.

Next, for the following polynomial $$f(x, y) = x - y_4 \quad (10)$$

a method for drawing a graph represented by $f(x, y)=0$ (where $-2 \leq x \leq 2$ and $-2 \leq y \leq 2$) will be described.

First, with a pitch of 1/100 in the range of $-2 \leq x \leq 2$, 401 x-coordinate values $x_i = i/100$ (where $i = -200, -199, \ldots, 0, \ldots, 199$, and 200) are plotted. In other words, the region of $-2-1/200 \leq x \leq 2+1/200$ and $-2-1/200 \leq y \leq 2+1/200$ is divided by pitches of 1/100 in y direction. Thus, 401 vertical rectangular blocks (x-direction unit regions) are formed. The representative x coordinate of each vertical rectangular block is xi.

In addition, in the region of $-2 \leq y \leq 2$, 401 y-coordinate values $y_j = j/100$ (where $j = -200, 199, \ldots, 0, \ldots, 199$, and 200) are plotted with pitches of 1/100. In other words, the region of $-2-1/200 \leq x \leq 2+1/200$ and $-2-1/200 \leq y \leq 2+1/200$ is divided by pitches of 1/100 in y direction. Thus, 401 horizontal rectangular blocks (y-direction unit regions) are formed. The representative y coordinate of each horizontal rectangular block is $y_j$.

Thereafter, each representative x coordinate $x_i$ is substituted into x of the expression (10) so as to obtain a real zeros for y of $f(x_i, y) = x_i - y^4$ (a real root of an equation $x_i - y^4 = 0$ with respect to y). In this case, since the form of the polynomial $f(x, y)$ is rather simple, the position of the zeros can be obtained without need to use a Strum sequence.

Figure 11:
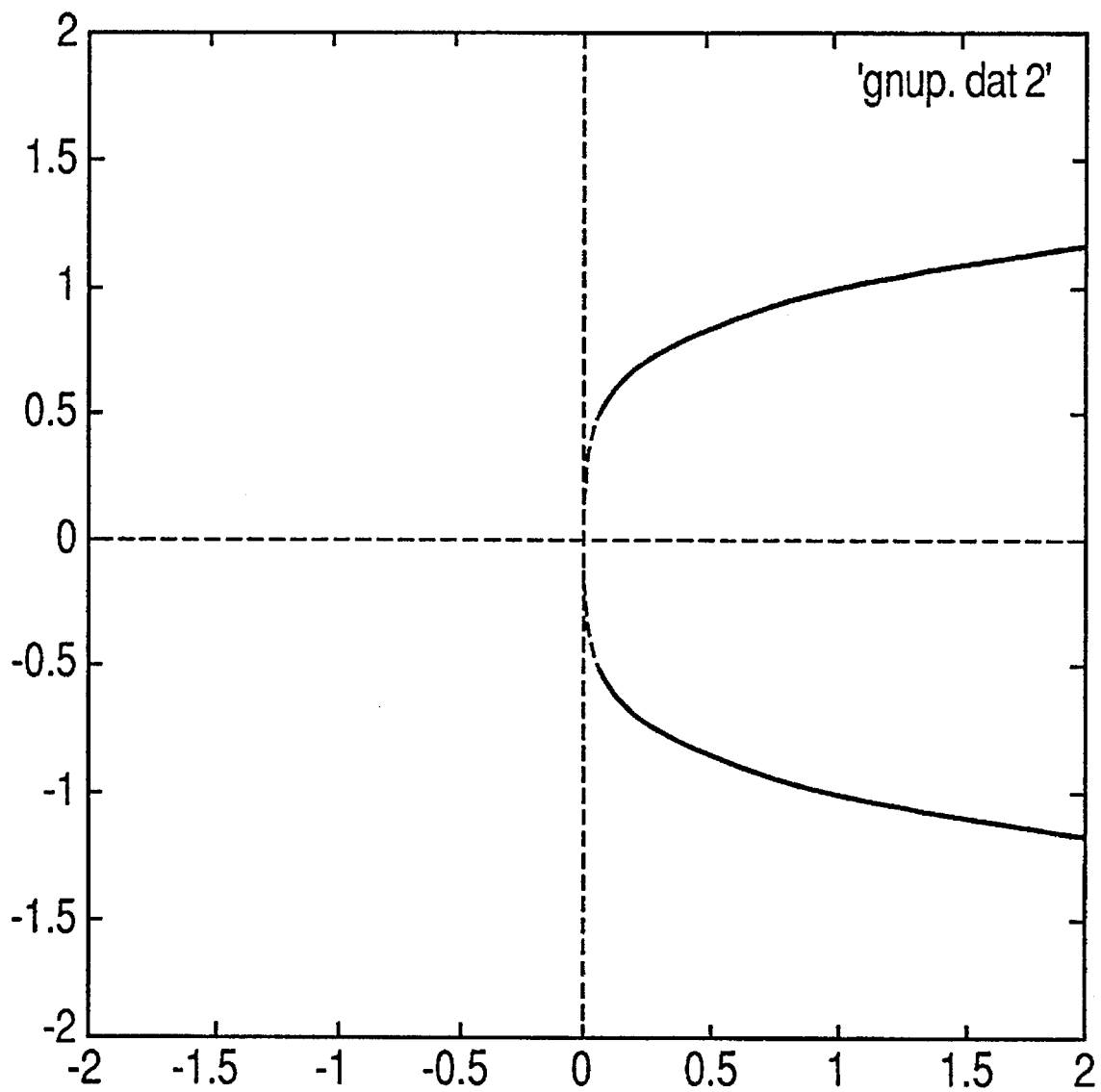
FIG. 11 is a schematic diagram showing a graph of a curve $x-y^4=0$ drawn according to the present invention.

In this example, two real roots $\pm r_i$ (where $i>0$) of the equation $x_i - y^4 = 0$ are obtained with an accuracy of four digits under decimal point corresponding to Newton's method, which is well known as an approximating solution of a non-linear equation. In FIG. 11, two representative points $(x_i, \pm r_i)$ corresponding to the two real roots $\pm r_i$ are mapped to pixel representative points in the apparatus display region 23 by an inverse mapping $\phi^{-1}$ of the mapping $\phi$. The pixels including the pixel representative points are plotted, pixel by pixel. Here, when $x_i = 0$, $r_i = 0$. In the region of $x_i < 0$, although the Newton's method cannot be used, since it is clear that there are no roots in this region, the process for calculating the roots is omitted.

Besides the Newton's method, as a numerical calculation method that obtains approximated values of all roots of the equation $f(x_i, y) = 0$ including complex roots, DKA (Durand-Kerner-Aberth) method is well known. Although an approximated solution of the equation $x_i - y^4 = 0$ can be obtained by the DKA method, when the approximated solution includes proximate roots or a multiple root, a real root has an imaginary part. Thus, another precaution is required unlike with the Newton's method. In the zero calculation of this embodiment, it is also allowable to obtain zeros by a method other than the method of the Strum sequence, the Newton's method, and the DKA method.

Figure 12:
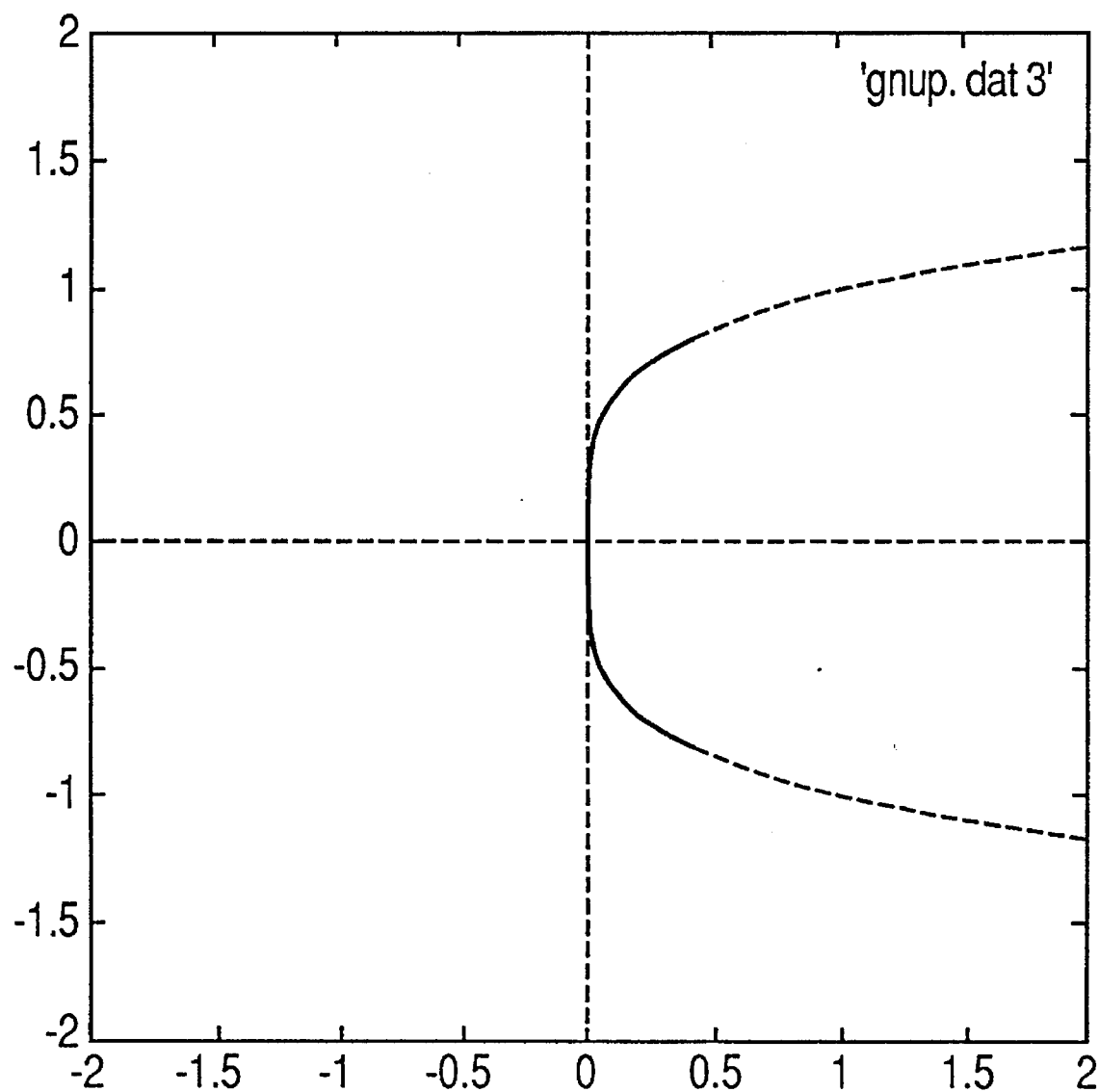
FIG. 12 is a schematic diagram showing a graph of a curve $x-y^4=0$ drawn according to the present invention.

Next, each representative y coordinate $y_j$ is substituted into y of the expression (10) so as to obtain a real zero point with respect to x of $f(x, y_j) = x - y_j^4$ (a real root of equation $x - y_j^4 = 0$ with respect to x). Since the equation is a linear equation with respect to x, a real root $q_j = y_j^4$ can be directly calculated. FIG. 12 is a graph showing that representative points $(q_j, y_j)$ corresponding to real roots $q_j$ are mapped to pixel representative points in the apparatus display region 23 by the inverse mapping $\phi^{-1}$ of the mapping $\phi$ and pixels including the pixel representative points are plotted, pixel by pixel.

In FIG. 11, points in the vicinity of $x=0$ are lost and thereby the resultant graph is not continuous. In FIG. 12, points in the region of $x>0$ that is far from the origin are lost and thereby the resultant graph is not continuous.

Figure 13:
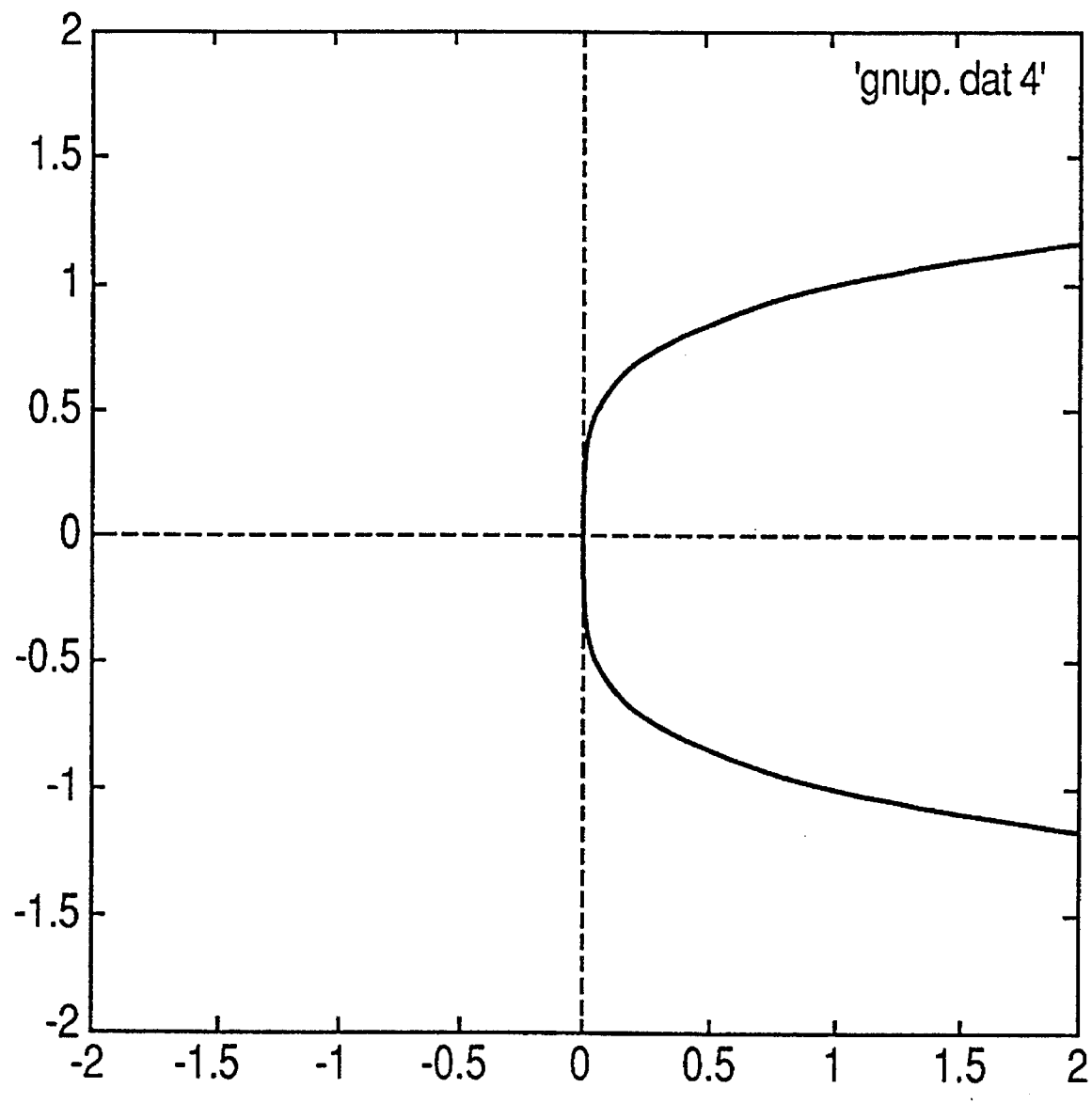
FIG. 13 is a schematic diagram showing a graph of a curve $x-y^4=0$ drawn according to the present invention.

Next, both the pixels shown in FIG. 11 and the pixels shown in FIG. 12 are displayed in the same apparatus display region 23 at the same time. In reality, using both dividing methods of vertical rectangular blocks and horizontal rectangular blocks, all zero points $(x_i, \pm r_i)$ and pixels corresponding to $(q_j, y_j)$ are plotted on the apparatus display region 23. FIG. 13 shows a graph of the resultant graphic represented by $f(x, y)=0$.

In FIG. 13, the calculated results in the vertical direction and the calculated results in the horizontal results are compensating each other well. Thus, in the entire region, pixels are not remarkably lost and thereby an almost continuous graph is formed. A slight distortion in the graph shown in FIG. 13 is caused by a rounding error in the numerical calculation.

As shown in FIG. 13, when the logical display region is divided in vertical and horizontal directions and zero point calculation in both the directions is employed, a graph of a graphic can be more precisely drawn. However, when the form of the function $f(x, y)$ becomes more complicated, it is very difficult to automatically obtain all real roots of the equation $f(x, y)=0$ by the Newton's method or the like. Next, a method for obtaining all real zero points of a general polynomial $f(x, y)$ using zero point determination corresponding to the above-described Sturm sequence will be described as an embodiment of the present invention.

Generally, depending on characteristics of a given polynomial (for example, when an equation has a multiple root or a proximate root), calculation of floating-point arithmetic operation of a Sturm sequence may not be correctly executed due to an error of numerical calculation.

In this embodiment, arbitrary digit calculation is performed for calculating coefficients of a polynomial so as to remove such an adverse condition. In the following, a calculating method using a rational number will be described. However, the calculating method is not limited to such a method. Instead, a calculating method using arbitrary floating-point arithmetic operation can be used.

In the computer, any positive integer $\zeta$ can be represented in β-adic representation. In other words, when β is a positive integer of, β>1, a non-negative integer r and a non-negative integer $\zeta_i$ (where i=0, 1, . . . , r) satisfying the following expression are uniquely obtained, satisfying, $$\zeta = \zeta_0 + \zeta_1\beta + \zeta_2\beta^2 + \ldots + \zeta_r\beta^r \quad (11)$$

$0 \leq \zeta_i < \beta \text{(where } i=0, 1, \ldots, r\text{)}$ $\zeta_r \neq 0$ where β is referred to as a radix of this representation; and r+1 is referred to as a number of digits of $\zeta$ with respect to the radix β.

The sige of the cardinal number β is preferably one word or less (a word is a basic calculating unit of the computer). When β is defined in such a manner, the positive integer $\zeta$ can be represented by a list or an array using a pointer in the memory 26 of the computer.

Now, as shown in FIG. 14, (r+2) words of address a to address (α+r+1) are successively arranged. Algorithm for arithmetic operations of positive integers in this representation can be are obvious and easy to perform. Imagine the way you do by hand at a primary school. For example, a positive integer $\zeta=847$ with $\beta=10$ is represented in data structure of the memory as shown in FIG. 15.

Any rational number R can be uniquely represented by an irreducible fraction $R=P/Q$ in which common factors of the denominator and numerator are reduced, up to the signs of P and Q. In the above, P and Q are integers such that gcd (P, Q)=1. gcd (P, Q) represents the greatest common divisor of P and Q.

When both the denominator and the numerator are chosen from positive integers (namely, P>0 and Q>0) and signs of positive, negative, and zero are separately denoted, any rational number can be represented by a tube of four data items (rational, Sign, P, Q). "rational" is an identifier meaning that the tuple represents a rational number. "Sign" is a symbol that represents the sign of the rational number. The symbol is one of "positive", "negative", and "zero". P and Q are positive integers corresponding to the above described representation of positive integers. gcd (P, Q)=1.

When Sign=zero, regardless of the values of P and Q, the tuple (rational, Sign, P, Q) represents a rational number 0. When Sign=positive, the tuple represents a rational number P/Q. When Sign=negative, the tuple represents a rational number $-P/Q$.

Figure 16:
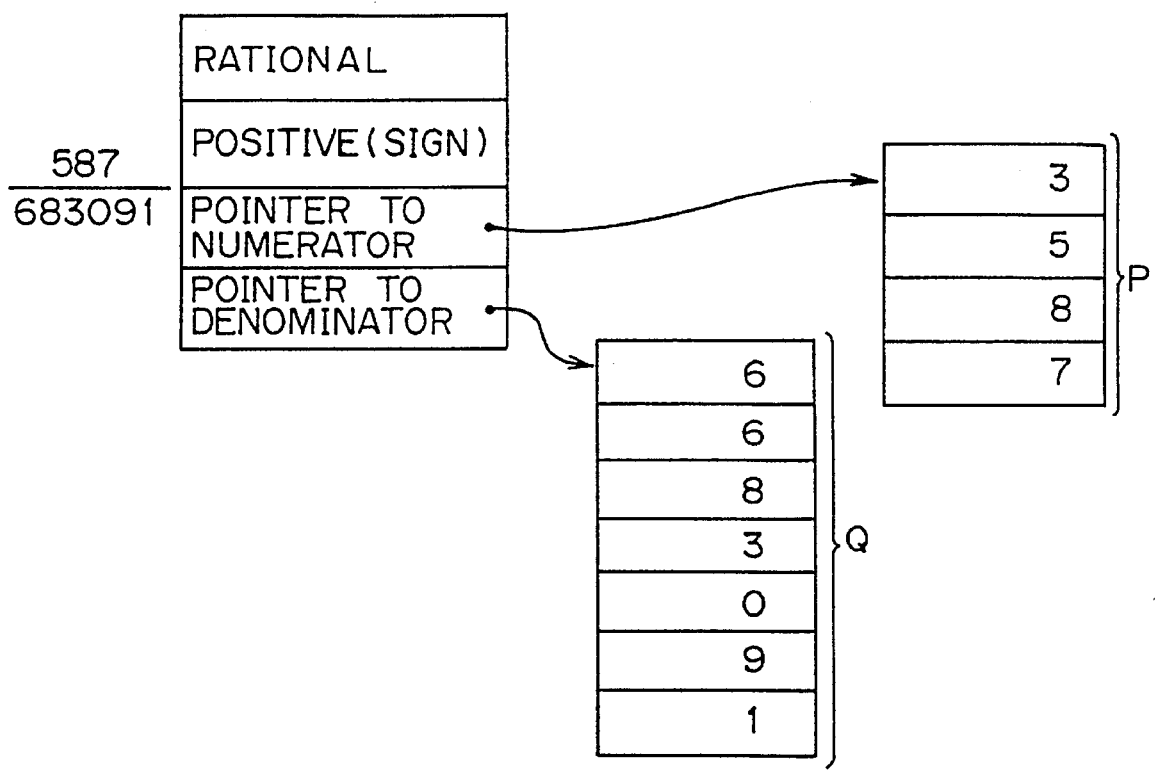
FIG. 16 is a schematic diagram showing a representation of a rational number 587/683091 in a memory according to the present invention.

FIG. 16 shows an example of a representation of a rational number (rational, Sign, P, Q) in the memory 26. In FIG. 16, a rational number 587/683091=(rational, positive, 587, 683091) is represented. In this example, P=587 and Q=683091 are stored in the memory 26 in the representation of a positive integer of which the radix β is 10. The identifier "rational", the sign "positive", a pointer to the numerator, that represents the storage position of the positive integer P, and a pointer to the denominator, that represents the storage position of the positive integer Q are stored in succession.

The arithmetic operations in rational numbers in such a representation can be easily performed in a similar manner as you do by hand.

Next, a representation of a polynomial in the computer will be described.

As a representation of a polynomial used for calculating a Strum sequence, it is convenient to use a recursive cannonical form. In this representation, a polynomial $f(x_{(1)}, x_{(2)}, \ldots, x_{(n)})$ in n variables $x_{(1)}, x_{(2)}, \ldots, x_{(n)}$ is treated as a polynomial with degree m in variable $x_{(1)}$. This resultant polynomial is represented as follows.

$$f(x_{(1)}, x_{(2)}, \ldots, x_{(n)}) = \sum_{i=0}^{m} f_{(1)}^{[i]}(x_{(2)}, x_{(3)}, \ldots, x_{(n)})x_{(1)}^i \quad (12)$$

When the coefficient at the i-th power $f_{(1)}^{[i]}(x_{(2)}, x_{(3)}, \ldots, x_{(n)})$ (where i=0, 1, . . . , m) of an i-th order term with respect to $x_{(1)}$ is not constant and contains another variable $x_{(k)}$ other than $x_{(1)}$, it is represented as a polynomial with respect to $x_{(k)}$ in a similar way as in the expression (12). For example, when $f_{(1)}^{i}(x_{(2)}, x_{(3)}, \ldots, x_{(n)})$ contains a variable $x_{(2)}$, it is considered as a polynomial with respect to the variable $x_{(2)}$. Likewise, the similar representations are recursively repeated.

When a polynomial in the recursive cannonical form is represented in the memory 26 of the computer, as with the case of an integer, an array or a list can be used. For simplicity, only the method using an array will be described.

A polynomial $f(x)=a_nx^n+a_{n-1}x^{n-1}+\ldots+a_2x^2+a_1x+a_0$ is stored as an array of an identifier "polynomial", a variable x, the degree n, and coefficients $a_n, a_{n-1}, \ldots, a_1, a_0$ in a memory region of (n+4) words.

Figure 17:
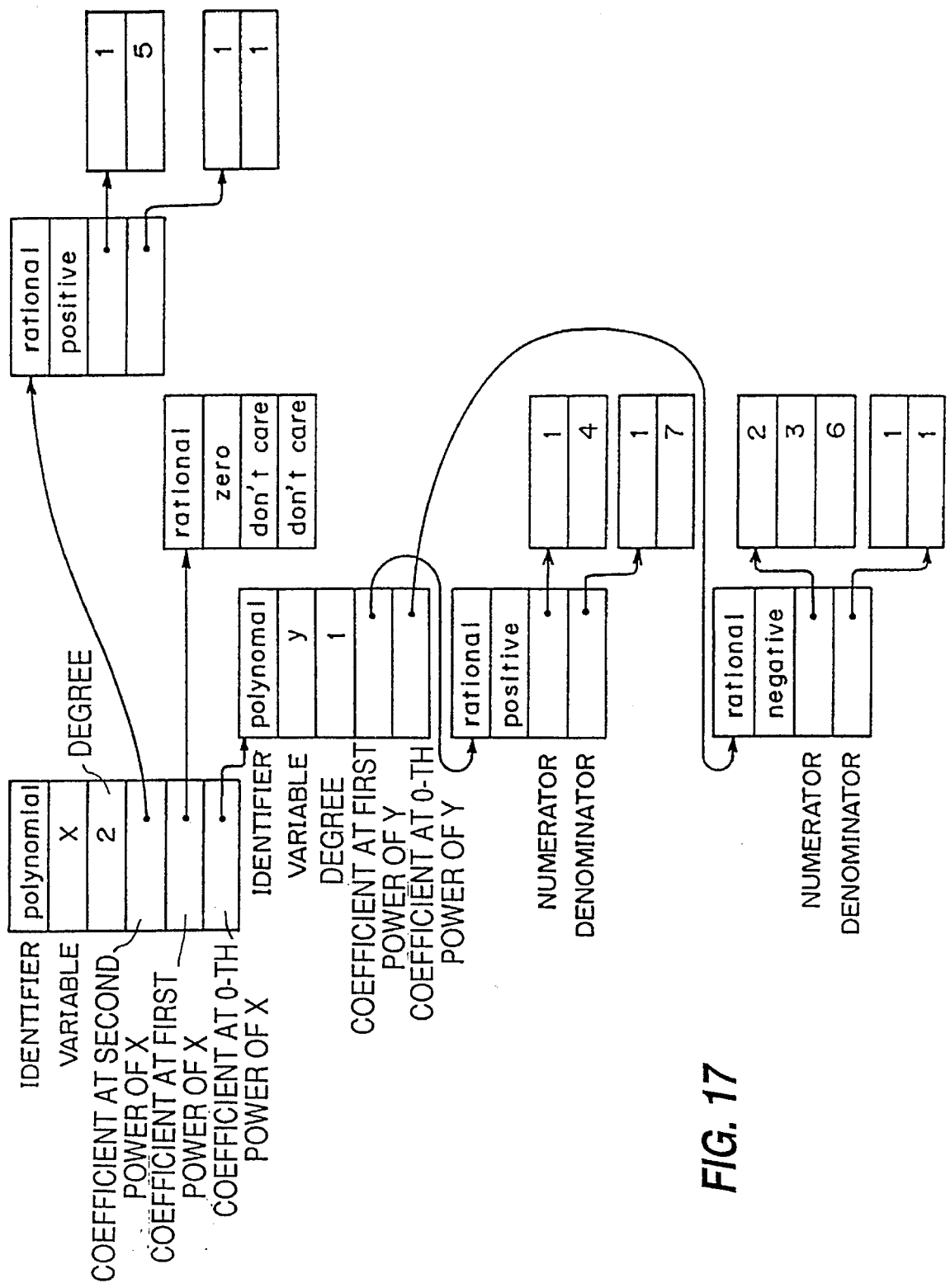
FIG. 17 is a schematic diagram showing a representation of a polynomial $5x^2+(4/7)y-36$ in a memory according to the present invention.

For example, the following bivariate polynomial with respect to variables x and y is represented in the memory 26 as shown in FIG. 17.

$$f(x,y) = 5x^2 + \frac{4}{7}y - 36 \quad (13)$$

In FIG. 17, like the case shown in FIGS. 15 and 16, β=10 is set as a radix for of a positive integer used for representing rational numbers in the coefficients.

In FIG. 17, the polynomial of the expression (13) is represented as a polynomial with degree 2 in variable x. An identifier "polynomial", a variable "x", the degree "2", a pointer that represents the storage position of the coefficient at the second power of x, pointer that represents the storage position of coefficient at the first power of x, and a pointer that represents the storage position of the coefficient at the zero-th power of x are stored in succession. The coefficient at the zero-th power of x is represented as a polynomial with degree 1 in the variable y in the same manner.

The arithmetic operations and substitution into such a polynomial can be easily performed in a similar manner as you do by hand. The zero point calculation using Sturm sequence (that will be described later) is performed using the representation of a positive integer, a rational number, and a polynomial described above.

Figure 18A:
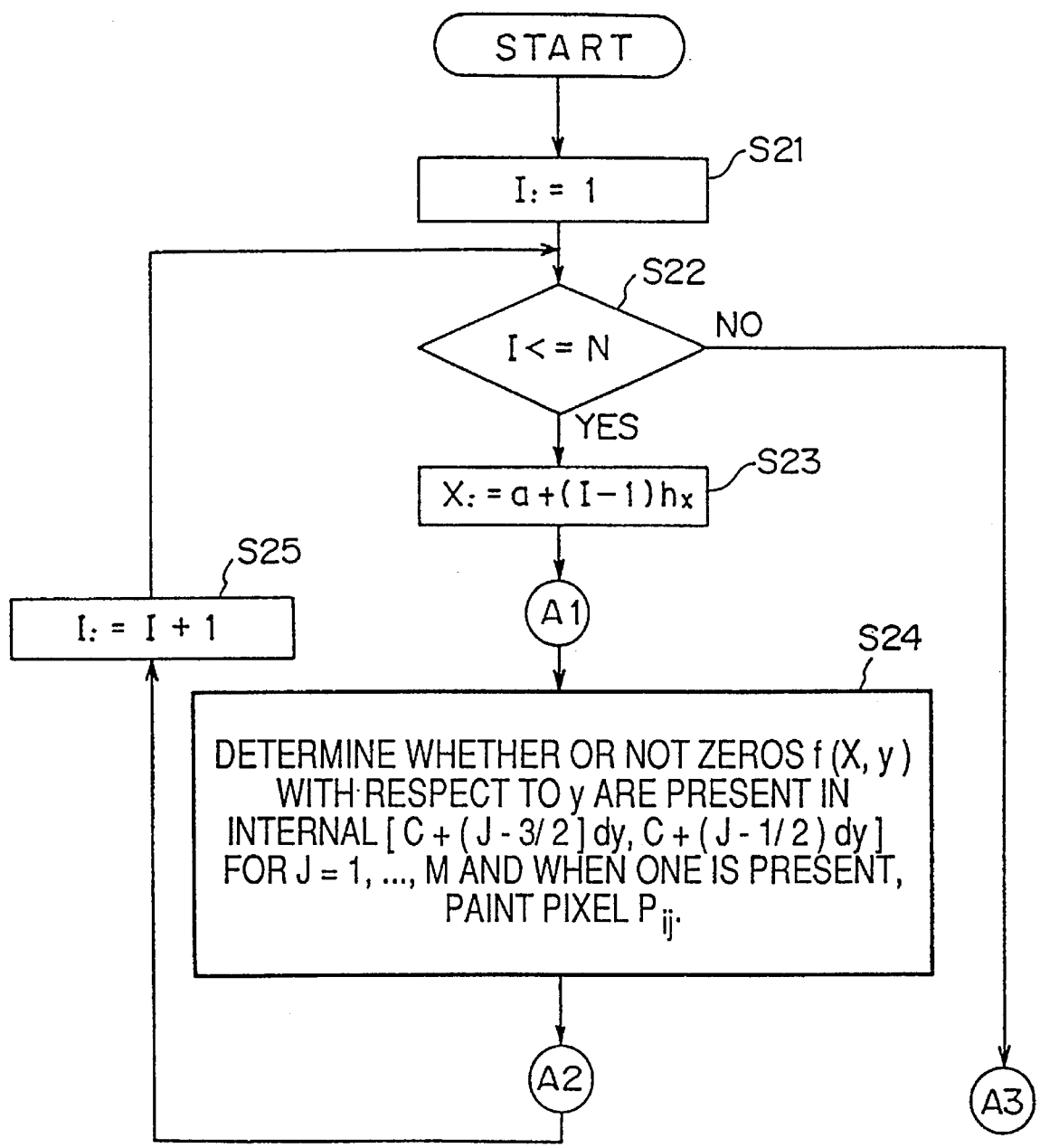
FIG. 18A is a flow chart showing a drawing process according to the present invention (No. 1)
Figure 18B:
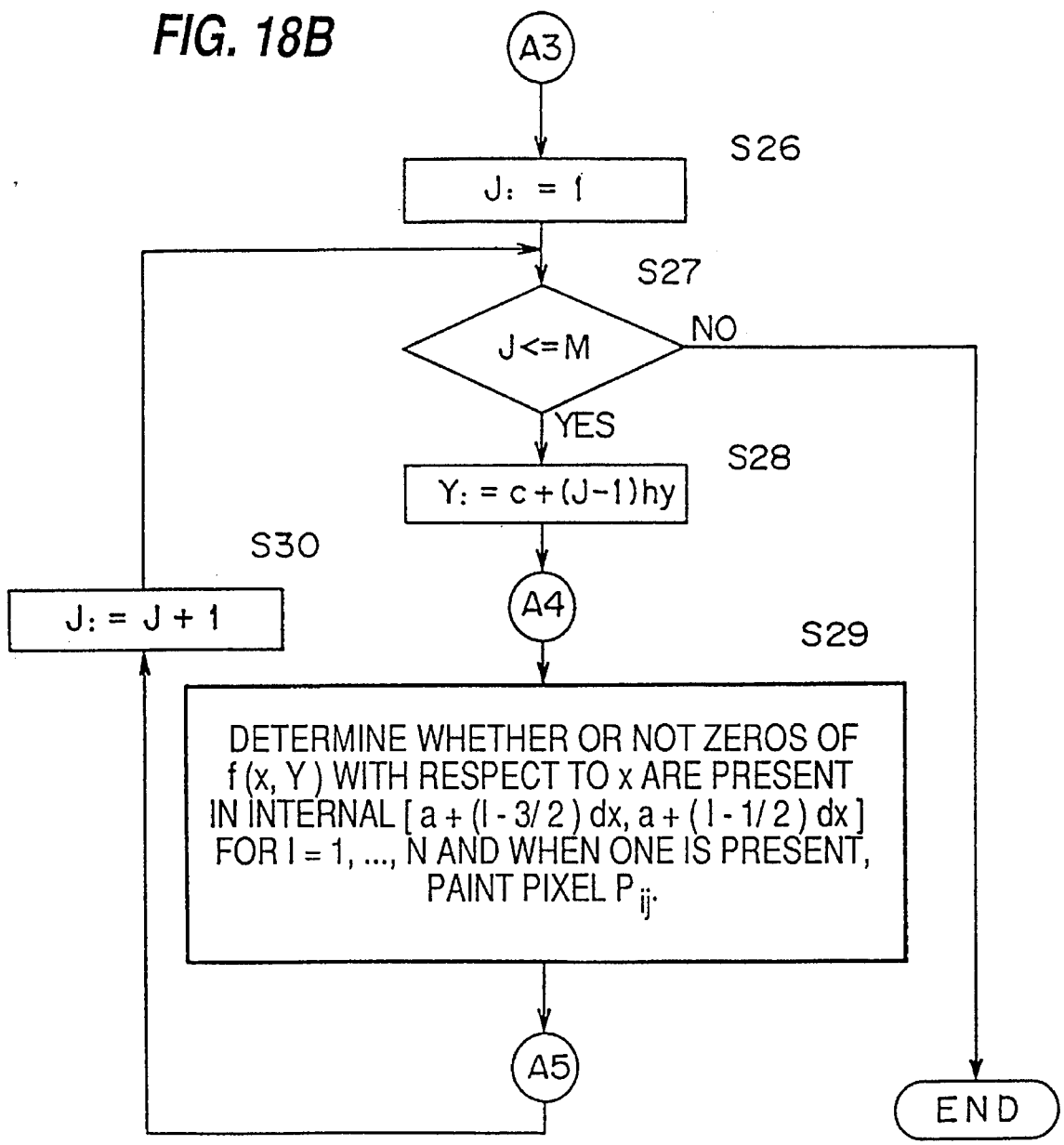
FIG. 18B is a flow chart showing the drawing process according to the present invention (No. 2)
Figure 19:
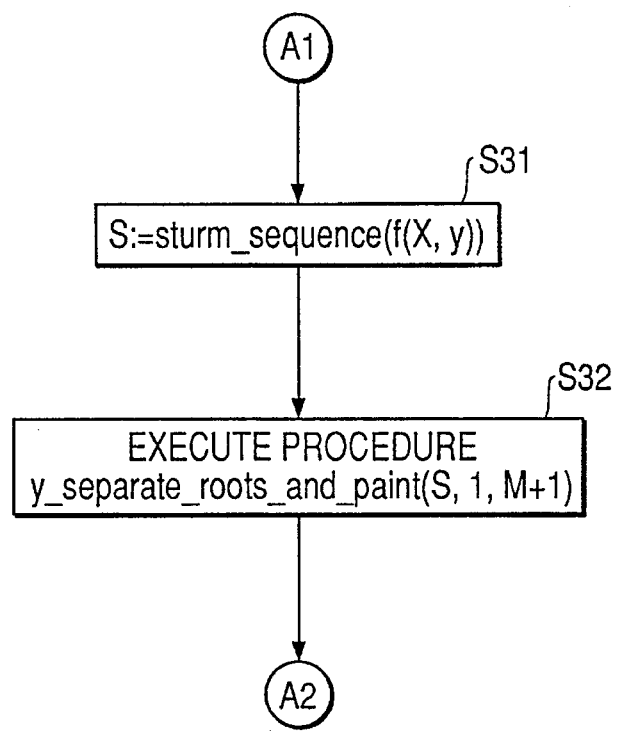
FIG. 19 is a flow chart showing a process for vertical rectangular blocks according to the present invention.
Figure 20:
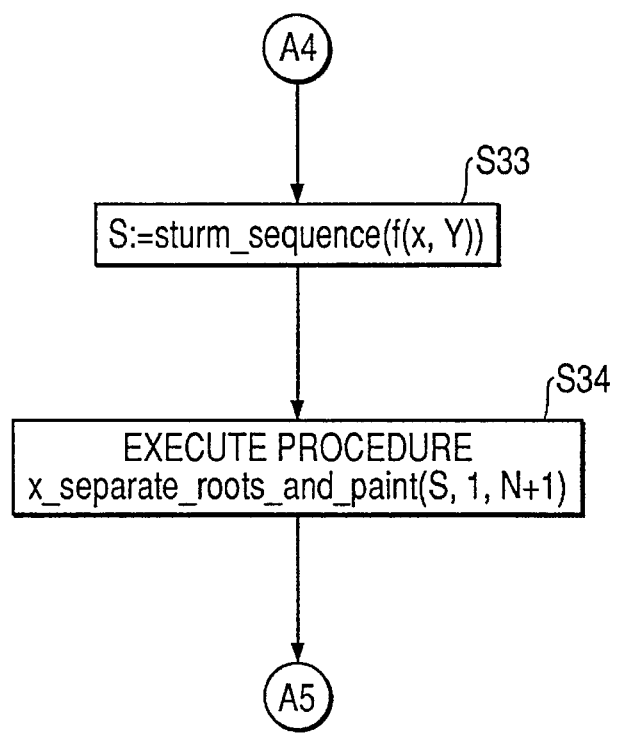
FIG. 20 is a flow chart showing a process for horizontal rectangular blocks according to the present invention.
Figure 21A:
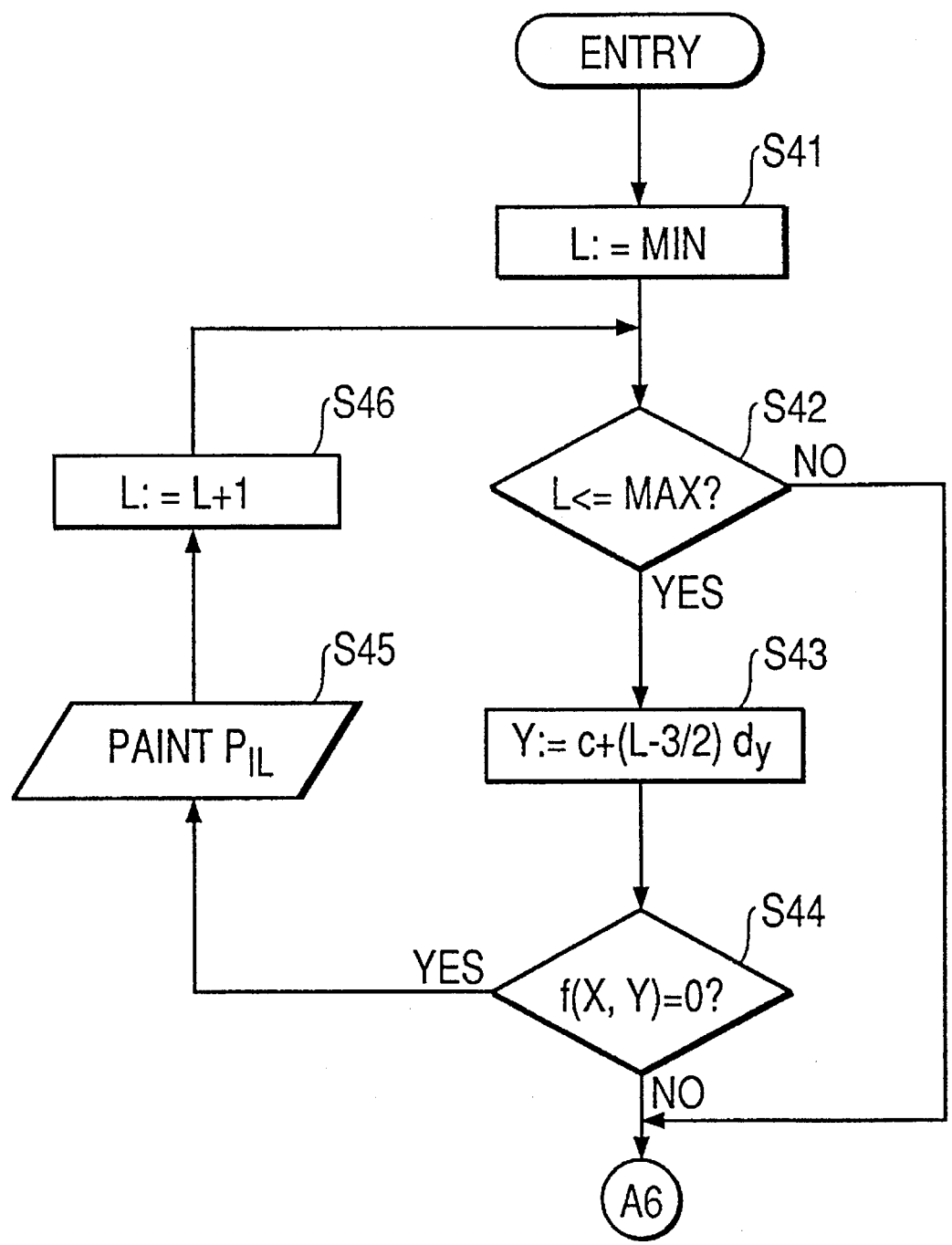
FIG. 21A is a flow chart showing the content of the process for the vertical rectangular blocks according to the present invention (No. 1)
Figure 21B:
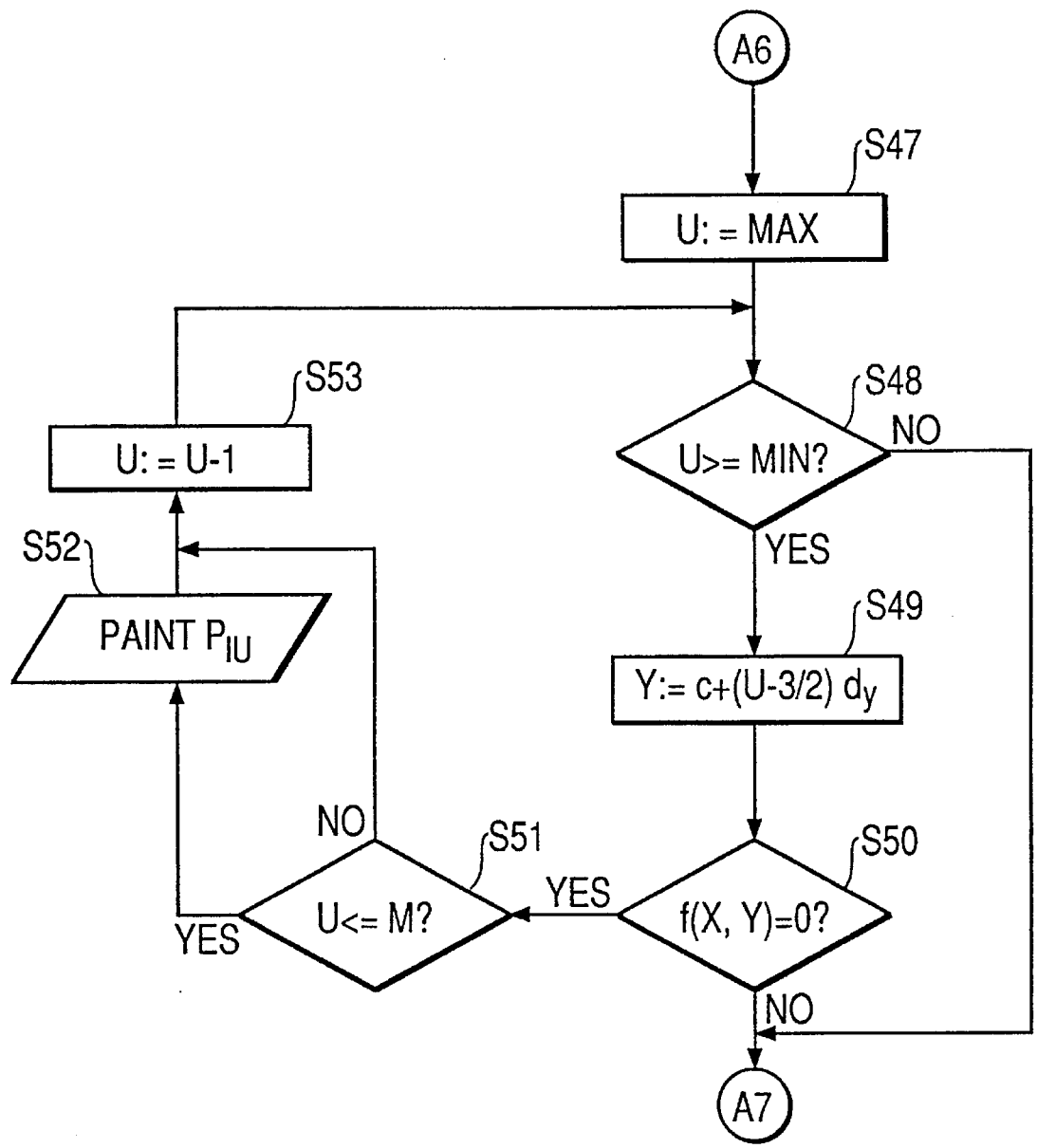
FIG. 21B is a flow chart showing the content of the process for the vertical rectangular blocks according to the present invention (No. 2)
Figure 21C:
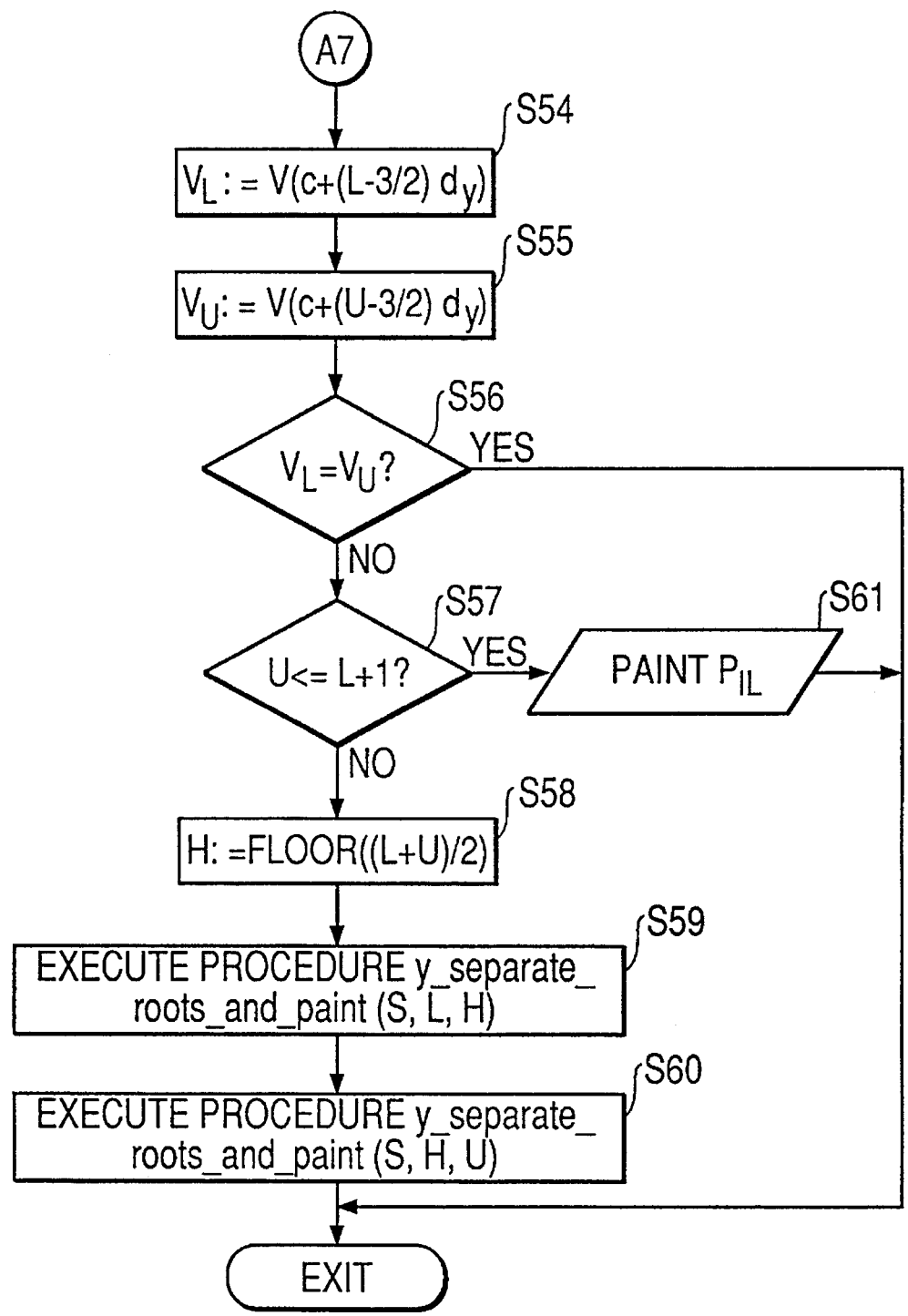
FIG. 21C is a flow chart showing the content of the process for the vertical rectangular blocks according to the present invention (No. 3)
Figure 22A:
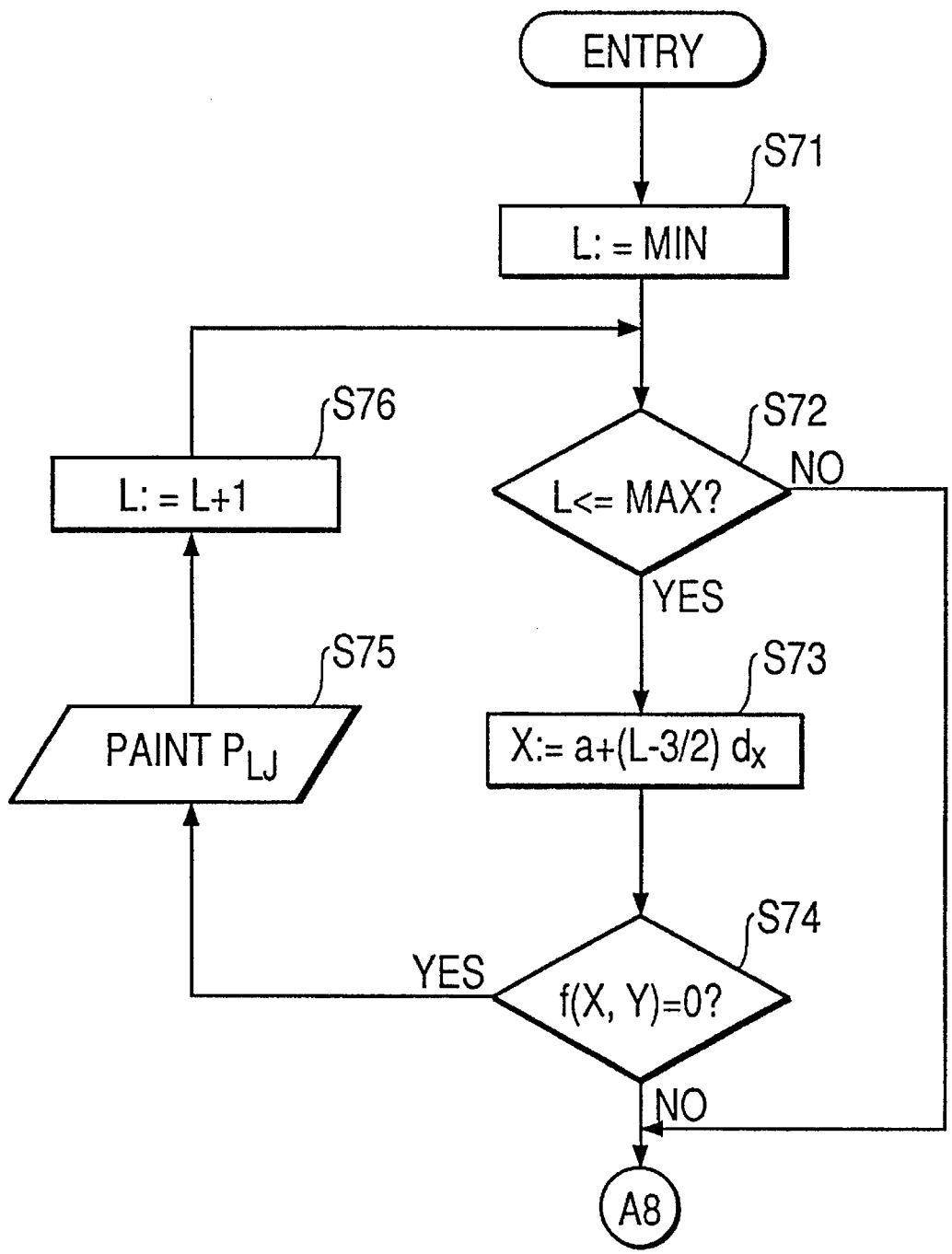
FIG. 22A is a flow chart showing the content of the process for the horizontal rectangular blocks according to the present invention (No. 1)
Figure 22B:
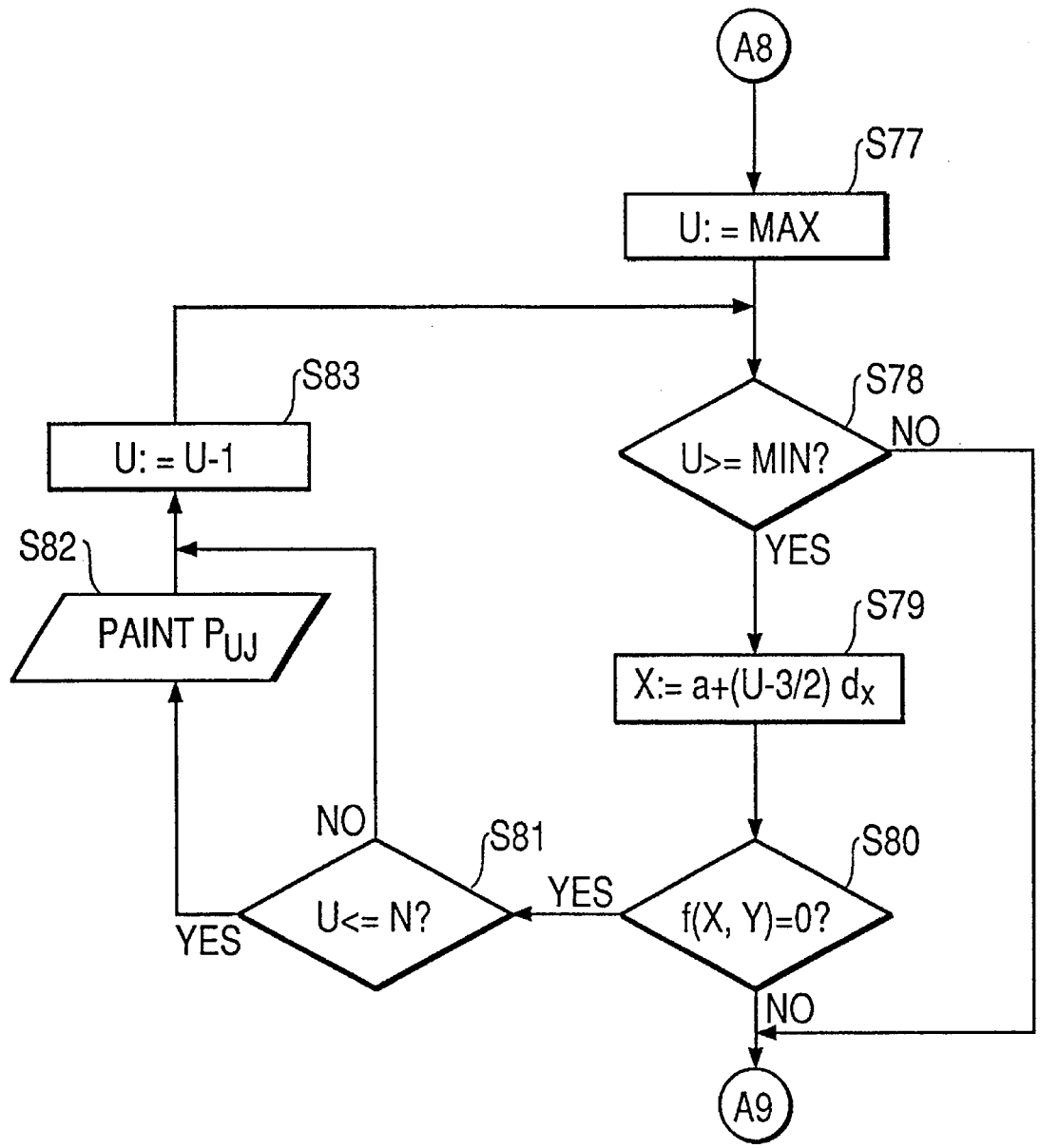
FIG. 22B is a flow chart showing the content of the process for the horizontal rectangular blocks according to the present invention (No. 2)
Figure 22C:
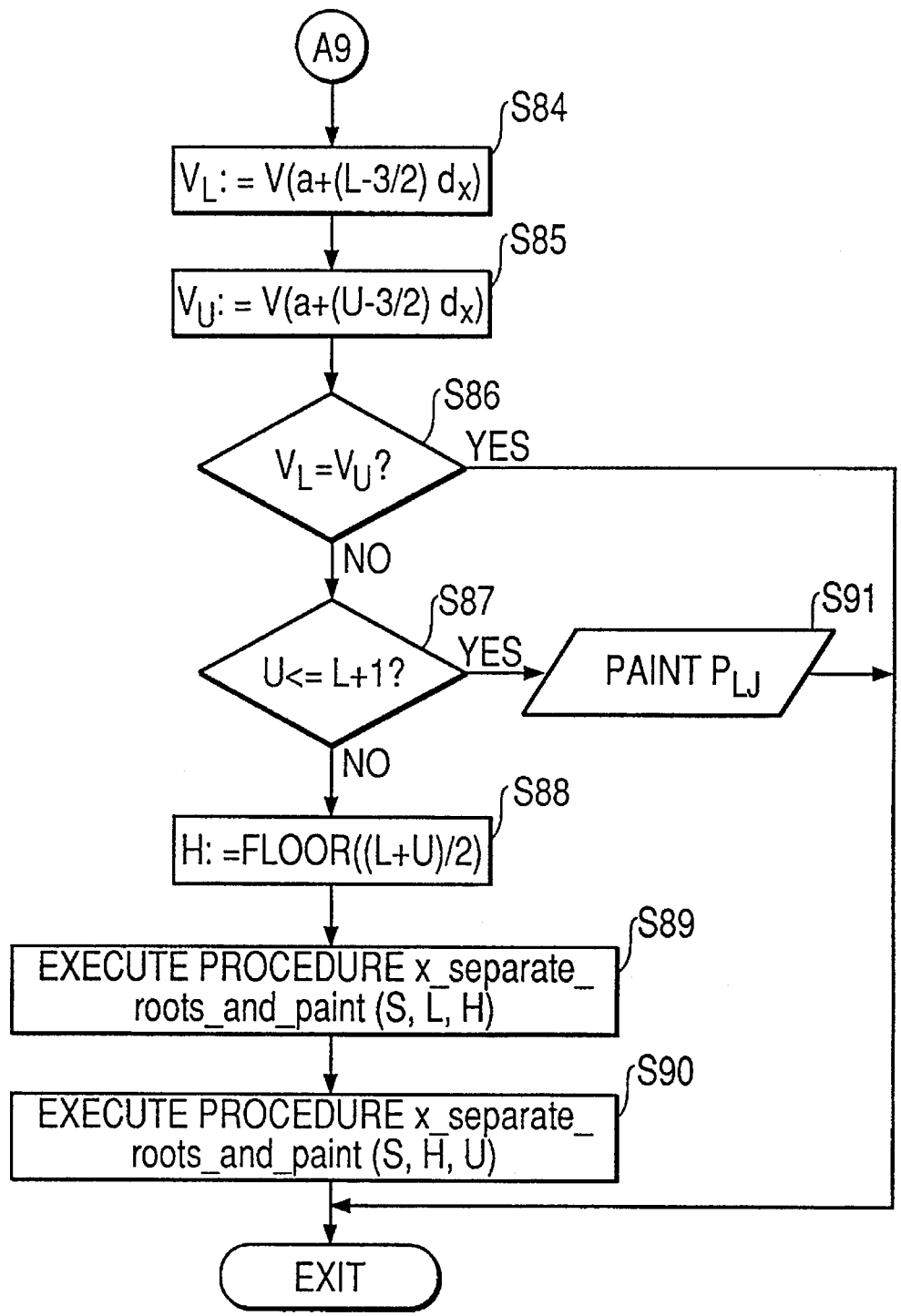
FIG. 22C is a flow chart showing the content of the process for the horizontal rectangular blocks according to the present invention (No. 3)

FIGS. 18A to 22C are flow charts showing a drawing process of the graphic drawing apparatus shown in FIG. 6. FIGS. 18A and 18B show the entire drawing process. FIG. 19 shows a process performed between steps A1 and A2 of FIG. 18A. FIG. 20 shows a process performed between steps A4 and A5 of FIG. 18B. FIGS. 21A to 21C show a process of step S32 in FIG. 19. FIGS. 22A to 22C show a process of step S34 of FIG. 20.

Before starting the drawing process shown in FIGS. 18A to 22C, the operator inputs information of a polynomial f(x, y) and also information that designates the display accuracy. The CPU 25 calculates x-direction calculation pitch $h_x$, y-direction calculation pitch $h_y$, x-direction painting accuracy width (x-direction display unit width) $d_x$, and y-direction painting accuracy width (y-direction display unit width) $d_y$, and stores the calculated results in the memory 26.

FIG. 18A shows a drawing process to dividing a region denoted by chain lines in FIG. 9 into N vertical rectangular blocks (x-direction unit regions). N represents the number of x-direction representative points in the logical display region 31 and accords with the number of pixels in the x direction.

When the drawing process is started, the vertical rectangular block position pointer I is set to "1" by the CPU 25 (at step S21). Thereafter, it is determined whether or not I is greater than N (at step S22).

When $I \leq N$, $X=a+(I-1)h_x$ is set (at step S23). It is determined whether or not real zeros of a univeriate polynomial f(X, y) with respect to y lie in an interval $[c+(J-3/2)d_y, c+(J-1/2)d_y]$ of y for J=1, 2, ..., M. When a real zeros exist, a pixel $P_{IJ}$ is painted. In other words, the pixel $P_{IJ}$ is plotted (at step S24). M represents the number of representative points in y direction of the logical display region 31 and accords with the number of pixels in the y direction of the apparatus display region 23. Thereafter, I=I+1 is set (at step S25). The flow returns to step S22 to repeat the same steps from S22.

At step S24, all the intervals of y corresponding with pixels, in which zeros are present, determined in all the region of an I-th vertical rectangular block. Thus, corresponding pixels of the apparatus display region 23 are painted. At this step, one or more pixels corresponding to a rectangular region (display unit) represented by $h_x \times d_y$ using the calculated $h_x$ and $d_y$, are painted at the same time.

Figure 23:
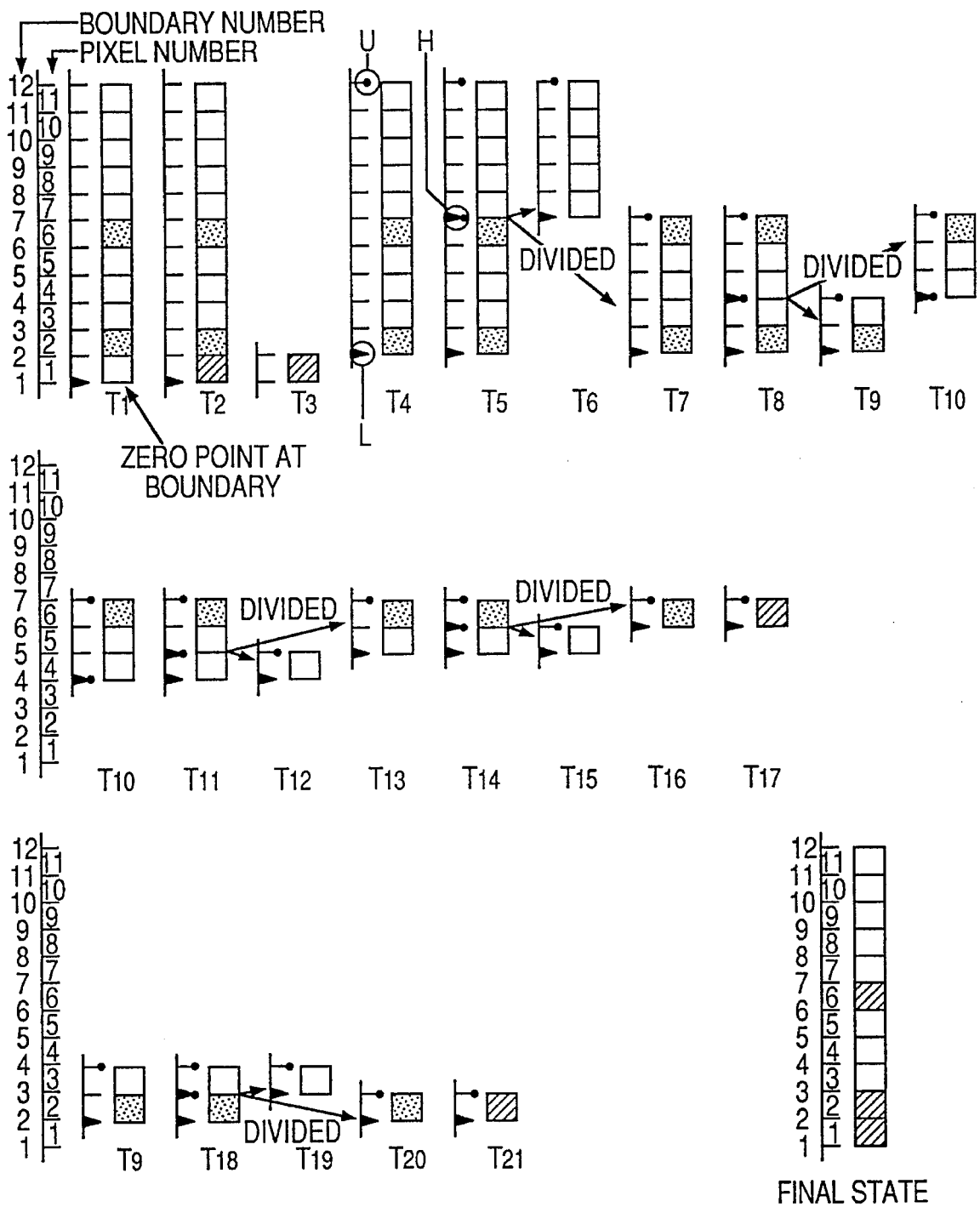
FIG. 23 is a schematic diagram showing an example of a drawing process of the vertical rectangular blocks according to the present invention.

FIG. 23 shows a process of step S24 for the I-th vertical rectangular block, where roots are separated on the vertical rectangular block and pixels are painted based on separated roots. In FIG. 23, using $g_x$ and $g_y$ of the expression (8), the process has been performed with conditions $h_x=d_x=g_x$ and $h_y=d_y=g_y$. In other words, one display unit accords with one pixel.

The vertical rectangular block shown in FIG. 23 represents the vertically rectangular block of the apparatus display region 23 which is related, by the mapping $\phi$ with a certain vertical rectangular of the logical display region 31.

Here, we assume that the vertical rectangular block is composed of M (=11) square portions (pixels). The representative points of pixels that compose the vertical rectangular block are designated as $P_{I1}, P_{I2}, \ldots, P_{I11}$ from the bottom. However, in FIG. 23, for simplicity, the representative points are designated as 1, 2, ..., 11 from the bottom. A symbol (such as T1) denoted at the bottom of the vertical rectangular block represents a conceptual process sequence number.

The scale on the left of each square portion of the vertical rectangular block represents boundaries of pixels. Two types of marks on the sale represent the lower edge and upper edge of an interval at each time of the process. As the process advances, the marks approach each other.

The square portions hatched in FIG. 23 represent pixels in which zeros are present. At the lowest square portion (pixel 1) at initial state T1, a zero point is assumed to be present at the boundary of the lower edge. To represent this zero point, the boundary is drawn with a solid line. States T2 or latter will be described later.

At step S24 of FIG. 18A, two stages of processes shown in FIG. 19 are performed. At this step, an x-coordinate representative value $\{a+(I-1)h_x\}$ of the vertical rectangular block is stored in the program variable X. f(X, y) is a polynomial with respect to only a variable (indefinite element) y. First, a Sturm sequence (a polynomial sequence) that is derived by the expression (2) from a univeriate polynomial f(X, y) is obtained by a procedure sturm_ sequence (f (X, y)). The result is stored in a program variable S that contains a sequence of polynomials represented in the memory 26 (at step S31).

Next, with actual arguments S, 1, M+1, a sub-procedure y_separate_roots_and_paint(S, Min, Max) is called and then executed (at step S32). M+1 represents the number of boundary points in a vertical rectangular block to be processed. In FIG. 23, since M=11, the number of boundary points (maximum boundary number) is 12.

FIGS. 21A to 21C show flow charts of a process of the sub-procedure y_separate_roots_and_paint(S, Min, Max). This procedure divides a given interval $[c+(Min-3/2)d_y, c+(Max-3/2)d_y]$ into pixel intervals and determines all intervals in which zeros are present. When zeros of f(X, y) are present in an interval $[c+(L-3/2)d_y, c+(L-1/2)d_y]$, corresponding pixel $P_{IL}$ is painted.

According to the Sturm's theorem, the number of zero points in an interval $[u_0, u_1]$ is denoted by $[V(S, u_0)-V(S, u_1)]$ using a function V(S, u) that represents the number of changes of signs in a Sturm sequence at a point u. S represents a polynomial sequence. However, since S is already determined and fixed in the procedure y_separate_ roots_and _paint(S, Min, Max), it is omitted in the procedure. Thus, writing V(S, u)=V(u) for simplicity, the number of zero points in the interval $[u_0, u_1]$ is given by $V(u_0)-V(u_1)$.

At this point, to satisfy the Sturm's theorem, $u_0$ and $u_1$ should not zero points of the given polynomial. Thus, in this case, an exceptional process is required. FIG. 21A shows a process for changing (increasing) the lower edge pointer so as to prevent the lower edge of the process interval from being placed at a zero.

As an initial setting, L=Min is set (at step S41). Thereafter, it is determined whether or not L is greater than Max (at step S42).

When $L \leq Max$, $Y=c+(L-3/2)d_y$ is set (at step S43). Thereafter, it is determined if the value of f(X, Y) is 0 (at step S44). When f(X, Y)=0, a pixel $P_{IL}$ is painted (at step S45). Thereafter, L=L+1 is set (at step S46). The flow returns to step S42 to repeat the same steps from S42.

In this process, when the lower edge of the process interval is placed at a zero point, the corresponding pixel is painted. In addition, the lower edge of the process interval is set to the lower edge of the next display unit. For example, in FIG. 23, when L=1, f(X, Y)=0 (at step S44, state T1). Thus, a pixel 1 is painted (at step S45, state T2). Thereafter, L=2 is set (at step S46, states T3 and T4).

When L is greater than Max at step S42 or when f(X, Y) is not 0 at step S44, the process shown in FIG. 21B is performed. FIG. 21B shows a process for changing (decreasing) the upper edge pointer. This process prevents the upper edge of the process internal from being placed at a zero.

As an initial setting, U=Max is set (at step S47). Thereafter, it is determined whether or not U is smaller than Min (at step S48).

When $U \geq Min$, $Y=c+(U-3/2)d_y$ is set (at step S49). Thereafter, it is determined whether or not the value of f(X, Y) is 0 (at step S50). When f(X, Y)=0, it is determined whether or not U is equal to or smaller than M (at step S51). When $U \leq M$, a pixel $P_{IU}$ is painted (at step S52). Thereafter, U=U−1 is set (at step S53). The flow returns to step S48 to repeat the same steps from S48.

In this process, when the upper edge of the process interval is placed at a zero, the corresponding display unit pixel is painted. In addition, the upper edge of the process interval is set to the upper edge of the next display unit pixel.

When U is greater than M at step S51, the pixel $P_{IU}$ is not painted. Thereafter, U=U−1 is set (at step S53). The flow returns to step S48 so as to repeat the same steps from S48.

This case corresponds to that U=M+1 and the upper edge of the process interval is placed at a zero point. Since the position of the zero accords with the upper edge of the apparatus display region 23, there is no corresponding pixel. Therefore, the upper edge of the process interval is merely set to the upper edge of the next display unit.

In the example shown in FIG. 23, the process is performed with Min=1 and Max=M+1=12. At state T4, since L=2<Max (at steps S46 and S42), it is determined whether or not the position of the lower edge pointer accords with a zero point (at step S44). However, it does not accord with a zero point. Thus, the upper edge of the process interval is checked next.

As an initial setting, the upper edge pointer U is set to "12" (at step S47). Since this position is not a zero (at step S50), the flow advances to a next step.

When U is smaller than Min at step S48 or when f(X, Y) is not 0 at step S50, the process shown in FIG. 21C is performed, In FIG. 21C, the values of the function V(u) at the lower edge and upper edge of the process interval are calculated. Thereafter, the number of zeros in the process interval is determined.

First, $u=c+(L-3/2)d_y$ is set. Thereafter, $V_n=V(c+(L-3/2)d_y)$ is calculated (at step S54). Next, $u=c+(U-3/2)d_y$ is set. $V_U=V(c+(U-3/2)d_y)$ is calculated (at step S55). Thereafter, the values of $V_n$ and $V_u$ are compared (at step S56).

When $V_L=V_U$, since there are no zeros in the interval $[c+(L-3/2)d_y, c+(U-3/2)d_y]$, the sub-procedure is terminated. Thereafter, the flow advances to step S25 shown in FIG. 18A.

When $V_L$ is different from $V_U$ at step S56, U is compared with L+1 (at step S57). When U is equal to or smaller than L+1, there are $(V_L-V_U)$ zeros in the interval $[c+(L-3/2)d_y, c+(U-3/2)d_y]$. Since the size of this interval is equal to the y-direction painting accuracy width $d_y$, the corresponding pixel $P_{IL}$ is painted (at step S61). Thereafter, the sub-procedure is terminated. The flow advances to step S25 shown in FIG. 18A.

When U is greater than L+1 at step S57, a value H=floor((L+U)/2) between U and L is calculated (at step S58). The value of the function floor(x) is defined by the integer part of the real number x. In other words, when x is an integer, floor(x)=x. When x is not an integer, the integer part of x is used. For example, floor(2.5)=2.

With the values of H and L calculated at step S58, a sub-procedure y_separate_roots_and_paint(S, L, H) is recursively called and executed (at step S59). With the values of H and U, the sub-procedure y_separate_roots_and_paint(S, H, U) is recursively called and executed (at step S60).

In this process, when the width of the process interval in which zeros are present is $2d_y$ or greater, the process interval is divided into two intervals (at step S58). Each of the divided intervals is treated as a new process interval. Thereafter, it is determined whether or not there are zeros in each of the divided intervals.

When pixels corresponding to all zeros that are present in the interval $[c+(Min-3/2)d_y, c+(Max-3/2)d_y]$ are painted, the sub-procedure is terminated. The flow advances to step S25 shown in FIG. 18A.

At state T4 shown in FIG. 23, $V_L-V_U=2$ (at step S56). In addition, since U=12>2=L (at step S57), as an intermediate point of L and U, H=floor((2+12)/2)=7 is calculated (at step S58). The process interval is divided into two intervals (at state T5).

Thus, the process interval is divided into two intervals that are represented by sets of the lower edge pointer and the upper edge pointer. The new intervals are (H, U)=(7, 12) (at state T6) and (L, H)=(2, 7) (at state T7). These intervals are treated as new process intervals and the sub-procedure y_separate_roots_and_paint is recursively called. The interval (H, U) is processed by the sub-procedure y_separate_roots_and_paint(S, 7, 12) (at step S60). The interval (L, H) is processed by the sub-procedure y_separate_roots_and_paint(S, 2, 7) (at step S59).

Since the sub-procedure y_separate_roots_and_paint is recursively called, the sequence of the processes of the new intervals does not always comply with the flow chart shown in FIG. 21C. In FIG. 21C, after the process of the interval (L, H) is performed, the next interval (H, U) is performed. However, as states T6 and T7 show, even if the sequence of the processes is inverted, the same result can be accomplished.

With respect to the process interval (H, U), the sub-procedure that is recursively called calculates the V function (at steps S54 and S55). Since there are no zeros in this interval (the determined result is YES at step S56), the interval is no more divided and the recursive process of this interval is terminated.

With respect to the process interval (L, H), there are two zero points. By the similar recursive process, the process interval is further divided. At state T8, H=4 is set. The process interval is divided into an interval (2, 4) (at state T9) and an interval (4, 7) (at state T10). Thereafter, at state T11, H=5 is set and the interval (4, 7) is divided into an interval (4, 5) (at state T12) and an interval (5, 7) (at state T13). The interval (5, 7) is further divided into an interval (5, 6) (at state 15) and an interval (6, 7) (at state 16). At state T16, there is a zero in the process interval (6, 7) (the determined result is NO at step S56). In addition, this interval is equivalent to the minimum display unit (the determined result is YES at step S57). Thus, a pixel 6 corresponding to the display unit is painted (at state T17).

At state T18, H=3 is set. The interval (2, 4) is divided into an interval (3, 4) (at state T19) and an interval (2, 3) (at state T20). There is a zero in the process interval (2, 3) at state T20 (the determined result is NO at step S56). In addition, since this interval accords with the minimum display unit (the determined result is YES at step S57), a pixel 2 corresponding to the display unit is painted (at state T21).

Thus, the drawing process for the vertical rectangular block of state T1 is completed. As shown in the final state of FIG. 23, three pixels (pixels 1, 2, 6) are displayed. I is incremented by "1" by the CPU 25 at step S25 so as to perform the process for the next vertical rectangular block.

FIG. 18B shows a drawing process to dividing the region denoted by the chain lines in FIG. 10 into M horizontal rectangular blocks (y-direction unit regions). When I is greater than N at step S22 in FIG. 18A, a process shown in FIG. 18B is started.

A horizontal rectangular block position pointer J is set to "1" by the CPU 25 (at step S26). Thereafter, it is determined whether or not J is greater than M (at step S27).

When $J \leq M$, $Y=c+(J-1)h_y$ is set (at step S28). It is determined whether or not real zero of the univeriate polynomial f(x, Y) with respect to x are present in an interval of x $[a+(I-3/2)d_x, a+(I-1/2)d_x]$ for $I=1, 2, \ldots, N$. When there is a zero point, a pixel $P_{IJ}$ is painted (in other words, the pixel $P_{IJ}$ is plotted) (at step S29). Thereafter, $J=J+1$ is set (at step S30). The flow advance to step S27 to repeat the same steps from S27. At step S27, when J is greater than M, the drawing process is terminated.

At step S29, all the intervals of x corresponding with pixels, in which zeros are present are determined in all regions of a J-th horizontally rectangular block. Corresponding pixels in the apparatus display region 23 are painted. At this step, one or more pixels corresponding to a rectangular region (display unit) represented by $h_y \times d_x$ with the calculated $h_y$ and $d_x$ are painted at the same time.

At step S29, two stages of processes as shown in FIG. 20 are preformed. At this step, a vertical coordinate representative value $c+(J-1)h_y$ is stored in the program variable Y. f(x, Y) is a polynomial in variable (indefinite element) x only. As with step S31 shown in FIG. 19, a polynomial sequence derived from the univeriate polynomial f(x, Y) is obtained by a procedure sturm_sequence(f (x, Y)). The result is stored in a program variable S that contains a sequence of polynomials represented in the memory 26 (at step S33).

Next, with actual arguments S, 1, N+1, a sub-procedure x_separate_roots_and_paint(S, Min, Max) is called and executed (at step S34). N+1 represents the number of boundary points in the horizontal rectangular block to be processed.

FIGS. 22A to 22C show a process performed by the sub-procedure x_separate_roots_and_paint(S, Min, Max). The process of the sub-procedure x_separate_roots_and_paint(S, Min, Max) is the same as the process of the sub-procedure y_separate_roots_and_paint(S, Min, Max) except for the difference between the horizontal rectangular block and the vertical rectangular block.

FIGS. 24A to 27C show an operation of a drawing process (corresponding to FIGS. 18A to 22C) in the apparatus display region composed of (vertical) 11×(horizontal) 11 pixels (N=M=11). In FIGS. 24A to 27C, curves represented by solid lines accord with graphics corresponding to an equation f(x, y)=0.

In FIGS. 24A to 27C, as with the case shown in FIG. 23, pixels in the apparatus display region 23 are denoted by square portions. The apparatus display region (drawing region) 23 is denoted by 11×11 square portions. FIGS. 24A to 24L show a process for vertical rectangular blocks. FIGS. 25A to 25L show a process for horizontal rectangular blocks. Scales at the bottom (FIGS. 24A to 24L) and on the left (FIGS. 25A to 25L) of the lattice represent positions corresponding to representative values of the vertical rectangular blocks and the horizontal rectangular blocks. As with the case shown in FIG. 23, $h_x=d_x=g_x$ and $h_y=d_y=g_y$ are set. One display unit accords with one pixel.

Pixels corresponding to display units in which zeros are present (namely, square portions to be painted) are hatched. The pixels that have been painted are represented in black. A triangle mark on the scales represent a rectangular block or a horizontal rectangular block that is being processed.

Figure 24A:
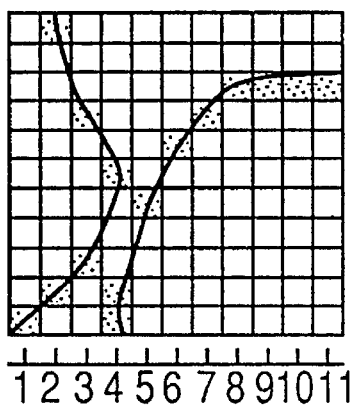
FIGS. 24A, 24B, 24C, 24D, 24E, 24F, 24G, 24H, 24I, 24J, 24K, and 24L are schematic diagrams showing steps of drawing process for the vertical rectangular blocks according to the present invention.

First, the vertical rectangular blocks are processed (FIG. 24A). The initial value of the vertical rectangular block position pointer I shown in FIG. 18A is set to "1" (at step S21). Since I is smaller than 11 (the determined result is YES at step S22). The x coordinate of the position of the representative point of the vertical rectangular block is calculated and denoted as X (at step S23). All intervals of the vertical rectangular block in which zeros are present are calculated and corresponding pixels are painted (at step S24).

Figure 24B:
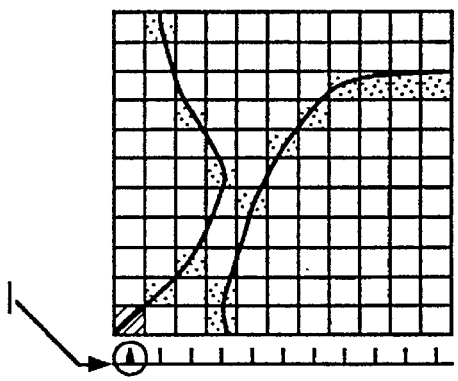
Figure 24C:
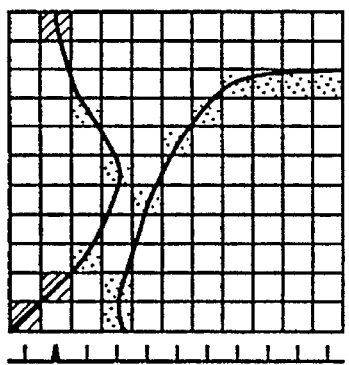
Figure 24D:
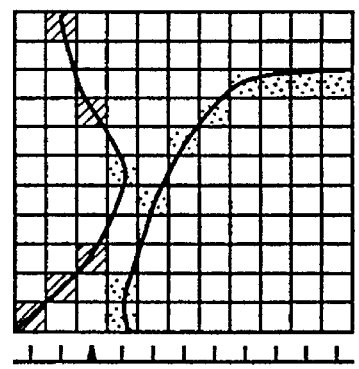
Figure 24E:
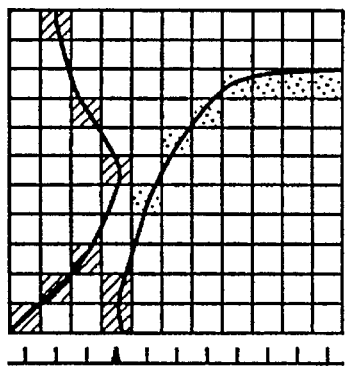
Figure 24F:
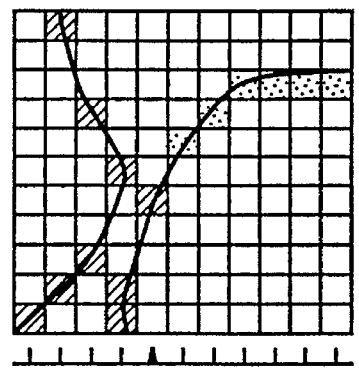
Figure 24G:
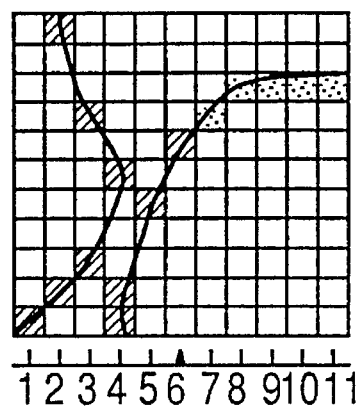
Figure 24H:
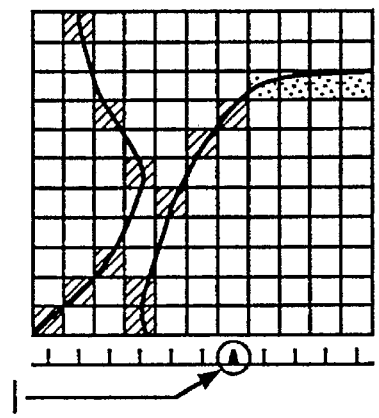
Figure 24I:
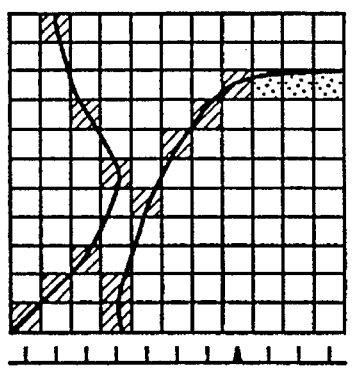
Figure 24J:
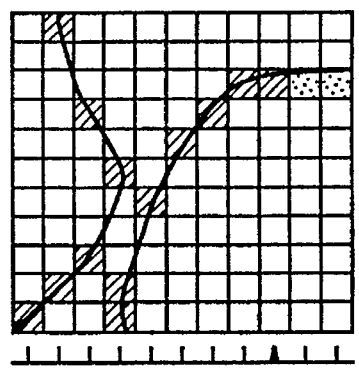
Figure 24K:
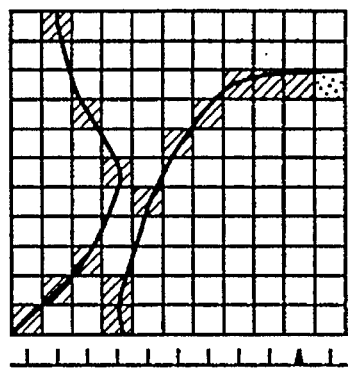

In FIG. 24A, since there is one display unit that contains a zero point in the first vertical rectangular block, the corresponding one pixel is painted as shown in FIG. 24B.

Next, the vertical rectangular block position pointer I is incremented by "1" (at step S25). The flow returns to step S22. The value of I being incremented in this way, the second to eleventh vertical rectangular blocks are processed, one after the other. Pixels corresponding to zero points in the vertical rectangular blocks are painted.

The steps of the drawing process are successively shown in FIGS. 24A, 24B, 24C, 24D, 24E, 24F, 24G, 24H, 24I, 24J, 24K, and 24L.

Figure 24L:
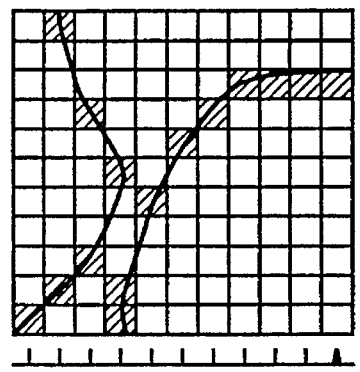

In the step shown in FIG. 24L, I=11 is set. When I is incremented by "1", since I=12, the process for the vertical rectangular blocks is terminated (the determined result is NO at step S22). Thereafter, the process for horizontal rectangular blocks is started.

When the process for the horizontal rectangular blocks is started (FIG. 25A), the initial value of the horizontal rectangular block position pointer J shown in FIG. 18B is set to "1" (at step S26). Since J is smaller than 11 (the determined result is YES at step S27), the y coordinate of the representative position of the horizontal rectangular block is calculated and denoted as Y (at step S28). All intervals of the horizontal rectangular blocks in which zero points are present are calculated and corresponding pixels are painted (at step S29).

Figure 25A:
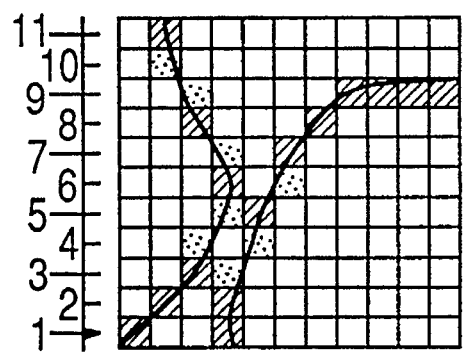
FIGS. 25A, 25B, 25C, 25D, 25E, 25F, 25G, 25H, 25I, 25J, 25K, and 25L are schematic diagrams showing steps of drawing process for the horizontal rectangular blocks according to the present invention.
Figure 25B:
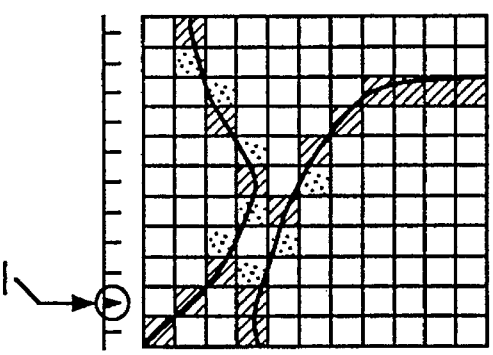
Figure 25C:
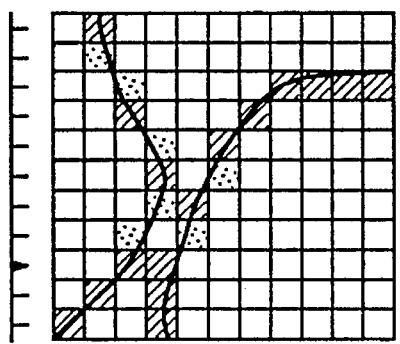
Figure 25D:
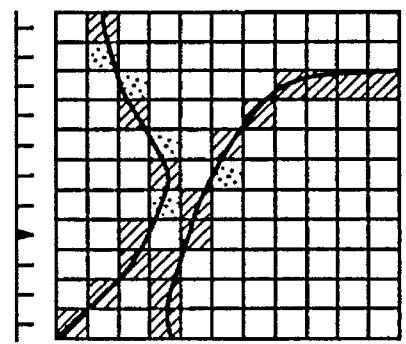
Figure 25E:
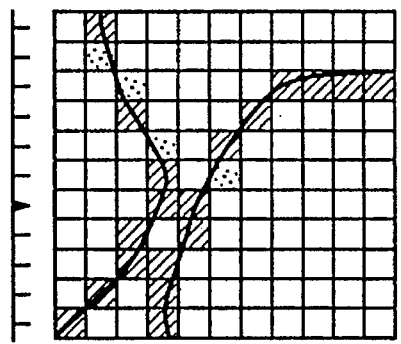
Figure 25F:
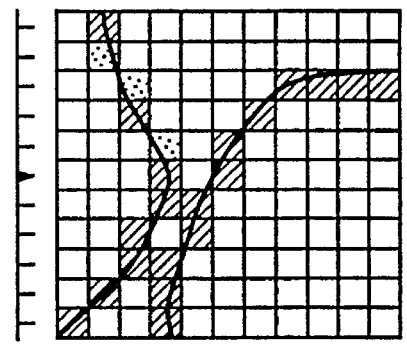
Figure 25G:
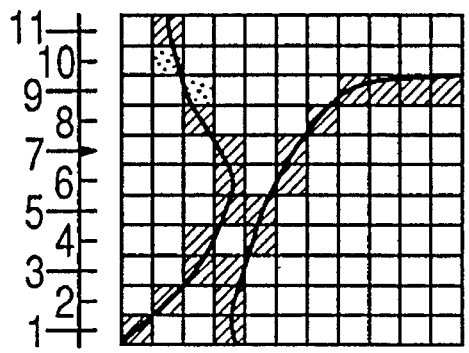
Figure 25H:
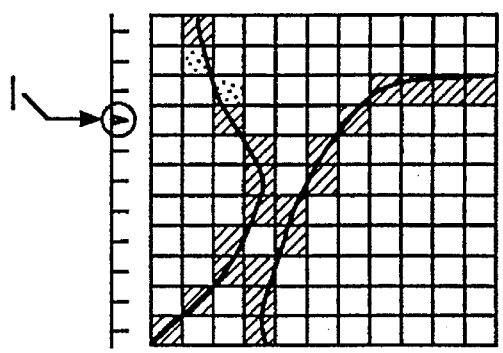
Figure 25I:
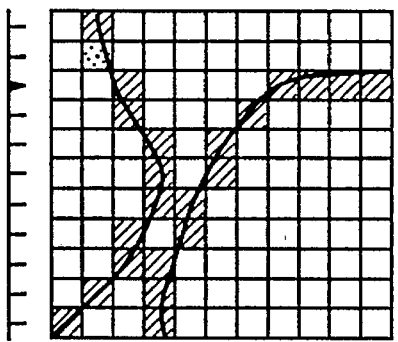
Figure 25J:
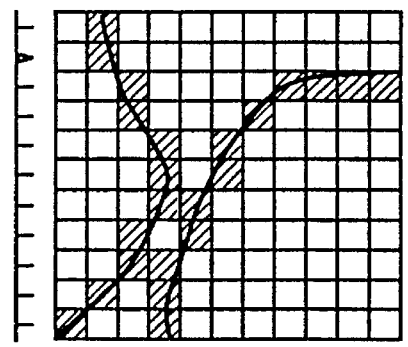
Figure 25K:
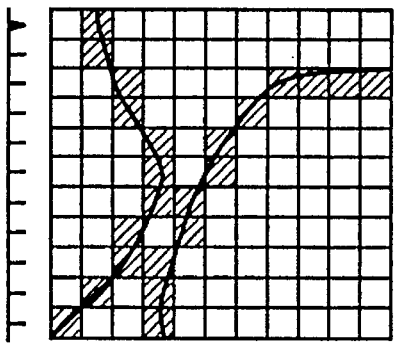

In FIG. 25A, the first horizontal rectangular block has two display units that contain zeros. These display units have been already painted by the process for the vertical rectangular blocks. However, since the horizontal rectangular blocks are processed independently from the vertical rectangular blocks, the two pixels corresponding to these display units are painted again.

The value of the horizontal rectangular block position pointer J is incremented by "1" (at step S30). The flow returns to step S27. Incrementing the value of J in this way, the second to eleventh horizontal rectangular blocks are processed, one after the other. Pixels corresponding to positions of zero points contained in the horizontal rectangular blocks are painted.

Figure 25L:
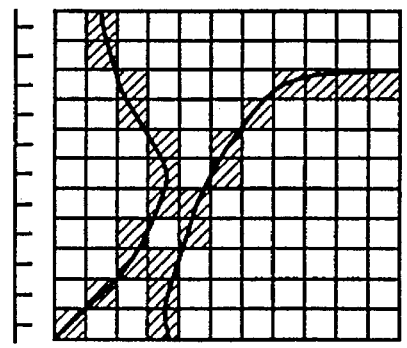

The steps of the drawing process are successively shown in FIGS. 25A, 25B, 25C, 25D, 25E, 25F, 25G, 25H, 25I, 25J, 25K, and 25L. In FIG. 25L, the final result of the drawing process using vertical division and horizontal division is shown.

Notice that the drawing process using both vertical division and horizontal division is performed as in this example, a graph can be more accurately drawn than the drawing process using only vertical division or only horizontal division.

In the example of the drawing process shown in FIGS. 24A to 24L, $h_x=d_x=g_x$ and $h_y=d_y=g_y$ are set so as to precisely draw a graphic represented by f(x, y)=0. However, when the calculation pitches $h_x$ and $h_y$ or the painting accuracy widths $d_x$ and $d_y$ are more coarsely set, the process time can be reduced. In this case, $h_x$ and $d_x$ are positive multiples of $g_x$. In addition, $h_y$ and $d_y$ are positive multiples of $g_y$.

Figure 26A:
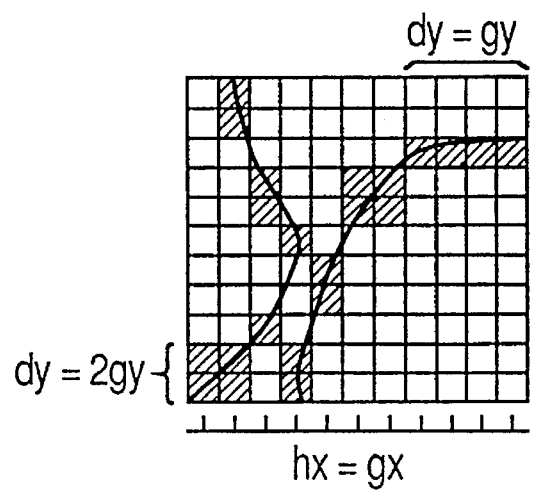
FIGS. 26A, 26B, 26C, 27A, 27B, and 27C are schematic diagrams showing a drawing example of a graphic with low display accuracy.
Figure 26B:
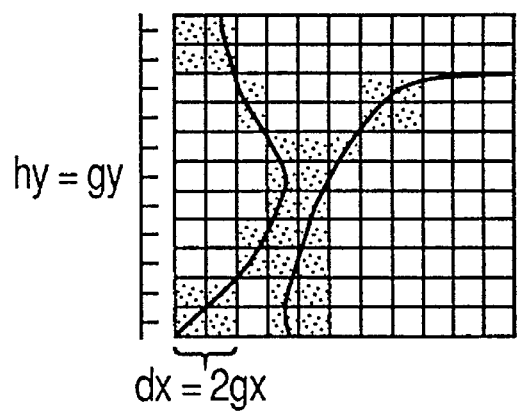

FIGS. 26A to 27C are schematic diagrams showing an example of a drawing process in the case that the calculation pitches and painting accuracy widths are coarsely set. FIG. 26A shows the result of a process for vertical rectangular blocks in the case that $h_x=g_x$ and $d_y=2g_y$. FIG. 26B shows the result of a process for horizontal rectangular blocks in the case that $h_y=g_z$ and $d_x=2g_x$. FIG. 26C shows the result in the case that a process for vertical rectangular blocks shown in FIG. 26A and a process for horizontal rectangular blocks shown in FIG. 26B are performed in succession.

Figure 27A:
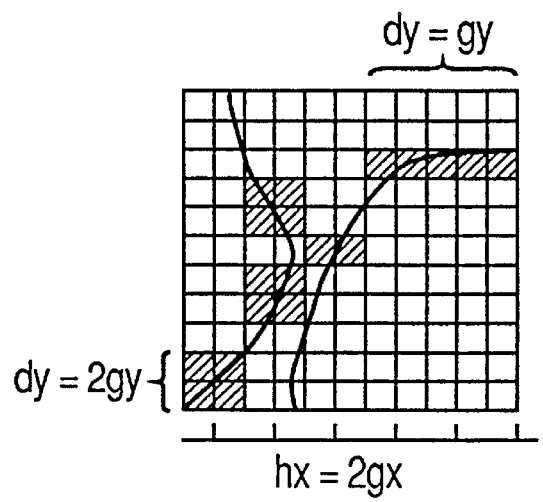
Figure 27B:
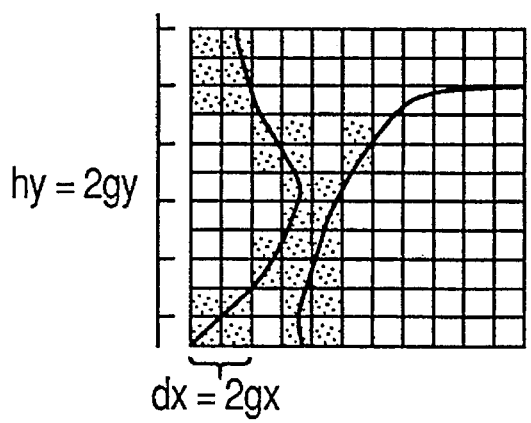
Figure 27C:
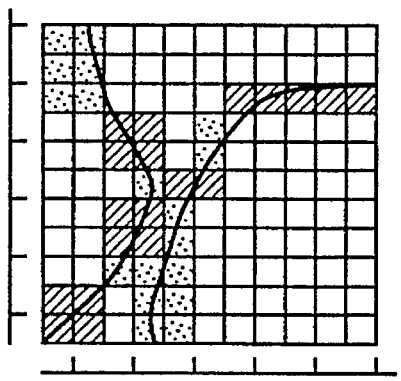

FIG. 27A shows the result of a process for vertical rectangular blocks in the case that $h_x=2g_x$ and $d_y=2g_y$. FIG. 27B shows the result of a process for horizontal rectangular blocks in the case that $h_y=2g_y$ and $d_x=2g_x$. FIG. 27C shows the result in the case that a process for vertical rectangular blocks shown in FIG. 27A and a process for horizontal rectangular blocks shown in FIG. 27B are performed in succession.

In the process for a part of vertical rectangular blocks shown in FIGS. 26A and 27A, $d_y=g_y$ is set. This is because a fraction is generated when a vertical rectangular block composed of 11 display units is divided by the y-direction painting accuracy width $d_y$ that is equivalent to two display units. The fraction can be adjusted by the setting of $d_y=g_y$ in some blocks.

Figure 26C:
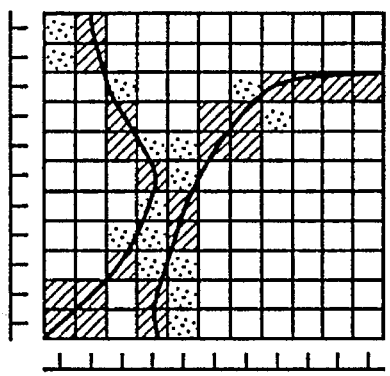

When the calculation pitches or the painting accuracy widths are coarsely set, the accuracy of the graph being displayed is slightly deteriorated as shown in FIGS. 26C and 27C. However, the process time for the drawing process such as zero point calculation can be remarkably reduced.

Next, with a practical polynomial $$f(x,y) = 2(x-1/2)^4 - 3(x-1/2)^2(y-1/2) + (y-1/2)^2 - 2(y-1/2)^3 + (y-1/2)^4 \quad (14)$$

the drawn result according to the present invention will be descried.

As an example, from a polynomial with respect to a variable x obtained by substituting y=2 into f(x, y) of expression (14), a Sturm sequence $F_k$ (where k=0, 1, . . . ) corresponding to the expression (2) is derived as follows.

$$F_0 = f(x,2) = 2x^4 - 4x^3 - \frac{3}{2}x^2 + \frac{7}{2}x - \frac{7}{16} \quad (15)$$

$$F_1 = \frac{dF_0}{d_x} = 8x^3 - 12x^2 - 3x + \frac{7}{2}$$

$$F_2 = \frac{9}{4}x^2 - \frac{9}{4}x$$

$$F_3 = 7x - \frac{7}{2}$$

$$F_4 = \frac{9}{16}$$

$$F_5 = 0$$

Figure 28:
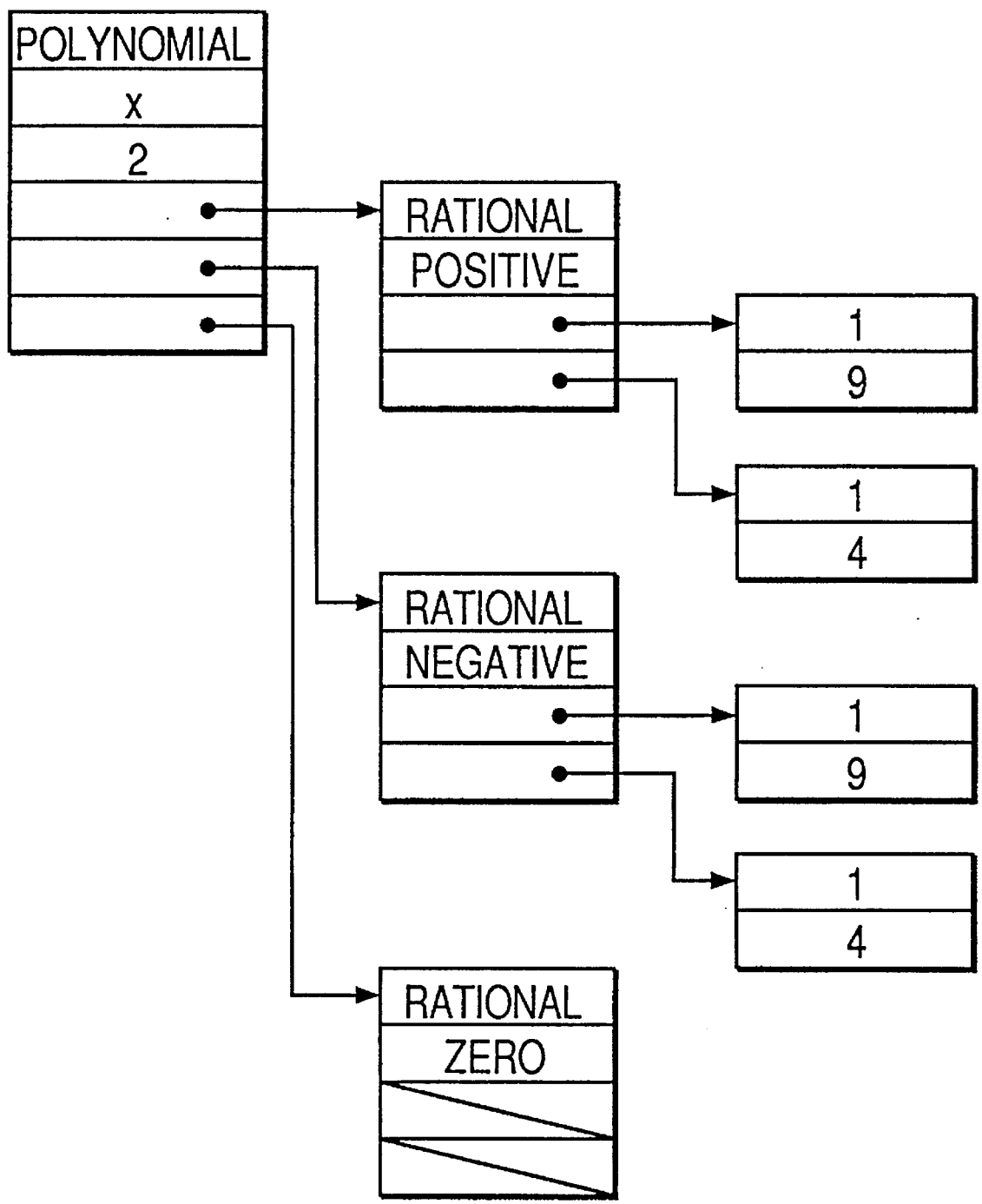
FIG. 28 is a schematic diagram showing a representation of a polynomial $F_2=(9/4)x^2-(9/4)*$ in a memory according to the present invention.

FIG. 28 shows a representation of the polynomial $F_2$ in the memory 26, as an example. Arrows in FIG. 28 represent pointers to storage positions of data as arrows in FIG. 17.

From a polynomial with respect to a variable y obtained by substituting x=1/3 into f(x, y) of the expression (14), a Strum polynomial sequence $G_k$ (where k=0, 1, . . . ) is derived as follows.

$$G_0 = f\left(\frac{1}{3}, y\right) = y^4 - 4y^3 + \frac{11}{2}y^2 - \frac{37}{12}y + \frac{785}{1296} \quad (16)$$

$$G_1 = \frac{dG_0}{dy} = 4y^3 - 12y^2 + 11y - \frac{37}{12}$$

$$G_2 = \frac{1}{4}y^2 - \frac{7}{16}y + \frac{107}{648}$$

$$G_3 = \frac{127}{324}y - \frac{71}{324}$$

$$G_4 = \frac{27749}{20903184}$$

$$G_5 = 0$$

Figure 29:
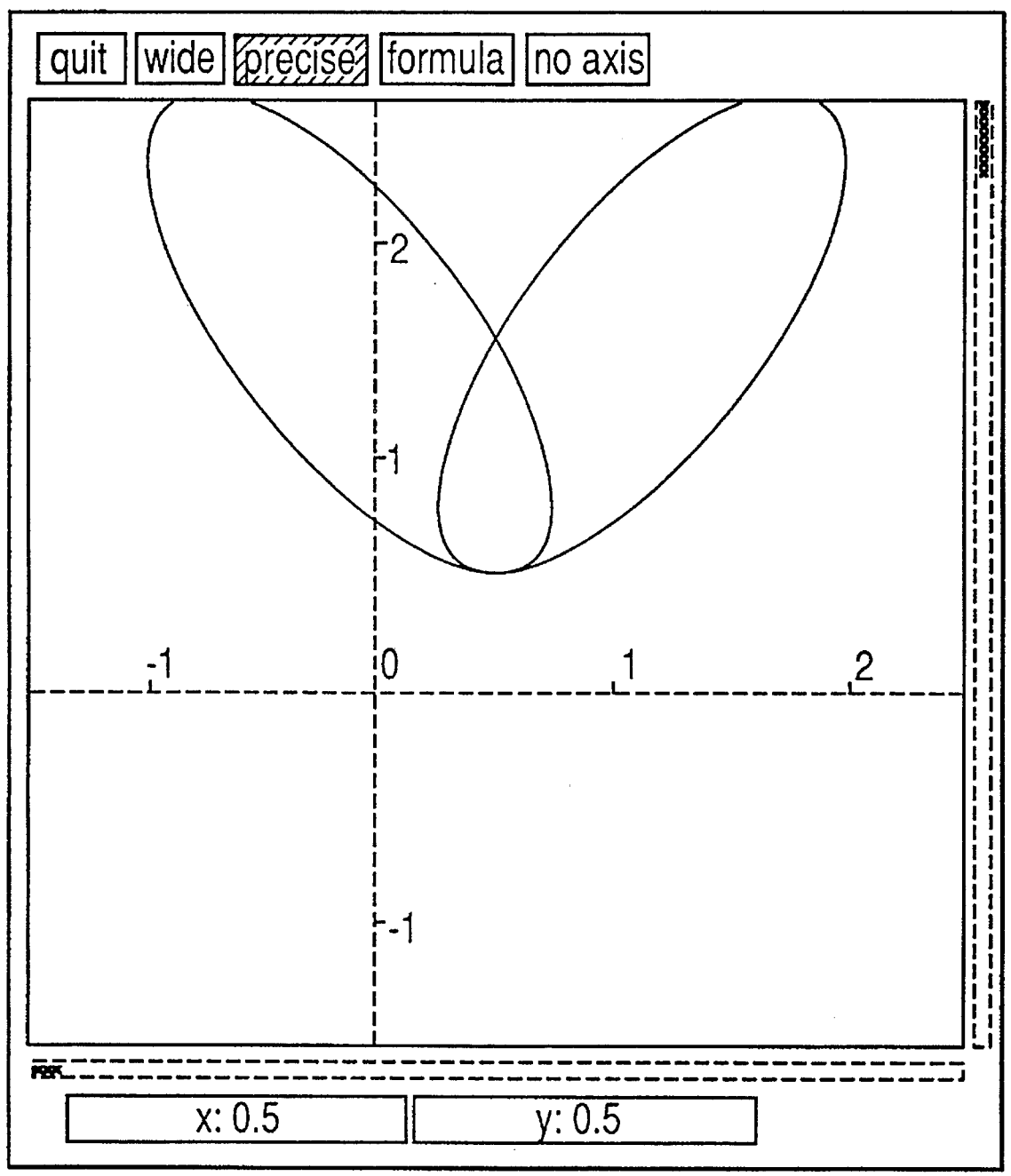
FIG. 29 is a schematic diagram showing a drawing result of a graphic according to the present invention.

FIG. 29 shows a result of a graph represented by a set of zeros of a polynomial of the expression (14). The graph is drawn on an Xwindow by a workstation implemented by the graphic drawing apparatus according to the present invention.

As a logical display region 31, a square region represented by $-1.523 \leq x \leq 2.5$ and $-1.5 \leq y \leq 2.5$ is defined. The numbers of representative points N and M are 400, each. The number of pixels in the apparatus display region 23 is 400×400= 160000. The calculation pitches and painting accuracy widths in x and y directions accord with the width of each pixel. In other words, $h_x=d_x=4/400=1/100$ and $h_y=d_y=4/400=1/100$.

As shown in FIG. 29, although an algebraic function $2(-1/2)^4 - 3(x-1/2)^2(y-1/2) + (y-1/2)^2 - (y-1/2)^3 + (y-1/2)^4 = 0$ has a singular point (1/2, 1/2) at which two curves share a tangent line, it is precisely drawn including the vicinity of the singular point.

Figure 30:
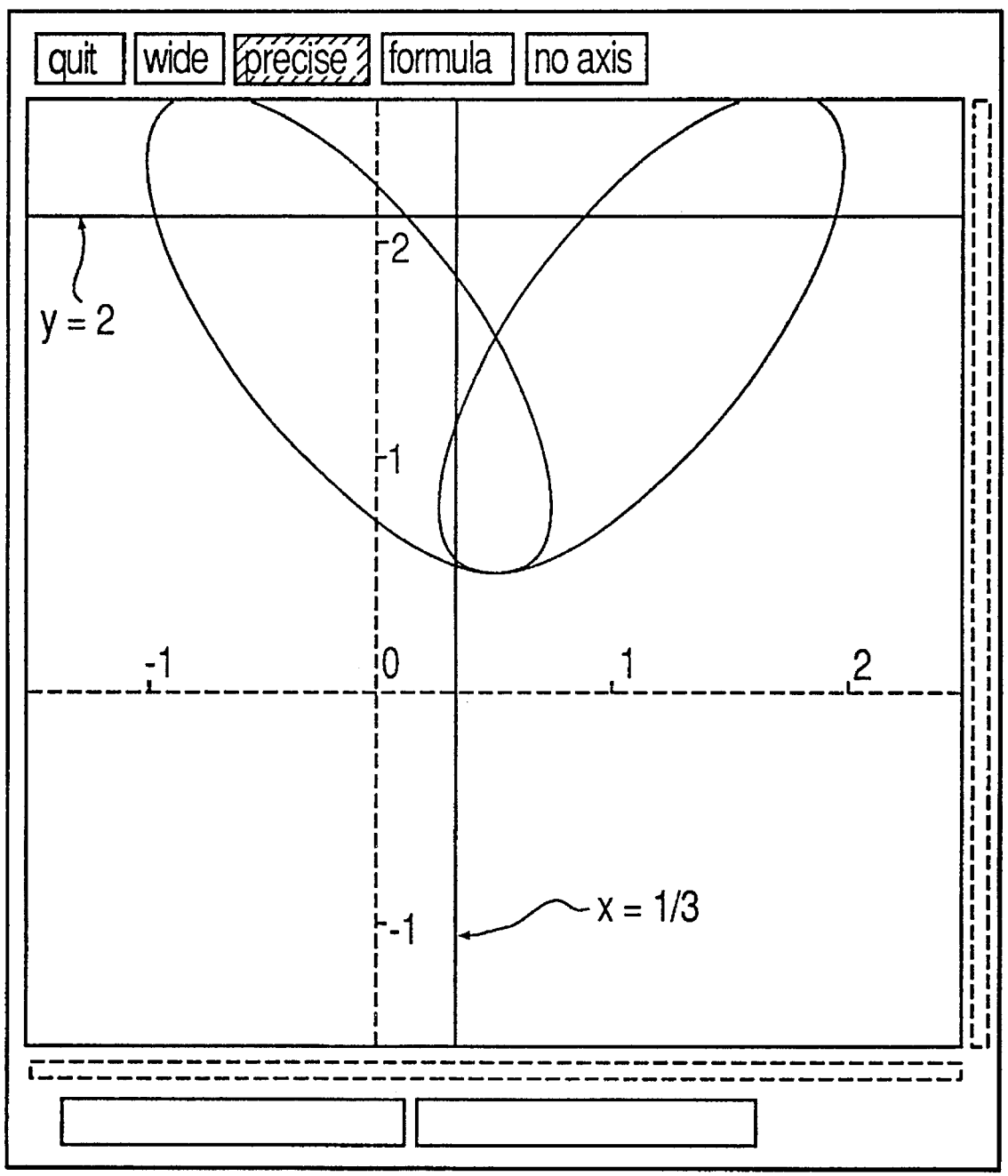
FIG. 30 is a schematic diagram showing representative coordinate values used for calculation of Sturm sequences according to the present invention.

FIG. 30 shows a position of zero points represented by f(x, 2)=2 and a position of zero points represented by f(1/3, y) on the graph shown in FIG. 29.

As shown in FIG. 30, the polynomial of the expression (14) has four zeros on a straight line y=2. The intervals of x in which these zeros are present can be obtained by calculating Sturm sequences at appropriate points on the straight line y=2 using the polynomial sequence $F_k$ of the expression (15).

The polynomial of the expression (14) has four zeros also on a straight line x=1/3. The interval of y in which these zeros are present can be obtained by calculating Sturm sequences at appropriate points on the straight line x=1/3 using the polynomial sequence $G_k$ of the expression (16).

In a point calculating process, avoiding a rational number calculation by extracting the denominators in the Strum sequence and calculating in integer, the calculation process is speeded up.

Figure 31:
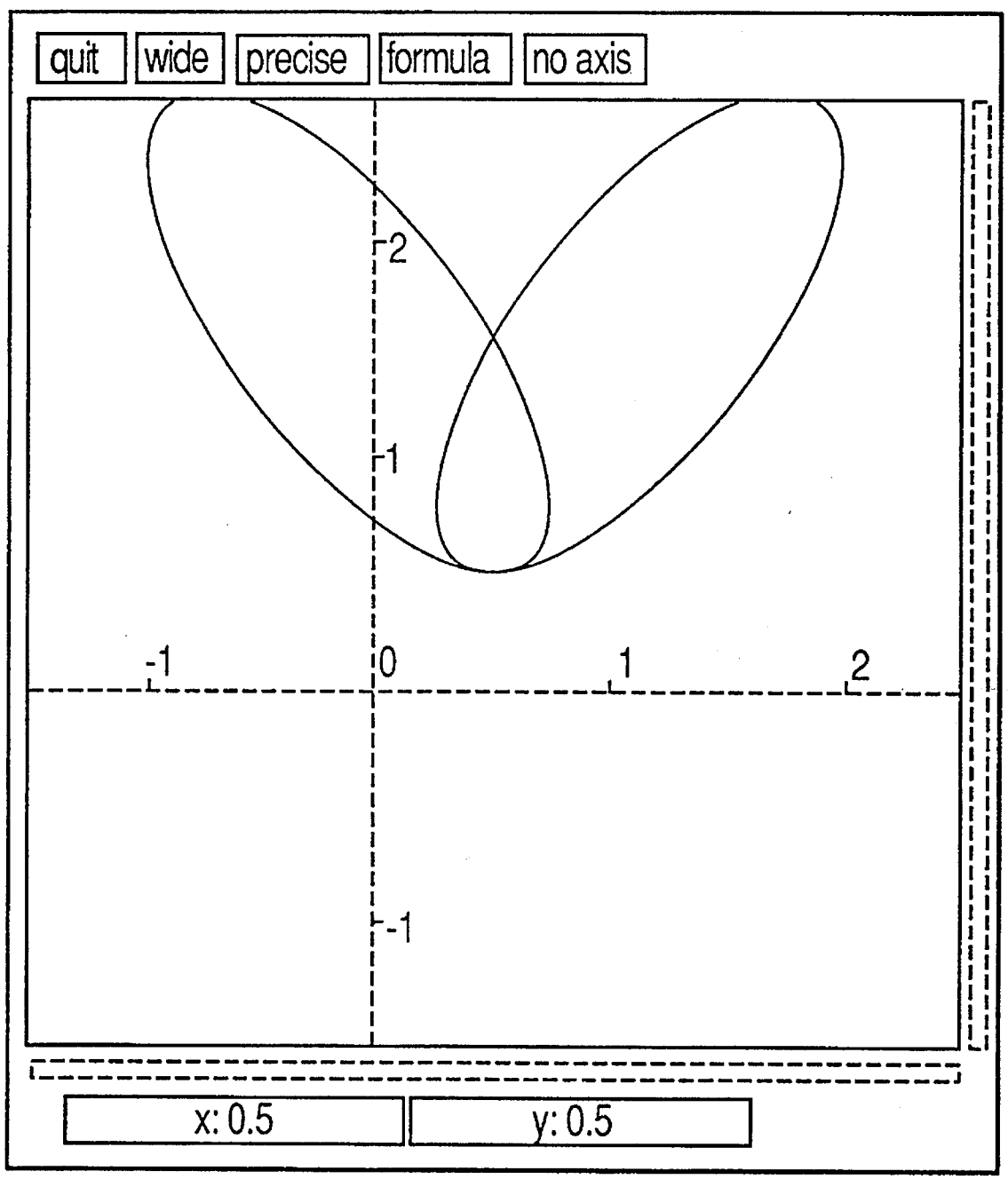
FIG. 31 is a schematic diagram showing a drawing result of a graphic according to conventional all region pixel sign determining method.

FIG. 31 shows a result of a graph of zeros of the expression (14) on the same Xwindow using the conventional all region pixel sign determining method with the same logical region and the same number of pixels shown in FIG. 29.

In FIG. 31, a graph in the vicinity of the singular point (1/2, 1/2) is lost. When this graph is compared with that shown in FIG. 29, the difference is clearly recognized. Thus, it is clear that the drawing according to the present invention is more precise.

When the drawing method according to the present invention is used in combination with the all region pixel sign determining method, the practicality is further increased. After the entire graph is drawn by the all region pixel sign determining method, the drawing method according to the present invention is applied to a portion in which the graph is not perfectly drawn. Thus, since the number of pixels in the region drawn by the drawing process according to the present invention is reduced, the calculating time is reduced. Consequently, the drawing speed is further improved.

Figure 32:
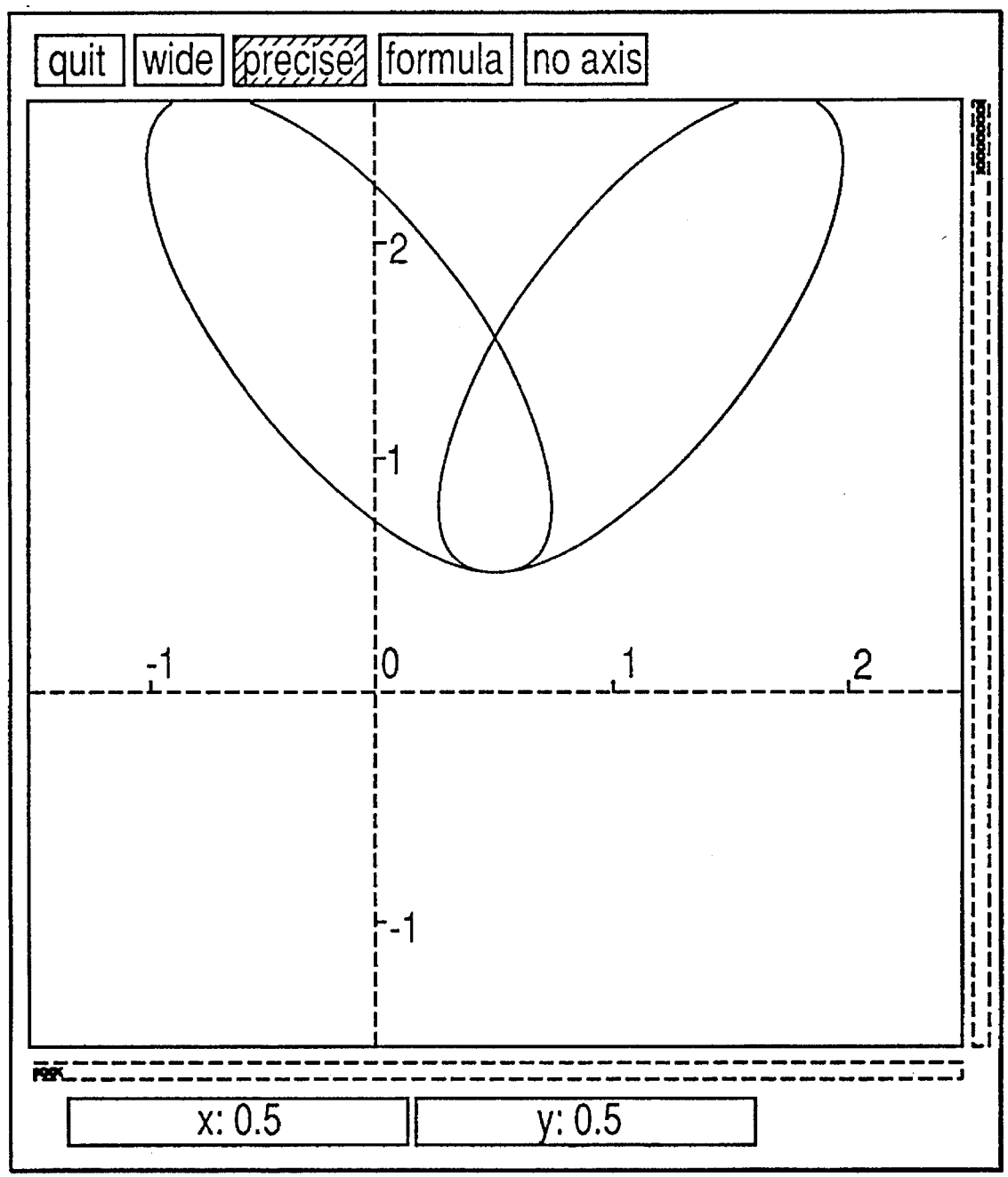
FIG. 32 is a schematic diagram showing a drawing result of a graphic in a combination of the present invention and the conventional method.

FIG. 32 shows a result in which a graph of zero points of the expression (14) is drawn by the all region pixel sign determining method at first and then the vicinity of the singular point (1/2, 1/2) shown in FIG. 29 is redrawn by the method according to the present invention. In FIG. 32, the present invention is applied for the rectangular region of $1/2-0.2 \leq x \leq 1/2+0.2$ and $1/2-0.1 \leq y \leq 1/2+0.1$.

As shown in FIG. 32, when the all region pixel sign determining method and the method according to the present invention are used in combination, it is clear that a graph with the same quality as FIG. 29 is obtained. In addition, in this case, the calculating speed is increased.

According to the graphic drawing apparatus and method of the present invention, not only a curve represented by an algebraic function $f(x, y)=0$, but a contour line of a curved surface represented by a function $z=f(x, y)$ can be drawn. In this case, a variable z is set to a constant value $z_0$. The curve on the xy plane represented by an equation $f(x, y)-z0=0$ is drawn by the method according to the present invention. When $z_0$ is shifted with a predetermined pitch and the curve $f(x, y)-z0=0$ is drawn on the same xy plane for each value of $z_0$, contour lines of the curved surface $z=f(x, y)$ can be accomplished.

Figure 33:
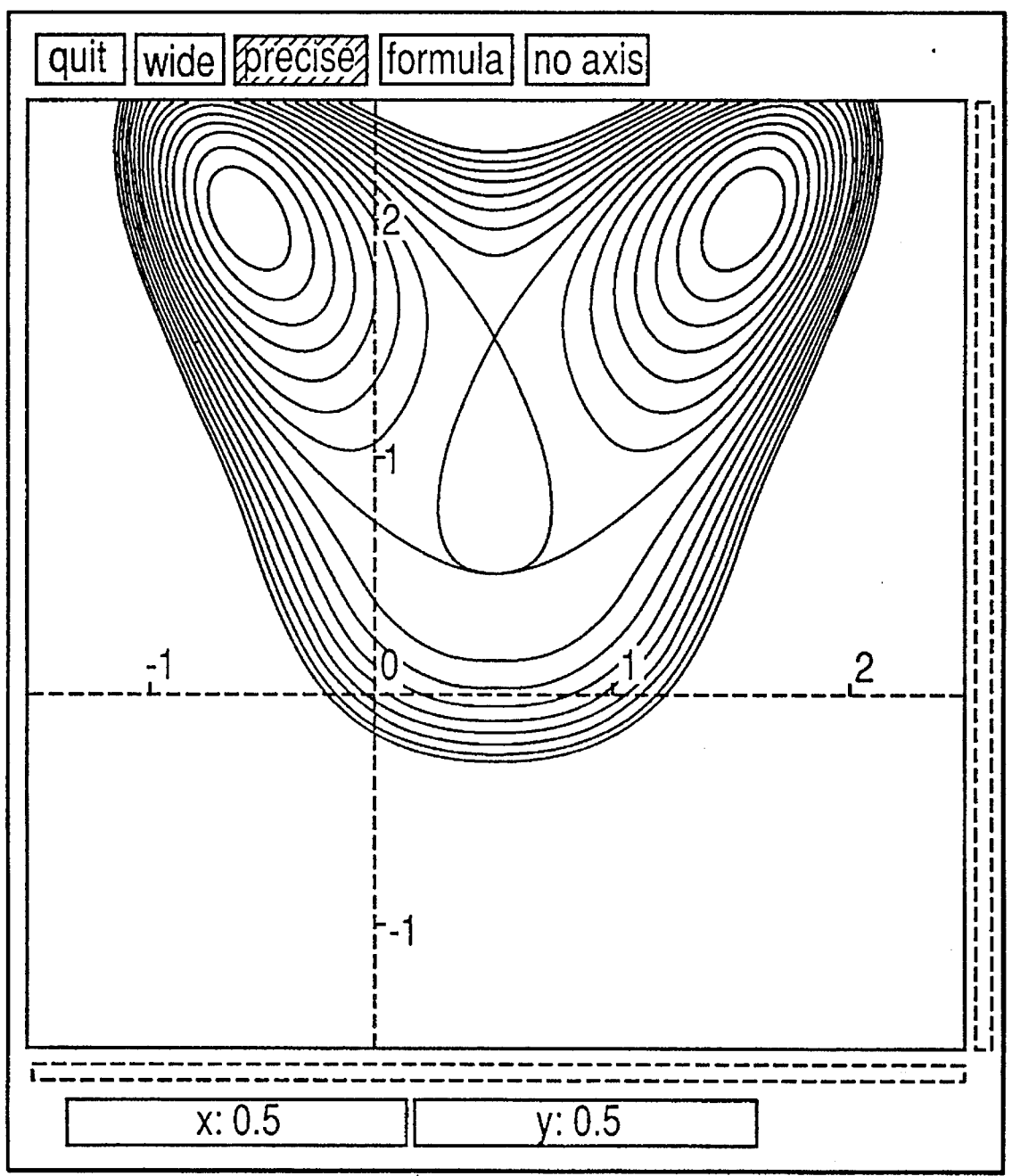
FIG. 33 is a schematic diagram showing a drawing result of contour lines of a curved surface according to the present invention.

FIG. 33 shows contour lines of the curved surface represented by $z=f(x, y)$ corresponding to the polynomial $f(x, y)$ of the expression (14). In FIG. 33, the contour lines are drawn on the xy plane by the method of the present invention. In FIG. 33, the logical region, the number of pixels, and so forth are the same as those of FIG. 29. The elevation represented by the contour lines is in the range from $-1.75 \leq z \leq 2.00$ and divided with a pitch of 0.25 into 16 levels.

Figure 34:
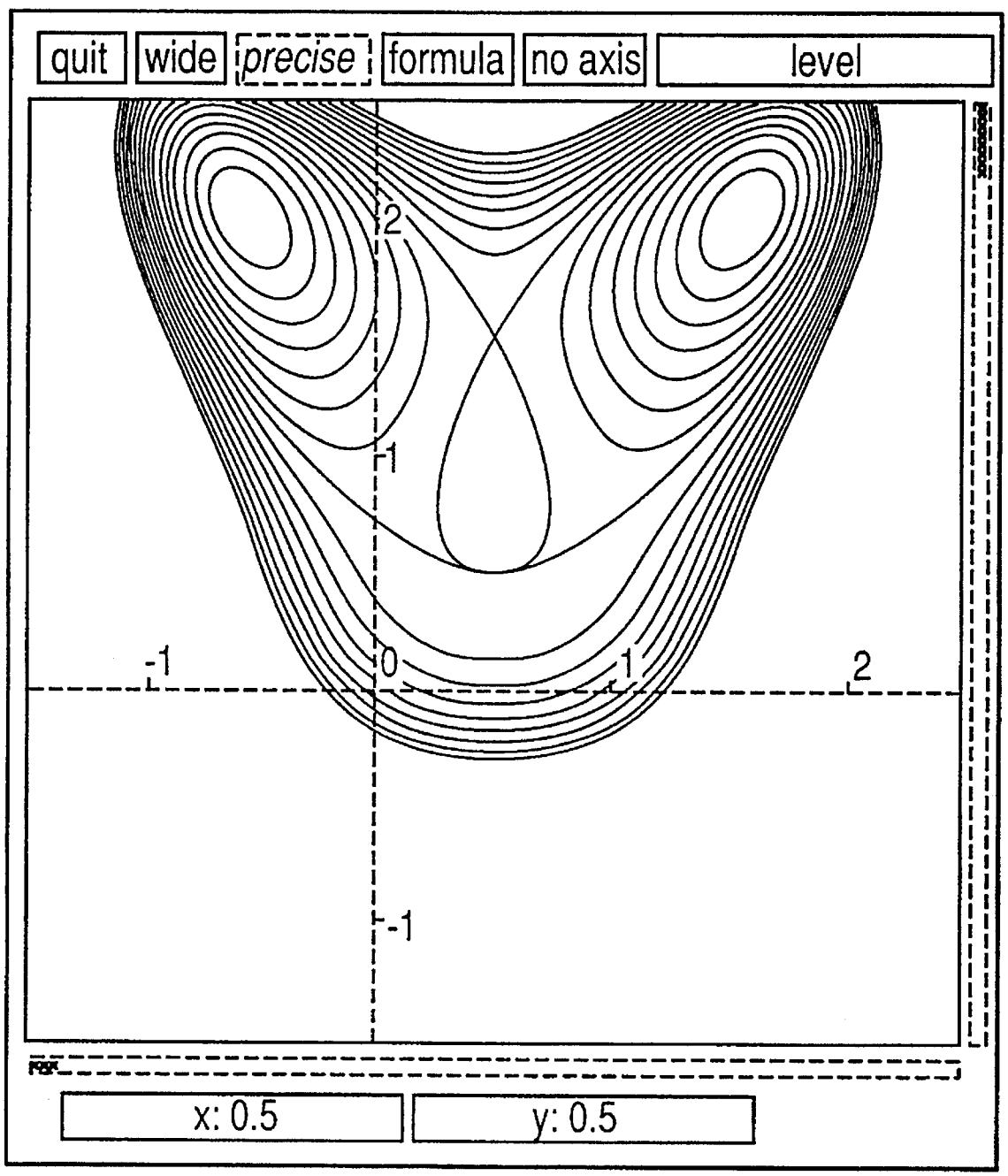
FIG. 34 is a schematic diagram showing a drawing result of contour lines of a curved surface according to the conventional all region pixel sign determining method.

FIG. 34 shows a contour line representation of the same curved surface as FIG. 33 corresponding to the conventional all region pixel sign determining method. In FIG. 34, as with the case shown in FIG. 30, a graph in the vicinity of the singular point (1/2, 1/2) is lost. In other words, the graph is not accurately drawn.

In the above-described embodiment, a drawing method of a graphic represented by zero points of a bivariate polynomial $f(x, y)$ was explained. However, the present invention is not limited to such a case. Instead, the graphic drawing apparatus and method according to the present invention can be applied to a graphic represented by zero points of a general multivariate polynomial.

For example, in the case of a three-variable polynomial $f(x, y, z)$, two variables are fixed to proper values so as to generate a univeriate polynomial. In the same manner as the steps shown in FIGS. 18A to 22C, when an interval corresponding to zero points is obtained, a set of display units (interval) that represents a conventional curved surface $f(x, y, z)=0$ can be obtained. When a mapping that correlates points in an xyz space, which is a theoretical three-dimensional space, to the apparatus display region and pixels corresponding to the display units are plotted, a two-dimensional representation (graphic representation) of the curved surface $f(x, y, z)=0$ can be obtained. However, in this case, a proper shading process for implicit faces should be performed.

According to the present invention, a process for displaying a graphic represented by zeros of a multivariate polynomial is substituted as a process for obtaining zero points of a univeriate polynomial. Thus, in a predetermined display accuracy, all pixels in a two-dimensional display region corresponding to positions of all zeros of the multivariate polynomial can be precisely displayed. In particular, even in a region in which a special situation such as a singular point takes place, regardless of the magnification rate of the region, the vicinity of the singular point or the like can be precisely plotted as a graph.

According to the present invention, when an interval in which zeros of a univeriate polynomial are present is obtained in a display unit width, pixels to be displayed are automatically designated. Thus, adjacent pixels on the graph are correctly connected. Consequently, it is not necessary to consider connections of display pixels. In addition, complicated interpolating process is not required.

According to the graphic drawing method and graphic drawing apparatus according to the present invention, a graphic in a designated range represented by any algebraic function can be accurately and precisely plotted as a graph, pixel by pixel. Thus, the present invention will largely contribute to visualizing technologies of calculated results in science and engineering fields.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A graphic drawing apparatus for use in an information processing apparatus for displaying a graphic defined by zeros of a polynomial $f(x, y)$ in variables x and y in a logical region on an xy coordinate plane, in a two-dimensional display region corresponding to the logical region, comprising:

zero point calculating means for calculating a zero point interval of the variable y in which zeros of a first univariate polynomial are present within a y-direction display unit width, the first univariate polynomial being obtained by substituting each of a plurality of fixed values of the variable x into the polynomial $f(x, y)$ and for calculating a zero point interval of the variable x in which zeros of a second univariate polynomial are present within an x-direction display unit width, the second univariate polynomial being obtained by substituting each of a plurality of fixed values of the variable y into the polynomial $f(x, y)$; and pixel determining means for obtaining a pixel in the two-dimensional display region corresponding to the zero point interval of the variable y for each of the fixed values of the variable x, obtaining a pixel in the two-dimensional display region corresponding to the zero point interval of the variable x for each of the fixed values of the variable y, and determining obtained pixels as pixels representing the graphic.

2. The graphic drawing apparatus as set forth in claim 1, further comprising:

pixel data storing means for storing pixel data with respect to the pixels representing the graphic determined by said pixel determining means; and display means for displaying the graphic in the two-dimensional display region based on the pixel data stored in said pixel data storing means.

3. The graphic drawing apparatus as set forth in claim 1, wherein said zero point calculating means includes fixed value selecting means for calculating an x-direction calculation pitch and a y-direction calculation pitch corresponding to a display accuracy, calculating the fixed values of the variable x using the x-direction calculation pitch, and calculating the fixed values of the variable y using the y-direction calculation pitch.

4. The graphic drawing apparatus as set forth in claim 3, wherein said fixed value selecting means is adapted for dividing the logical region into a plurality of x-direction unit regions, each of which has a width of the x-direction calculation pitch, designating representative values on x coordinate of the x-direction unit regions as the fixed values of the variable x, dividing the logical region into a plurality of y-direction unit regions, each of which has a width of the y-direction calculation pitch, and designating representative values on y coordinate of the y-direction unit regions as the fixed values of the variable y.

5. The graphic drawing apparatus as set forth in claim 1, wherein said zero point calculating means is adapted for substituting a particular value of the variable y into a polynomial sequence uniquely obtained from the univariate polynomial in variable y so as to obtain a first numeric value sequence, determining the number of changes of signs in the first numeric value sequence so as to obtain the zero point interval of the variable y, substituting a particular value of the variable x into a polynomial sequence uniquely obtained from the univariate polynomial in variable x so as to obtain a second numeric value sequence, and determining the number of changes of signs in the second numeric value sequence so as to obtain the zero point interval of the variable x.

6. The graphic drawing apparatus as set forth in claim 5, wherein said zero point calculating means is adapted for calculating the first numeric value sequence and the second numeric value sequence by one of arbitrary digit floating point arithmetic operation, arbitrary digit rational number arithmetic operation, and arbitrary digit integer arithmetic operation.

7. The graphic drawing apparatus as set forth in claim 1,
wherein the information processing apparatus is adapted for displaying a curved surface represented by an expression of relation z=g(x, y) of a variable z and a polynomial g(x, y) of the variables x and y in an xyz coordinate system having the xy coordinate plane in the two-dimensional display region,
wherein said zero point calculating means is adapted for designating the polynomial f(x, y) as a sum of the polynomial g(x, y) and a constant so as to obtain the zero point interval of the variable x and the zero point interval of the variable y, and
wherein said pixel determining means is adapted for obtaining the pixel in the two-dimensional display region corresponding the zero point interval of the variable y for each of the fixed values of the variable x, obtaining the pixel in the two-dimensional display region corresponding to the zero point interval of the variable x for each of the fixed values of the variable y, and designating the obtained pixels as pixels that represent a contour line of the curved surface corresponding to a value of the variable z determined with the constant.

8. A graphic drawing apparatus for use in an information processing apparatus for displaying a graphic represented by zero points of a bivariate polynomial in a two-dimensional display region, comprising:
zero point calculating means for calculating a position of a zero of the bivariate polynomial corresponding to a fixed value of a first variable in a form of a value of a second variable;
pixel determining means for obtaining a pixel in the two-dimensional display region corresponding to the value of the second variable for the fixed value of the first variable and designating an obtained pixel as a pixel representing the graphic; and
display means for displaying the graphic determined by said pixel determining means in the two-dimensional display region.

9. The graphic drawing apparatus as set forth in claim 8,
wherein said zero point calculating means is adapted for obtaining the position as a position of a zero point of a univariate polynomial with respect to the second variable obtained by substituting the fixed value of the first variable into the bivariate polynomial within a display unit width.

10. The graphic drawing apparatus as set forth in claim 9,
wherein said zero point calculating means is adapted for substituting a particular value of the second variable into a polynomial sequence uniquely obtained from the univariate polynomial so as to obtain a numeric value sequence and determining the number of changes of signs in the numeric value sequence so as to obtain a zero point interval of the second variable representing the position of the zero, and
wherein said pixel determining means is adapted for obtaining a pixel in the two-dimensional display region corresponding to the zero point interval of the second variable for the fixed value of the first variable and designating an obtained pixel as the pixel representing the graphic.

11. A graphic drawing apparatus for use in an information processing apparatus for displaying a graphic defined by zeros of a multivariate polynomial in a two-dimensional display region, comprising:
zero point calculating means for calculating a position of the zero point of a univeriate polynomial obtained by substituting fixed values of other variable other than a first variable into the multivariate polynomial in a form of a value of the first variable; and
pixel determining means for obtaining a pixel in the two-dimensional display region corresponding to the value of the first variable for the fixed values of the other variables and designating an obtained pixel as a pixel representing the graphic.

12. The graphic drawing apparatus as set forth in claim 11, wherein said zero point calculating means is adapted for obtaining the position of the zero point of the univariate polynomial as a zero point interval of the first variable within the display unit width.

13. A graphic drawing method for displaying a graphic represented by a plurality of zero points of a polynomial f(x, y) with variables x and y in a logical region on an xy coordinate plane, on a two-dimensional display device in a physical region corresponding to the logical region, comprising the steps of:
(a) obtaining a zero point interval of the variable y in which a zero point of a univariate polynomial is present within a y-direction display unit width of the two-dimensional display device, the first univariate polynomial being obtained by substituting each of a plurality of fixed values of the variable x into the polynomial f(x, y);
(b) obtaining a zero point interval of the variable x in which a zero point of a second univariate polynomial is present within a x-direction display unit width of the two-dimensional display device, the second univariate polynomial being obtained by substituting each of a plurality of fixed values of the variable y into the polynomial f(x, y);

(c) obtaining a pixel in the physical region of the two-dimensional display device, corresponding to the zero point interval of the variable y for each of the fixed values of the variable x;

(d) obtaining a pixel in the physical region of the two-dimensional display device, corresponding to the zero point interval of the variable x for each of the fixed values of the variable y; and (e) designating pixels of the two-dimensional display device obtained in step (d) as representing the graphic.

14. The graphic drawing method as set forth in claim 13, further comprising the step of displaying the graphic in the physical region of the two-dimensional display device with the pixels representing the graphic.

15. The graphic drawing method as set forth in claim 13, further comprising the steps of:

calculating an x-direction calculation pitch and a y-direction calculation pitch corresponding to a display accuracy;

obtaining the fixed values of the variable x using the x-direction calculation pitch; and obtaining the fixed values of the variable y using the y-direction calculation pitch.

16. The graphic drawing method as set forth in claim 15, further comprising the steps of:

dividing the logical region into a plurality of x-direction unit regions with a width of the x-direction calculation pitch;

designating representative values on x coordinate of the x-direction unit regions as the fixed values of the variable x;

dividing the logical region into a plurality of y-direction unit regions with a width of the y-direction calculation pitch; and designating representative values on y coordinate of the y-direction unit regions as the fixed value of the variable y.

17. The graphic drawing method as set forth in claim 13, further comprising the steps of:

substituting a particular value of the variable y into a polynomial sequence uniquely obtained from the first univariate polynomial with respect to the variable y so as to obtain a first numeric value sequence;

determining the number of changes of signs in the first numeric value sequence so as to obtain a zero point interval of the variable y;

substituting a particular value of the variable x into a polynomial sequence uniquely obtained from the second univariate polynomial with respect to the variable x so as to obtain a second numeric value sequence; and determining the number of changes of signs in the second numeric value sequence so as to obtain a zero point interval of the variable x.

18. The graphic drawing method as set forth in claim 17, further comprising the step of calculating the first numeric value sequence and the second numeric value sequence by one of arbitrary digit floating point arithmetic operation, arbitrary digit rational number arithmetic operation, and arbitrary digit integer arithmetic operation.

19. The graphic drawing method as set forth in claim 13, wherein a curved surface represented by an expression of a relation $z=g(x, y)$ of a variable z and a polynomial $g(x, y)$ in variables x and y in an xyz coordinate system having the xy coordinate plane, is displayed in the physical region of the two-dimensional display device, wherein said obtaining in steps (a) and (b) are performed by designating the polynomial f(x, y) as a sum of the polynomial g(x, y) and a constant to obtain the zero point interval of the variable x and the zero point interval of the variable, and wherein said designating in step (e) is performed by designating the pixels obtained in step (d) as representing a contour line of the curved surface corresponding to a value of the variable z determined with the constant.

20. A graphic drawing method for displaying a graphic represented by a plurality of zeros of a multivariate polynomial on a two-dimensional display device, comprising the steps of:

(a) obtaining a zero point interval of a first variable in which a zero point of a univariate polynomial is present within a display unit width of the two-dimensional display device, the univariate polynomial being obtained by substituting fixed values of other variables other than the first variable into the multivariate polynomial;

(b) obtaining a pixel on the two-dimensional display device, corresponding to the zero point interval of the first variable of the fixed values of the other variables; and (c) designating the pixel obtained in step (b) as representing the graphic.

21. The graphic drawing method as set forth in claim 20, further comprising the step of displaying the graphic in the two-dimensional display device with the pixel representing the graphic.

22. An algebraic function drawing method for designating a mapping $\phi: P_{ij} \rightarrow (x_i, y_j)$ that maps each pixel $P_{ij}$ (where $i=1, 2, \ldots, N$ and $j=1, 2, \ldots, M$) of an apparatus display region to a point $(x_i, y_j)$ on an xy coordinate plane, the apparatus display region being composed of horizontal N x vertical M pixels arranged in a lattice form on a two-dimensional physical plane, any real coefficient polynomial $f(x, y) \in R[x, y]$ being stored in a memory, a quantity designating a display accuracy being designated, an image on the xy coordinate plane of the apparatus display region by the mapping $\phi$ being referred to as a logical display region, and for displaying an approximated graphic of a graph of a set $\{(x, y)|f(x, y)=0\}$ of points on the xy coordinate plane that are real zeros of the polynomial f(x, y), comprising the steps of:

(a) selecting a vertical calculation pitch $h_y$ and a horizontal calculation pitch $h_x$ corresponding to the quantity designating the display accuracy;

(b) selecting a vertical painting accuracy width $d_y$ and a horizontal painting accuracy width $d_x$;

(c) dividing the logical display region into vertical rectangular blocks with a width of the horizontal calculation pitch $h_x$;

(d) designating representative values of a horizontal coordinate of the vertical rectangular blocks as $x_1, x_2, \ldots, x_m$;

(e) generating a first univariate polynomial $f(x_i, y)$ (where $i=1, 2, \ldots, m$) in variable y;

(f) calculating zero points with respect to y of $f(x_i, y)$ in the logical display region with an accuracy of the vertical painting accuracy width $d_y$;

(g) painting pixels that construct painting units including the zeros;

(h) repeating said steps (e) to (g) for $x_1, x_2, \ldots, x_m$;

(i) dividing the logical display region into horizontal rectangular blocks with a width of the vertical calculation pitch $h_y$;

(j) designating representative values of a vertical coordinate of the horizontal rectangular blocks as $y_1, y_2, \ldots, y_n$;

(k) generating a second univariate polynomial $f(x, y_j)$ (where i=1, 2, ..., n) in variable x;

(l) calculating all zeros with respect to x of $f(x, y_j)$ in the logical display region with an accuracy of the horizontal painting accuracy width $d_x$;

(m) painting pixels that construct painting units including the zeros;

(n) repeating said steps (i) to (m) for $y_1, y_2, \ldots, y_n$; and (o) displaying the approximated graphic of the graph that represents the set of the zeros of the bivariate polynomial f(x, y) in the apparatus display region.

23. The algebraic function drawing method as set forth in claim 22, wherein Sturm sequences of the first and second univariate polynomials $f(x_i, y)$ and $f(x, y_j)$ are calculated for all zeros with respect to y and x of the first and second univariate polynomials $f(x_i, y)$ and $f(x, y_j)$ in the logical display region within the vertical painting accuracy width $d_y$ and the horizontal painting accuracy width $d_x$.

* * * * *

UNITED STATES PATENT AND TRADEMARK OFFICE
CERTIFICATE OF CORRECTION

PATENT NO. : 5,590,255          Page 1 of 2
DATED : December 31, 1996
INVENTOR(S) : Taku TAKESHIMA, et al.

It is certified that error appears in the above-indentified patent and that said Letters Patent is hereby corrected as shown below:

Column 8

Line 20, "$F_2=(9/4)x^2-(9/4)*$" should be --$F_2=(9/4)x^2-(9/4)^x$--.

Column 15

Lines 41-45 (Equation 11), "$\xi=\alpha_0+\xi_1\beta+\xi_2\alpha^2+\ldots+\xi_r\beta^r$" should be --$\xi = \xi_0 + \xi_1\beta + \xi_2\beta^2 + \ldots + \xi_r\beta^r$--

Column 16

Line 38, (Equation 12),

"$f(x_{(1)}, x_{(2)}, \ldots, x_{(n)}) = \sum_{i=0}^{m} f \begin{bmatrix} i \\ 1 \end{bmatrix} (x_{(2)}, x_{(3)}, \ldots, x_{(n)}) x^i_{(1)}$" should be -- $f(x_{(1)}, x_{(2)}, \ldots, x_{(n)}) = \sum_{i=0}^{m} f_{(1)}^{[i]} (x_{(2)}, x_{(3)}, \ldots, x_{(n)}) x^i_{(1)}$ --.

UNITED STATES PATENT AND TRADEMARK OFFICE
CERTIFICATE OF CORRECTION

PATENT NO. : 5,590,255
DATED : December 31, 1996
INVENTOR(S) : Taku TAKESHIMA, et al.

It is certified that error appears in the above-indentified patent and that said Letters Patent is hereby corrected as shown below:

<u>Column 24</u>

Line 24, "-1.523 x ≤ 2.5" should be -- $-1.5 \leq x \leq 2.5$ --.

<u>Column 28</u>

Line 38, "univeriate" should be --univariate--.

Signed and Sealed this

Sixth Day of May, 1997

*Attest:*

BRUCE LEHMAN

*Attesting Officer*     *Commissioner of Patents and Trademarks*